(12) United States Patent
Aoyagi et al.

(10) Patent No.: US 8,547,273 B2
(45) Date of Patent: Oct. 1, 2013

(54) PULSE RADAR APPARATUS AND CONTROL METHOD THEREOF

(75) Inventors: Yasushi Aoyagi, Tokyo (JP); Kazutaka Kamimura, Tokyo (JP); Yoshihito Ishida, Tokyo (JP)

(73) Assignees: Furukawa Electric Co., Ltd., Tokyo (JP); Furukawa Automotive Systems Inc., Shiga (JP)

( * ) Notice: Subject to any disclaimer, the term of this patent is extended or adjusted under 35 U.S.C. 154(b) by 0 days.

(21) Appl. No.: 13/604,746

(22) Filed: Sep. 6, 2012

(65) Prior Publication Data

US 2012/0326912 A1 Dec. 27, 2012

Related U.S. Application Data

(63) Continuation of application No. PCT/JP2011/055261, filed on Mar. 7, 2011.

(30) Foreign Application Priority Data

| Mar. 9, 2010 | (JP) | 2010-051681 |
| Mar. 9, 2010 | (JP) | 2010-051682 |
| Mar. 9, 2010 | (JP) | 2010-051683 |

(51) Int. Cl.
*G01S 13/00* (2006.01)
*G01S 13/08* (2006.01)
*G01S 13/58* (2006.01)

(52) U.S. Cl.
USPC ............... 342/21; 342/70; 342/104; 342/107; 342/109; 342/113; 342/115; 342/118; 342/134; 342/139; 342/146; 342/159; 342/175; 342/194; 342/195

(58) Field of Classification Search
USPC ............... 342/21, 70–72, 104, 107, 109, 113, 342/118, 134, 139, 146, 147, 159, 175, 89–92, 342/115, 194, 1, 95
See application file for complete search history.

(56) References Cited

U.S. PATENT DOCUMENTS 5,706,013 A * 1/1998 Melvin et al. ................. 342/159
5,731,781 A * 3/1998 Reed .............................. 342/135

(Continued)

FOREIGN PATENT DOCUMENTS

| JP | 7-151852 | 6/1995 |
| JP | 11-352216 | 12/1999 |

(Continued)

OTHER PUBLICATIONS

International Search Report mailed Jun. 7, 2011 in PCT/JP2011/055261 filed Mar. 7, 2011 (in English).

*Primary Examiner* — Jack W Keith
*Assistant Examiner* — Peter Bythrow
(74) *Attorney, Agent, or Firm* — Oblon, Spivak, McClelland, Maier & Neustadt, L.L.P.

(57) ABSTRACT

The invention provides a pulse radar apparatus, and a control method thereof, that permits to readily downsize and to lower its cost and allows information on an object to be detected in high precision by removing an influence of noise when a gain of a variable gain amplifier is discontinuously changed corresponding to detected distance, with a simple configuration. A variable gain amplifier 135 configured to adjust a gain corresponding to a distance gate is used to be able to detect weak reflected wave from a distant object and to amplify a reflected wave from a short distance with a low gain. An offset noise from the variable gain amplifier 135 is prepared together with interference noise and self-mixing noise in advance as a replica signal of unwanted wave and the replica signal is removed from a baseband signal in detecting the object T.

59 Claims, 20 Drawing Sheets

(56) References Cited

U.S. PATENT DOCUMENTS

| | | | |
|---|---|---|---|
| 5,959,571 A * | 9/1999 | Aoyagi et al. | 342/70 |
| 5,969,667 A * | 10/1999 | Farmer et al. | 342/165 |
| 6,266,004 B1 * | 7/2001 | Pannert et al. | 342/70 |
| 6,867,731 B2 * | 3/2005 | Dizaji et al. | 342/159 |
| 7,030,806 B2 * | 4/2006 | Fullerton | 342/104 |
| 7,436,356 B2 * | 10/2008 | Bochkovskiy et al. | 342/357.68 |
| 7,443,336 B2 * | 10/2008 | Noda | 342/135 |
| 7,474,258 B1 * | 1/2009 | Arikan et al. | 342/159 |
| 2003/0103197 A1 * | 6/2003 | Shirai et al. | 356/5.01 |
| 2003/0210179 A1 * | 11/2003 | Dizaji et al. | 342/159 |
| 2004/0190654 A1 * | 9/2004 | Kubota | 375/345 |
| 2005/0285773 A1 * | 12/2005 | Hartzstein et al. | 342/70 |
| 2007/0210955 A1 * | 9/2007 | McEwan | 342/175 |
| 2009/0027257 A1 * | 1/2009 | Arikan et al. | 342/159 |
| 2009/0051581 A1 * | 2/2009 | Hatono | 342/33 |
| 2009/0207068 A1 * | 8/2009 | Inaba | 342/70 |

FOREIGN PATENT DOCUMENTS

| | | |
|---|---|---|
| JP | 2001-272459 | 10/2001 |
| JP | 2003-139847 | 5/2003 |
| JP | 2004-297137 | 10/2004 |
| JP | 2007-93480 | 4/2007 |
| JP | 2008-209225 | 9/2008 |

* cited by examiner

US 8,547,273 B2

PULSE RADAR APPARATUS AND CONTROL METHOD THEREOF

TECHNICAL FIELD

The present invention relates to a radar apparatus and more specifically to an in-vehicle pulse radar apparatus, and a control method thereof, configured to measure a distance to an object by measuring a turnaround time of a pulse signal from when the signal is radiated from the apparatus until when the signal, reflected by the object, is received by the apparatus again.

BACKGROUND ART

A conventional pulse radar apparatus comprises a high-frequency transmitting section configured to generate a pulsed transmission signal by modulating a high-frequency carrier wave and by cutting out a carrier frequency only for a very short time, a transmitting antenna configured to radiate the transmission signal generated by the high-frequency transmitting section to the air as radio wave, a receiving antenna configured to receive reflected waves of the radio wave radiated from the transmitting antenna and returned by being reflected by an object, a high-frequency receiving section configured to input the received signal from the receiving antenna to down-convert to a baseband signal, and a baseband section configured to input the baseband signal from the high-frequency receiving section to calculate a distance to the object and others.

The high-frequency transmitting section further includes an oscillator configured to generate the carrier wave having a predetermined frequency, a switch configured to cut out the carrier wave generated by the oscillator as pulsed carrier waves, and others. The high-frequency receiving section also includes a correlator configured to correlate the transmission signal with the received signal and an IQ mixer configured to down-convert an output signal of the correlator into the baseband signal. The baseband section includes an amplifier configured to amplify the baseband signal received from the high-frequency receiving section, an A/D converting unit configured to convert the signal amplified by the amplifier into a digital signal, a digital signal processing unit configured to process the digital signal received from the A/D converting unit to calculate the distance to and relative speed of the object, and a control unit configured to control the pulse radar apparatus. The control unit is configured to control ON/OFF of the switch of the high-frequency transmitting section and of the correlator of the high-frequency receiving section.

As described above, the pulse radar apparatus includes the high-frequency transmitting and receiving sections (both referred to as the "RF section" hereinafter) that are configured to process high-frequency signals, and the baseband section configured to process low-frequency signals. Because it is necessary to use an expensive substrate capable of accommodating with high frequency for the RF section among them, it has been common to dispose only the RF section on the substrate capable of accommodating with high frequency and to dispose the baseband section on an inexpensive substrate to lower costs. Still further, a small and inexpensive multi-pin connector is used since the past as a means for connecting the RF section with the baseband section disposed respectively on the separate substrates.

When the baseband section and the RF section which are formed on the separate substrates are connected by the inexpensive intensive multi-pin connector, there arises a problem that interference noise signals leak into the received signal. Thus, there is a problem that the desirable received signal is buried in the interference noise signals when sufficient receiving strength cannot be obtained if the unwanted wave such as a control signal secondarily generated leaks into the received signal and turns out to be the interference noise signal in the multi-pin connector. Then, the prior art multi-pin connector is arranged so as to able to detect even a received signal whose receiving strength is small by increasing isolation of the multi-pins as much as possible to reduce an amount of the interference noise signals.

Such interference noise signals exist also in various radar apparatuses, though its cause is different, and there are technologies for removing such interference noise signals. Patent Document 1 discloses a process for reducing interference noise signals of stationary noise components superimposed on a received signal (noise component whose temporal fluctuation of frequency and level is small) in a FM-CW radar. The radar stores the stationary noise components and detects an object after subtracting the noise components from a distribution of spectrum of the received signal.

Meanwhile, a pulse radar apparatus configured to process a signal by dividing a received signal into I phase and Q phase has such a problem that a difference of gains is produced due to individual differences of an I-phase-side unit and a Q-phase-side unit because gains of amplifiers operated in parallel in the baseband section and values of sampling implemented in the A/D converting unit are not equal. If such individual difference is produced, errors contained in respective measured values increase in measurements of azimuth (angle measurement), of distance (distance measurement) and of relative speed of an object, which are purports of the radar apparatus.

Patent Document 2 discloses a means configured to correct such errors of the gains. In order to correct the difference of gains produced between two or more receiving digital signals, Patent Document 2 proposes a system comprising a storage unit configured to store an initial difference of gains caused by characteristic variation of units composing each receiving system, a detecting unit configured to detect the difference of gains per receiving system, a correction-amount calculating unit configured to generate a gain-difference correcting signal based on the initial difference of gains and the difference of gains in operation, and an arithmetic processing unit configured to correct the gain of output of A/D conversion based on the gain-difference correcting signal. The system calculates a correction value by actually radiating radar waves.

Still further, in order to be able to detect weak reflected waves from a distant object, the pulse radar apparatus amplifies the baseband signal by a fixed gain amplifier having a high gain. Due to that, there are such problems that reflected wave from an object located in a short distance is amplified to a high level and exceeds a maximum input voltage of the A/D converting unit. If the output signal from the A/D converting unit exceeds the maximum input voltage as described above, the digital signal processing unit is unable to correctly calculate a distance to the object, relative speed of the object and azimuth angle. Then, Patent Document 3 uses a variable gain amplifier, instead of the fixed gain amplifier, to be able to adjust the gain corresponding to strength of the received signal.

When the variable gain amplifier is used, there arises such a problem that noise is generated in an output when the gain is changed over discontinuously. Patent Document 3 describes such a problem that a slice level detecting circuit in a later stage outputs what is different from an original slice level due to such noise, thus aggravating a bit error rate. In order to solve such problem, Patent Documents 3 is provided with a slice level fixing circuit configured to fix the slice level when the gain of the variable gain amplifier is changed over. Patent Document 3 prevents the aggravation of the bit error rate by reducing an influence of the noise when the gain is changed over by thus arranging so that the circuits of the latter stage are not influenced.

PRIOR ART DOCUMENTS

[Patent Document 1] Japanese Patent Application Laid-open No. Hei. 7 (1995)-151852
[Patent Document 2] Japanese Patent Application Laid-open No. 2007-93480
[Patent Document 3] Japanese Patent Application Laid-open No. 2004-297137

SUMMARY OF THE INVENTION

Problem to be Solved by the Invention

However, because those units described above are implemented often on small substrates in an in-vehicle radar, there is a problem that it is very difficult to assure enough isolation between pins of the multi-pin connector. Still further, although it is also possible to connect respective signal lines by completely independent coaxial lines, there are such problems that the cost increases and it becomes difficult to manufacture the apparatus because mechanical handling is complicated if the plurality of coaxial lines is used to connect the RF section with the baseband section.

Still further, because the technology disclosed in Patent Document 1 is a system that reduces the low-level interference noise signal, the technology has a problem that it cannot be applied to the interference noise signal whose level is higher than the received signal.

Still further, although the gain correcting means of Patent Document 2 is configured to actually radiate radio wave from the transmitting antenna and to detect the error of gains based on a reflected signal reflected by a radome, the reflected signal contains reflected waves from ambient environments other than the radome. Due to that, the apparatus of Patent Document 2 is strongly influenced by the ambient environments and is unable to detect the difference of gains in high precision.

Still further, because it is necessary to add the slice level fixing circuit, a counter circuit, a comparator circuit, the level detecting circuit and other in the receiving section of Patent Document 3 in order to reduce the influence of the noise in changing over the gain, Patent Document 3 has problems that the structure of the receiving section is extremely complicated and the section is enlarged, thus increasing the cost.

Thus, in view of the problems described above, there is a need for a pulse radar apparatus, and a control method thereof, capable of reducing interference noise signals which otherwise exceed strength of received signals, while downsizing the apparatus by using a multi-pin connector, and capable of detecting information of an object in high precision.

Means for Solving the Problems

In order to solve the abovementioned problems, according to a first aspect of a pulse radar apparatus of the invention, the pulse radar apparatus comprises a high-frequency transmitting section having an oscillator that generates a carrier wave of a predetermined frequency and configured to generate a pulsed transmission signal by cutting out the carrier wave generated by the oscillator in accordance to two or more transmission control signals, a transmitting antenna configured to input the transmission signal from the high-frequency transmitting section to radiate to the air as radio wave, a receiving antenna configured to receive reflected waves of the radio wave radiated to the air and returned by being reflected by an object, a high-frequency receiving section configured to input a received signal from the receiving antenna to down-convert to a baseband signal by correlating with the transmission signal in accordance to at least one receiving control signal and a baseband section including an A/D converting unit configured to input the baseband signal to convert into a digital signal, a digital signal processing unit configured to input the digital signal from the A/D converting unit to calculate a distance to the object and/or relative speed of the object and/or an azimuth angle of the object, and a control unit configured to output the transmission control signal to the high-frequency transmitting section and to output at least one receiving control signal to the high-frequency receiving section.

Then, when the transmission control signals are denoted as X1 through Xm (m≥2) and when the digital signal output of the A/D converting unit is denoted as an $i^{-th}$ background signal when the control unit outputs no $i^{-th}$ transmission control signal Xi among the transmission control signals while outputting the transmitting and receiving control signals except of the $i^{-th}$ signal, the digital signal processing unit selects sequentially the transmission control signals X1 to Xm as the $i^{-th}$ transmission control signal Xi to acquire the digital signals output of the A/D converting unit respectively as the first through the $m^{-th}$ background signals when the control unit outputs the transmitting and receiving control signals except of the transmission control signal Xi, acquires the digital signal output of the A/D converting unit as a $(m+1)^{-th}$ background signal when the control unit outputs the receiving control signal without outputting any of the m transmission control signals, and calculates a replica signal by adding the first through the $m^{-th}$ background signals, by subtracting the $(m+1)^{-th}$ background signal, and by dividing by $(m-1)$.

Then, the digital signal processing unit calculates a low-noise signal by subtracting the replica signal from the digital signal output of the A/D converting unit when the control unit outputs the m transmission control signals and the receiving control signal and calculates a distance to the object and/or a relative speed of the object and/or an azimuth angle of the object based on the low-noise signal.

According to the invention, it is possible to reduce the influence of interference applied to the baseband signal from the transmitting and receiving control signals and to detect the information on the object in high precision by generating the replica signal of the noise signal in advance and by removing the replica signal from the received signal.

According to another aspect of the pulse radar apparatus of the invention, the digital signal processing unit is configured to process the digital signal inputted from the A/D converting unit by Fourier transform and to calculate the low-noise signal described above by subtracting a Fourier component equivalent to 0 Hz of the replica signal from a Fourier component equivalent to 0 Hz of the digital signal output of the A/D converting unit when the control unit outputs the m transmission control signals and the receiving control signal.

Because the replica signal is a stationary noise signal, it is possible to calculate the distance to the object readily in high precision by subtracting the replica signal from the Fourier component equivalent to 0 Hz.

According to another aspect of the pulse radar apparatus of the invention, at least the baseband section is formed on a first substrate and the high-frequency transmitting and receiving sections are formed on a substrate different from the first substrate, a connecting section of a multi-pin connector for connecting signal lines for transmitting the baseband signals and control lines for transmitting the m transmission control signals and receiving control signals collectively in an energized condition is provided between the first substrate and the other substrate, and connections of the control lines and connections of the signal lines within the connecting section are isolated so that a level of leak signals from the control lines to the signal lines falls within a dynamic range of the A/D converting unit.

The signal lines are separately disposed from the control lines as much as possible to isolate them from each other. This arrangement enables to provide the downsized and low-cost pulse radar apparatus by enabling to use the conventional multi-pin connector.

According to another aspect of the pulse radar apparatus of the invention, the high-frequency transmitting section further includes a first gate unit configured to cut out the carrier wave in pulses in accordance to a first control signal and a second gate unit configured to cut out the signal cut out by the first gate unit in accordance to a second control signal to generate the transmission signal, the high-frequency receiving section includes a correlator configured to input the received signal from the receiving antenna to correlate with the transmission signal in accordance to a third control signal and a down-converting unit configured to down-convert the output signal from the correlator into baseband to output the baseband signal, the control unit outputs the first, second and third control signals respectively to the first and second gate units and the correlator to turn on/off their power sources, and the digital signal processing unit calculates the replica signal by setting the first and second control signals as the m transmission control signals (m=2) and the third control signal at least as the receiving control signal.

The invention enables to reduce the influence of interference otherwise applied to the baseband signal from the first, second and third control signals and to detect the information on the object in high precision by generating the replica signal of the noise signal in advance and by removing the replica signal from the received signal.

According to another aspect of the pulse radar apparatus of the invention, the digital signal processing unit is configured to calculate the low-noise signal by subtracting a Fourier component equivalent to 0 Hz of the replica signal from a Fourier component equivalent to 0 Hz of the digital signal output of the A/D converting unit when the control unit outputs the first, second and third control signals.

Because the replica signal is a stationary noise signal, it is possible to calculate the distance to the object readily in high precision by subtracting the replica signal from the Fourier component equivalent to 0 Hz.

According to another aspect of the pulse radar apparatus of the invention, the baseband section is formed on a low-frequency substrate accommodating to an operating frequency band of the baseband section, and the high-frequency transmitting and receiving sections are formed on a high-frequency substrate accommodating to an operating frequency band of the high-frequency transmitting and receiving sections, a connecting section of a multi-pin connector that connects signal lines for transmitting the baseband signals and the first, second and third control lines for transmitting the first, second and third control signals collectively in an energized condition is provided between the low-frequency substrate and the high-frequency substrate, and connections of the control lines and connections of the signal lines within the connecting section are isolated so that a level of leak signals from the control lines to the signal lines falls within a dynamic range of the A/D converting unit.

Thus, the signal lines and the control lines are disposed separately as much as possible to isolate them from each other.

The invention permits to reduce the influence of interference otherwise applied to the baseband signal from the first, second and third control signals, to detect the information on the object in high precision and to provide the downsized and low-cost pulse radar apparatus by permitting to use the conventional multi-pin connector.

According to another aspect of the pulse radar apparatus of the invention, the high-frequency receiving section is configured to output a complex baseband signal composed of I and Q components as the baseband signal, the baseband section includes at least a complex signal amplifier that inputs the complex baseband signal from the high-frequency receiving section to amplify the I and Q components respectively to predetermined levels and to output to the A/D converting unit, and the A/D converting unit is a complex A/D converting unit that is configured to input the amplified I and Q components from the complex signal amplifier, to convert into complex digital signal in parallel and to output as the digital signal.

The digital signal processing unit calculates I and Q components of the replica signal by mutually adding I components and Q components, respectively, of the first through $m^{-th}$ background signals, by subtracting I and Q components of a $(m+1)^{-th}$ background signaled by dividing respectively by $(m-1)$, where the complex digital signal output of the complex A/D converting unit is defined as the $i^{-th}$ background signal when the control unit outputs no $i^{-th}$ transmission control signal Xi among the transmission control signals and outputs the transmitting and receiving control signals except of the $i^{-th}$ signal, and the complex digital signal output of the complex A/D converting unit is defined as the $(m+i)^{-th}$ background signal when the control unit outputs the receiving control signal without outputting any of the m transmission control signals.

The digital signal processing unit also calculates a gain correction value by dividing either one of an integrated value in a distance gate direction of I component of the replica signal and an integrated value in the distance gate direction of Q component of the replica signal by the other, subtracts the I and Q components of the replica signal from the I and Q components of the complex digital signal output of the complex A/D converting unit when the control unit outputs the m transmission control signal and the receiving control signal, and calculates the low-noise signal by multiplying the gain correction value with the I or Q component of the complex digital signal after subtracting the replica signal.

The invention allows the information on the object to be detected in high precision by obtaining a ratio of respective envelop levels of the I phase and Q phase of the unwanted wave inputted to the baseband section and by correcting a difference of levels between the I phase and the Q phase by the complex signal amplifier and the complex A/D converting unit.

According to another aspect of the pulse radar apparatus of the invention, the complex baseband signal has signal strength lower than that of the m transmission control signals and the receiving control signal, and the complex signal amplifier that inputs and amplifies the complex baseband signal is disposed separately from the respective control lines that transmit the m transmission control signals and the receiving control signal.

According to another aspect of the pulse radar apparatus of the invention, the high-frequency transmitting section further includes a first gate unit configured to cut out the carrier wave in pulses in accordance to a first control signal and a second gate unit configured to cut out the signal cut out by the first gate unit in accordance to a second control signal to generate the transmission signal, the high-frequency receiving section includes a correlator configured to input the received signal from the receiving antenna to correlate with the transmission signal in accordance to a third control signal and a quadrature down-converting unit configured to down-convert the output signal from the correlator into baseband to output as the complex baseband signal, the control unit outputs the first, second and third control signals respectively to the first and second gate units and the correlator to turn on/off their power sources, and the digital signal processing unit calculates the I and Q components of the replica signal by setting the first and second control signals as the m transmission control signals (m=2) and the third control signal at least as the receiving control signal.

The invention allows the information on the object to be detected in high precision by obtaining a ratio of respective envelop levels of the I phase and Q phase of the unwanted wave inputted to the baseband section and by correcting a difference of levels between the I phase and the Q phase by the complex signal amplifier and the complex A/D converting unit.

According to another aspect of the pulse radar apparatus of the invention, the digital signal processing unit is configured to process the complex digital signal inputted from the complex A/D converting unit by Fourier transform, to subtract a Fourier component equivalent to 0 Hz of the I and Q components of the replica signal from a Fourier component equivalent to 0 Hz of the I and Q components of the complex digital signal output of the complex A/D converting unit when the control unit outputs the first, second and third control signals, and to calculate the low-noise signal by multiplying the gain correction value with the I or Q component of the complex digital signal after subtracting the replica signal.

Because the replica signal is a stationary noise signal, it is possible to calculate the distance to the object readily in high precision by subtracting the replica signal from the Fourier component equivalent to 0 Hz.

According to another aspect of the pulse radar apparatus of the invention, the baseband section is formed on a low-frequency substrate accommodating to an operating frequency band of the baseband section and the high-frequency transmitting and receiving sections are formed on a high-frequency substrate accommodating to an operating frequency band of the high-frequency transmitting and receiving sections, a connecting section of a multi-pin connector for connecting signal lines for transmitting the complex baseband signals and the first, second and third control lines for transmitting the first, second and third control signals collectively in an energized condition is provided between the low-frequency substrate and the high-frequency substrate, and connections of the control lines and connections of the signal lines within the connecting section are isolated so that a level of leak signals from the control lines to the signal lines falls within a dynamic range of the A/D converting unit.

Thus, the signal lines and the control lines are disposed separately as much as possible to isolate them from each other.

It is possible to provide the downsized and low-cost pulse radar apparatus by permitting to use the conventional multi-pin connector.

According to another aspect of the pulse radar apparatus of the invention, the baseband section has at least a variable gain amplifier that adjusts a gain in accordance to the other one of the receiving control signal to amplify the baseband signal and to input to the A/D converting unit, and the control unit determines the other one of the receiving control signals corresponding to a detected distance in synchronism with either one of the transmission control signals to output to the variable gain amplifier.

The invention permits to remove the influence of noise otherwise generated when the gain of the variable gain amplifier is discontinuously changed with the simple configuration and to detect the information on the object in high precision by generating the replica signal of the noise signal in advance and by removing the replica signal from the received signal.

According to another aspect of the pulse radar apparatus of the invention, the control unit determines the other one of the receiving control signals and outputs it to the variable gain amplifier so that the gain of the variable gain amplifier increases or turns out to be a fixed value greater than that of a short distance as the detected distance increases, and turns off the other one of the receiving control signals during a period from when a time in which the detected distance is maximized elapses after outputting the transmission signal until when a next transmission signal is output.

The use of the variable gain amplifier allows the weak reflected wave from a distant object to be detected and the noise level in the short distance to be suppressed low.

According to another aspect of the pulse radar apparatus of the invention, the baseband signal has signal strength lower than that of the m transmission control signals and the receiving control signal, and the variable gain amplifier that inputs and amplifies the baseband signal is disposed separately from the respective control lines that transmit the m transmission control signals and the receiving control signal.

According to another aspect of the pulse radar apparatus of the invention, the high-frequency transmitting section further includes a first gate unit configured to cut out the carrier wave in pulses in accordance to a first control signal and a second gate unit configured to cut out the signal cut out by the first gate unit in accordance to a second control signal to generate the transmission signal, the high-frequency receiving section includes a correlator configured to input the received signal from the receiving antenna to correlate with the transmission signal in accordance to a third control signal and a down-converting unit configured to down-convert the output signal of the correlator into baseband to output the baseband signal, the variable gain amplifier amplifies the baseband signal by adjusting a gain in accordance to a fourth control signal, the control unit outputs the first, second and third control signals respectively to the first and second gate unit s and the correlator to turn on/off their power sources and determines the fourth control signal corresponding to a detected distance in synchronism with the first or second control signal to output to the variable gain amplifier, and the digital signal processing unit calculates the replica signal by setting the first and second control signals as the m transmission control signals (m=2) and the third and fourth control signals as the receiving control signals.

The invention permits to remove the influence of noise when the gain of the variable gain amplifier varies discontinuously corresponding to the detected distance and to detect the information on the object in high precision by generating the replica signal of the noise signal in advance and by removing the replica signal from the received signal.

According to another aspect of the pulse radar apparatus of the invention, the control unit determines the fourth control signal and outputs it to the variable gain amplifier so that the gain of the variable gain amplifier increases or turns out to be a fixed value greater than that of a short distance as the detected distance increases, and turns off the fourth control signal during a period from when a time in which the detected distance is maximized elapses after outputting the transmission signal until when a next transmission signal is output.

The use of the variable gain amplifier allows the weak reflected wave from a distant object to be detected and the noise level in the short distance to be suppressed low.

According to another aspect of the pulse radar apparatus of the invention, the digital signal processing unit calculates the low-noise signal by subtracting a Fourier component equivalent to 0 Hz of the replica signal from a Fourier component equivalent to 0 Hz of a digital signal output of the A/D converting unit when the control unit outputs the first, second, third and fourth control signals.

Because the replica signal is a stationary noise signal, it is possible to calculate the distance to the object readily in high precision by subtracting the replica signal from the Fourier component equivalent to 0 Hz.

According to another aspect of the pulse radar apparatus of the invention, the baseband section is formed on a low-frequency substrate accommodating to an operating frequency band of the baseband section and the high-frequency transmitting and receiving sections are formed on a high-frequency substrate accommodating to an operating frequency band of the high-frequency transmitting and receiving sections, a connecting section of a multi-pin connector that connects signal lines for transmitting the baseband signals and the first, second and third control lines for transmitting the first, second and third control signals collectively in an energized condition is provided between the low-frequency substrate and the high-frequency substrate, and connections of the control lines and connections of the signal lines within the connecting section are isolated so that a level of leak signals from the control lines to the signal lines falls within a dynamic range of the A/D converting unit.

Thus, the signal lines and the control lines are disposed separately as much as possible to isolate them from each other.

This arrangement allows the conventional multi-pin connector to be used, so that it is possible to provide the downsized and low-cost pulse radar apparatus.

According to a first aspect of the method for controlling the pulse radar apparatus of the invention, the method comprises steps of generating a carrier wave of a predetermined frequency, cutting out the carrier wave in pulses in accordance to two or more transmission control signals to generate a transmission signal, radiating the transmission signal to the air as radio wave, receiving the radio wave reflected by an object, correlating the received signal received in the receiving step with the transmission signal in accordance to at least one receiving control signal, down-converting an output signal of the correlating step to baseband to output as a baseband signal, A/D converting the inputted baseband signal into a digital signal, and processing the inputted digital signal to calculate a distance to the object and/or relative speed of the object and/or an azimuth angle of the object.

When the transmission control signals described above are denoted as X1 through Xm (m≥2), and the digital signal output of the A/D converting unit is denoted as an $i^{-th}$ background signal when the $i^{-th}$ transmission control signal Xi among the transmission control signals is not output while outputting the transmitting and receiving control signals, except of the $i^{-th}$ signal, in the signal cutting-out step, the digital signal processing step further includes steps of sequentially selecting the transmission control signals X1 to Xm as the $i^{-th}$ transmission control signal Xi, acquiring the digital signals acquired in the A/D converting step as first through $m^{-th}$ background signals when the transmission control signals, except of the transmission control signal Xi, and the receiving control signal are outputted in the signal cutting-out step, acquiring the digital signal acquired in the A/D converting step as a $(m+1)^{-th}$ background signal when the receiving control signal is output without outputting any of the m transmission control signals in the signal cutting-out step, calculating a replica signal by adding the background signals from the first through the $m^{-th}$ background signals, by subtracting the $(m+1)^{-th}$ background signal, and by dividing the background signals obtained by the subtraction by $(m-1)$, calculating a low-noise signal by subtracting the replica signal from the digital signal when the m transmission control signals and the receiving control signal are output in the signal cutting-out step, and calculating the distance to the object and/or the relative speed of the object and/or the azimuth angle of the object based on the low-noise signal.

According to another aspect of the method for controlling the pulse radar apparatus of the invention, the digital signal converted in the A/D converting step is processed by Fourier transform in the digital signal processing step, and the low-noise signal is calculated by subtracting a Fourier component equivalent to 0 Hz of the replica signal from a Fourier component equivalent to 0 Hz of the digital signal obtained in the A/D converting step when the m transmission control signals are output in the signal cutting out step and at least one of the receiving control signals is output in the correlating step.

According to another aspect of the method for controlling the pulse radar apparatus of the invention, the signal cutting-out step further includes a first cutout step of cutting out the carrier wave in pulses in accordance to a first control signal and a second cutout step of cutting out the signal cut out in the first cutout step in accordance to a second control signal to generate the transmission signal, the received signal is correlated with the transmission signal in accordance to a third control signal in the correlating step, a gain is adjusted in accordance to a fourth control signal determined corresponding to detected distance in synchronism with the first or second control signal to amplify the baseband signal in the variable gain amplifying step, the replica signal is calculated by setting the first and second control signals as the m transmission control signals (m=2) and the third and fourth control signals as the receiving control signals in the digital signal processing step.

According to another aspect of the method for controlling the pulse radar apparatus of the invention, the low-noise signal is calculated by subtracting a Fourier component equivalent to 0 Hz of the replica signal from a Fourier component equivalent to 0 Hz of the digital signal output when the first and second cutout steps and the correlating step are executed.

According to another aspect of the method for controlling the pulse radar apparatus, a complex baseband signal composed of I and Q components is output as the baseband signal in the down-converting step, the method further includes a complex signal amplifying step of at least inputting the complex baseband signal to amplify the I and Q components respectively to predetermined levels in parallel, and signals obtained by inputting the amplified I and Q components and by converting into complex digital signals in parallel are output as the digital signals in the A/D converting step.

The digital signal processing step further includes steps of calculating I and Q components of the replica signal by mutually and respectively adding I components and Q components of the first through $m^{-th}$ background signals, by subtracting I and Q components of a $(m+1)^{-th}$ component, and by dividing the subtracted components respectively by (m−1), where the complex digital signal obtained in the complex A/D converting step is defined as the $i^{-th}$ background signal when no $i^{-th}$ transmission control signal Xi among the transmission control signals is output and the transmitting and receiving control signals, except of the $i^{-th}$ signal, are output in the signal cutting-out step, and a complex digital signal obtained in the complex A/D converting step is defined as the $(m+i)^{-th}$ background signal when the receiving control signal is output without outputting any of the m transmission control signals, calculating a gain correction value by dividing either one of an integrated value in a distance gate direction of the I component of the replica signal and an integrated value in the distance gate direction of the Q component of the replica signal by the other, subtracting the I and Q components of the replica signal respectively from the I and Q components of the complex digital signal obtained in the complex A/D converting step when the m transmission control signals and the receiving control signal are output in the signal cutting-out step, and calculating the low-noise signal by multiplying the gain correction value with the I or Q component of the complex digital signal after subtracting the replica signal.

According to another aspect of the method for controlling the pulse radar apparatus of the invention, the signal cutting-out step further includes a first cutout step of cutting out the carrier wave in pulses in accordance to a first control signal and a second cutout step of still cutting out the signal cut out in the first cutout step in accordance to a second control signal to generate the transmission signal, the received signal is correlated with the transmission signal in accordance to a third control signal in the correlating step, and the replica signal is calculated by setting the first and second control signals as the m transmission control signals (m=2) and the third control signal as the receiving control signal in the digital signal processing step.

According to another aspect of the method for controlling the pulse radar apparatus of the invention, the complex digital signal converted in the complex A/D converting step is processed by the Fourier transform in the digital signal processing step, a Fourier component equivalent to 0 Hz of the I and Q components of the replica signal is subtracted from a Fourier component equivalent to 0 Hz of the I and Q components of the complex digital signal output when the first and second cutout steps and the correlating steps are executed, and the low-noise signal is calculated by multiplying the gain correction value with the I or Q component of the complex digital signal from which the replica signal has been subtracted.

According to another aspect of the method for controlling the pulse radar apparatus of the invention, the method further includes a variable gain amplifying step of determining the other one of the receiving control signals corresponding to the detected distance in synchronism at least with either one of the transmission control signals, and adjusting the gain in accordance to the other one of the receiving control signals to amplify the baseband signal generated in the down-converting step, and the amplified baseband signal input and converted is output as the digital signal in the A/D converting step.

According to another aspect of the method for controlling the pulse radar apparatus of the invention, the other one of the receiving control signals is determined so that the gain used in the variable gain amplifying step increases or turns out to be a fixed value greater than that of a short distance as the detected distance increases, and the other one of the receiving control signals is turned off during a period from when a time in which the detected distance is maximized elapses after outputting the transmission signal until when a next transmission signal is output in the variable gain amplifying step.

According to another aspect of the method for controlling the pulse radar apparatus of the invention, the signal cutting-out step further includes a first cutout step of cutting out the carrier wave in pulses in accordance to a first control signal and a second cutout step of cutting out the signal cut out in the first cutout step in accordance to a second control signal to generate the transmission signal, the received signal is correlated with the transmission signal in accordance to a third control signal in the correlating step, a gain is adjusted in accordance to a fourth control signal determined corresponding to the detected distance in synchronism with the first or second control signal to amplify the baseband signal in the variable gain amplifying step, and the replica signal is calculated by setting the first and second control signals as the m transmission control signals (m=2) and the third and fourth control signals as the receiving control signals in the digital signal processing step.

According to another aspect of the method for controlling the pulse radar apparatus of the invention, the fourth control signal is determined so that the gain used in the variable gain amplifying step increases or turns out to be a fixed value greater than that of a short distance as the detected distance increases, and the fourth control signal is turned off during a period from when a time in which the detected distance is maximized elapses after outputting the transmission signal until when a next transmission signal is output in the variable gain amplifying step.

According to another aspect of the method for controlling the pulse radar apparatus of the invention, the low-noise signal is calculated by subtracting a Fourier component equivalent to 0 Hz of the replica signal from a Fourier component equivalent to 0 Hz of the digital signal output when the first and second cutout steps, the correlating step and the variable gain amplifying step are executed in the digital signal processing step.

Advantage Effects of the Invention

Thus, the invention can provide the pulse radar apparatus, and the control method thereof, which can be easily downsized, whose cost can be lowered and which is capable of detecting the information on the object in high precision by arranging so as to generate the replica signal of the noise signal.

DESCRIPTION OF EMBODIMENTS

Figure 1:
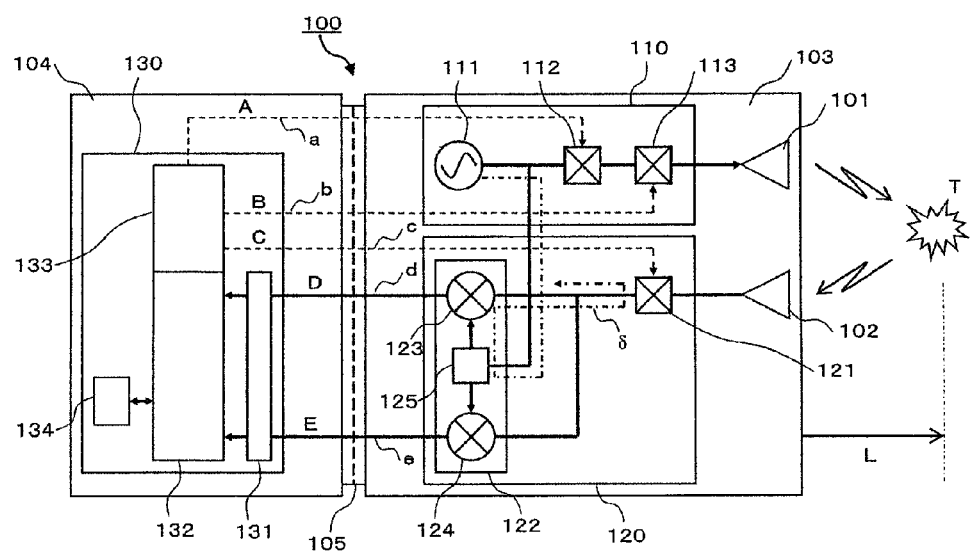
FIG. 1 is a block diagram showing a configuration of a pulse radar apparatus according to a first embodiment of the invention.

Preferred embodiments of a pulse radar apparatus, and a control method thereof, of the invention will be explained in detail below with reference to the drawings. It is noted that each component having the same or corresponding function will be described by denoting the same reference numeral to simplify the illustration and explanation.

First Embodiment

A pulse radar apparatus of a first embodiment comprises a high-frequency transmitting section having an oscillator that generates a carrier wave of a predetermined frequency and configured to generate a transmission signal by cutting out the carrier wave generated by the oscillator in pulses in accordance to two or more transmission control signals, a transmitting antenna configured to input the transmission signal from the high-frequency transmitting section to radiate to the air as radio wave, a receiving antenna configured to receive reflected waves of the radio wave radiated to the air and returned by being reflected by an object, and a high-frequency receiving section configured to input a received signal from the receiving antenna to down-convert to a baseband signal by correlating with the transmission signal in accordance to at least one receiving control signal. The pulse radar apparatus further comprises a baseband section including an A/D converting unit configured to input the baseband signal to convert into a digital signal, a digital signal processing unit configured to input the digital signal from the A/D converting unit to calculate a distance to the object and/or relative speed of the object and/or an azimuth angle of the object, and a control unit configured to output the transmission control signal to the high-frequency transmitting section and output at least one receiving control signal to the high-frequency receiving section.

Here, the transmission control signals described above are denoted as X1 through Xm (m≥2), and the digital signal outputted of the A/D converting unit, when the control unit does not output the $i^{-th}$ transmission control signal Xi among the transmission control signals and outputs the transmitting and receiving control signals except of the $i^{-th}$ signal, is denoted as an $i^{-th}$ background signal. The high-frequency transmitting section generates the transmission signal when the control unit outputs all of the m transmission control signals and radiates the transmission signal from the transmitting antenna. Due to that, when the control unit does not output the $i^{-th}$ transmission control signal Xi, the transmission signal is not radiated from the transmitting antenna. Then, the digital signal processing unit implements the following processes.

That is, the digital signal processing unit selects sequentially from transmission control signals X1 to Xm as the $i^{-th}$ transmission control signal Xi and acquires the digital signals output of the A/D converting unit when the control unit outputs the transmitting and receiving control signals, except of the transmission control signal Xi, respectively as the first through the $m^{-th}$ background signals. Still further, digital signal processing unit acquires the digital signals output of the A/D converting unit when the control unit outputs the receiving control signals without outputting any of the m transmission control signals as a $(m+1)^{-th}$ background signal. Then, the digital signal processing unit calculates a replica signal by dividing the background signals, obtained by adding the background signals from the first through the $m^{-th}$ background signals and by subtracting the $(m+1)^{-th}$ background signal, by (m−1).

When the replica signal is calculated, the control unit outputs the m transmission control signals and receiving control signals and the digital signal processing unit calculates a low-noise signal by subtracting the replica signal from the digital signal at this time to calculate the distance to the object and/or the relative speed of the object and/or the azimuth angle of the object based on the low-noise signal.

The digital signal processing unit may be configured so as to process the digital signal inputted from the A/D converting unit by Fourier transform. In this case, the digital signal processing unit calculates the low-noise signal described above by subtracting a Fourier component equivalent to 0 Hz of the replica signal from a Fourier component equivalent to 0 Hz of the digital signal output of the A/D converting unit when the control unit outputs the m transmission control signals and the receiving control signal.

In configuring the pulse radar apparatus, at least a baseband section may be formed on a first substrate and the high-frequency transmitting and receiving sections may be formed on a substrate different from the first substrate. In this case, a connecting section of a multi-pin connector for connecting signal lines for transmitting baseband signals and control lines for transmitting the m transmission control signals and receiving control signals collectively in an energized condition can be provided between the first substrate and the other substrate. At this time the signal lines are separated from the control lines as much as possible to isolate them from each other.

A method for controlling the pulse radar apparatus of the first embodiment comprises steps of generating a carrier wave of a predetermined frequency, cutting out the carrier wave in pulses in accordance to two or more transmission control signals to generate a transmission signal, radiating the transmission signal to the air as radio wave, receiving reflected waves of the radio wave radiated to the air and returned by being reflected by an object, correlating the received signal received in the receiving step with the transmission signal in accordance to at least one receiving control signal, down-converting an output signal of the correlating step to a baseband to output a baseband signal, A/D converting the inputted baseband signal into a digital signal, and processing the inputted digital signal to calculate a distance to the object and/or relative speed of the object and/or an azimuth angle of the object.

The digital signal processing step comprises steps of selecting sequentially from transmission control signals X1 to Xm as the $i^{-th}$ transmission control signal Xi, acquiring the digital signals acquired in the A/D converting step as first through $m^{-th}$ background signals when the transmission control signals, except of the transmission control signal Xi, and the receiving control signals are outputted respectively in the signal cutting-out step, acquiring the digital signal acquired in the A/D converting step as a $(m+1)^{-th}$ background signal when the receiving control signals are output without outputting any of the m transmission control signals in the signal cutting-out step, and calculating a replica signal by dividing the background signals, obtained by adding the background signals from the first through the $m^{-th}$ background signals and by subtracting the $(m+1)^{-th}$ background signal, by (m−1).

Upon calculating the replica signal, the digital signal processing step comprises steps of calculating a low-noise signal by subtracting the replica signal from the digital signal when The m transmission control signals and receiving control signals are output, and of calculating a distance to the object and/or a relative speed of the object and/or an azimuth angle of the object based on the low-noise signal.

The digital signal processing step may be adapted so as to process the digital signal converted in the A/D converting step by Fourier transform. In this case, the low-noise signal described above is calculated by subtracting a Fourier component equivalent to 0 Hz of the replica signal from a Fourier component equivalent to 0 Hz of the digital signal obtained in the A/D converting step when the m transmission control signals are output in the signal cutting out step and at least one of the receiving control signals is output in the correlating step.

The following explanation will be made by exemplifying a case when the control unit outputs two transmission control signals of first and second control signals and one receiving control signal of a third control signal. It is noted that although the two transmission control signals of the first and second control signals are used and one receiving control signal of the third control signal is used below for example, the invention is not limited to this arrangement.

The pulse radar apparatus of the first embodiment of the invention will be explained below with reference to FIG. 1. FIG. 1 is a block diagram showing a configuration of the pulse radar apparatus 100 of the present embodiment.

As shown in FIG. 1, the pulse radar apparatus 100 comprises a high-frequency transmitting section 110 and a high-frequency receiving section 120 that process high-frequency signals, a baseband section 130 that processes low-frequency signals, a transmitting antenna 101 for radiating radio wave to the space, and a receiving antenna 102 for receiving reflected wave reflected by the object. The pulse radar apparatus 100 detects the object T in the following explanation.

The high-frequency transmitting section 110 includes an oscillator 111, i.e., a source for generating the transmission signal of electromagnetic wave, that generates the predetermined high-frequency signal (carrier wave), and first and second gate units 112 and 113 that cut out the high-frequency signal generated by the oscillator 111 as pulse signals with a predetermined time width. The first and second gate units 112 and 113 are circuits configured to cut out a pulse signal of one [ns] width for example from the high-frequency signal input from the oscillator 111 for which a multiplier or a switch may be used. The use of the two signal cutting-out circuits of the first and second gate units 112 and 113 allows the sharply formed pulse signals to be generated. The pulsed transmission signal output of the second gate unit 113 is transmitted to the transmitting antenna 101 to be radiated to the air as radio wave.

The high-frequency receiving section 120 includes a correlator 121 that inputs the received signal received via the receiving antenna 102 to correlate with the transmission signal and an IQ mixer 122 that down-converts the signal inputted from the correlator 121 by the carrier wave inputted from the oscillator 111. The IQ mixer 122 has a first mixer 123 that down-converts to a baseband signal of I component, a second mixer 124 that down-converts to a baseband signal of Q component and a phase shifter 125 that outputs the carrier wave inputted from the oscillator 111 to the first mixer 123 and the second mixer 124 by adding a phase difference of 90 degrees. The correlator 121 takes out a signal per measured distance from the received signal and outputs this signal to the first and second mixers 123 and 124.

The baseband section 130 includes an A/D converting unit 131 that inputs the I and Q components of the baseband signal down-converted in the first and second mixers 123 and 124 to convert into digital signals, a digital signal processing unit 132 that processes the digital signal from the A/D converting unit 131 by fast Fourier transform (FFT) to calculate information on the object T, a control unit 133 that controls operations of the pulse radar apparatus 100, and a storage unit 134. The control unit 133 controls ON/OFF of respective power sources of the first and second gate units 112 and 113 and the correlator 121, i.e., high-frequency parts. The control signal generated by the control unit 133 is the signal having one [ns] width.

In the pulse radar apparatus 100 of the present embodiment configured as described above, while the respective parts composing the high-frequency transmitting section 110 and the high-frequency receiving section 120 operate with frequency of several tens GHz band, the respective parts composing the baseband section 130 operate with frequency of around 2 GHz at most. Since the operating frequency of the high-frequency transmitting and receiving sections 110 and 120 differs largely from the operating frequency of the baseband section 130, it is preferable to form those parts on separate substrates designed for the respective frequency bands.

Then, in the present embodiment, the high-frequency transmitting and receiving sections 110 and 120 are formed on a high-frequency substrate 103 and the baseband section 130 on a low-frequency substrate 104. The transmitting and receiving antennas 101 and 102 that transmits/receives the high-frequency signals are also disposed on the high-frequency substrate 103.

Since the substrate used for high-frequency is expensive as compared to the low-frequency substrate, only the high-frequency transmitting and receiving sections 110 and 120 and the transmitting and receiving antennas 101 and 102 are disposed on the expensive high-frequency substrate 103 and the baseband section 130 that processes the low-frequency signal is disposed on the inexpensive low-frequency substrate 104 in the present embodiment. With this arrangement, the cost of the pulse radar apparatus 100 can be reduced.

When the respective parts of the pulse radar apparatus 100 are disposed separately to the high-frequency substrate 103 and the low-frequency substrate 104 as described above, it becomes necessary to provide a means for electrically connecting the parts on the high-frequency substrate 103 with the parts on the low-frequency substrate 104.

A conventionally used inexpensive multi-pin connector 105 is used in the pulse radar apparatus 100 of the present embodiment. The control signals output of the control unit 133 on the low-frequency substrate 104 are transmitted to the high-frequency transmitting and receiving sections 110 and 120 via the connector 105. The baseband signals output of the high-frequency receiving section 120 on the high-frequency substrate 103 are transmitted to the baseband section 130 on the low-frequency substrate 104 also via the connector 105.

However, interference noise signals from the control signals are mixed into the baseband signal having the information on the object T if the control signals and the baseband signal are passed between the high-frequency substrate 103 and the low-frequency substrate 104 by using the conventional multi-pin connector 105 as described above. A self-mixing noise that is generated when the carrier wave output of the oscillator 111 passes through the IQ mixer 122, is reflected by the correlator 121 and is down-converted again by the IQ mixer 122 also mixes into the baseband signal. When the object T is located at a distant place, an amplitude level of a signal reflected from the object becomes small, so that there is a possibility that the signal is hidden by the interference noise signal and the self-mixing noise.

Then, the pulse radar apparatus 100 of the present embodiment is configured so that a replica signal of unwanted wave such as the noise mixed into the baseband signal passing through the connector 105 is prepared in advance and so that the replica signal is removed from the baseband signal in detecting the object T.

Figure 2:
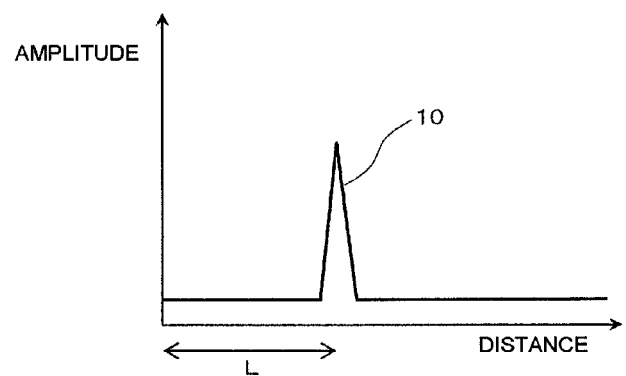
FIG. 2 is a temporal waveform chart of a signal when there is no influence of noise.
Figure 3:
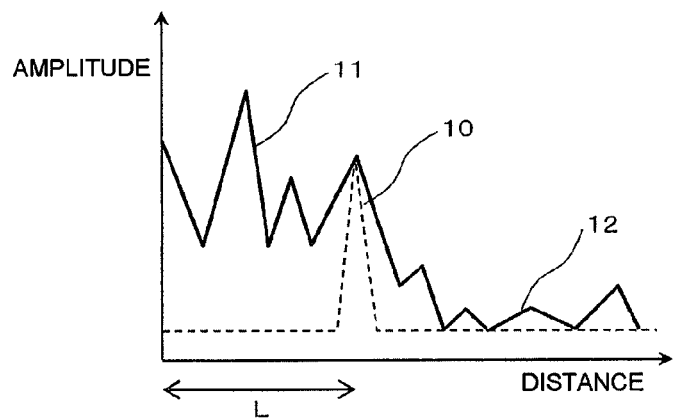
FIG. 3 is a temporal waveform chart of a signal into which an unwanted wave is mixed.

One exemplary replica signal of the unwanted wave will be explained with reference to FIGS. 2 and 3. FIG. 2 is a temporal waveform chart showing one exemplary signal 10 obtained by radiating the pulse signal generated in the high-frequency transmitting section 110 from the transmitting antenna 101 and by processing the digital signal of the reflected wave reflected by the object T and received by the receiving antenna 102 by the digital signal processing unit 132 (it is noted that an axis of abscissa indicates distance corresponding to time. The same applied to FIGS. 3 and 6 through 9 hereinafter). A waveform of the signal 10 shown in FIG. 2 indicates that there is no influence of noise. FIG. 3 is a temporal waveform chart of the signal 10 shown in FIG. 2 into which the signals of the unwanted waves described above are mixed. The signal 11 schematically indicates the interference noise signal mixed into the baseband signal in the connector 105 and the signal 12 schematically indicates the self-mixing noise.

According to the present embodiment, the replica signal of the unwanted wave in which the interference noise signal 11 and the self-mixing signal 12 shown in FIG. 3 are combined is prepared in advance and is stored in the storage unit 134. Then, when the pulse radar apparatus 100 is operated to detect the object T, the replica signal is subtracted from the signal input to the baseband section 130 via the connector 105 and processed by the digital signal processing unit 132 to acquire the signal (low-noise signal) as shown in FIG. 2. A method for preparing the replica signal described above in advance will be explained in detail below with reference to the drawings.

As shown in FIG. 1, the control signal (first control signal) output of the control unit 133 to the first gate unit 112 and the control line (first control line) that transmits the control signal are denoted respectively as the control signal A and the control line a, the control signal (second control signal) output of the control unit 133 to the second gate unit 113 and the control line (second control line) that transmits the control signal are denoted respectively as the control signal B and the control line b, and the control signal (third control signal) output of the control unit 133 to the correlator 121 and the control line (third control line) that transmits the control signal are denoted respectively as the control signal C and the control line c. The control signals A and B control ON/OFF of the power sources of the first and second gate units 112 and 113, respectively, and the control signal C controls ON/OFF of the power source of the correlator 121.

Because there are two transmission control signals of the first control signal A and the second control signal B for example in the present embodiment, two control lines of the first control line a and the second control line b are provided to transmit those signals. In the same manner, when there are m transmission control signals, m control lines are provided between the control unit 133 and the high-frequency transmitting section 110. Still further, as for the receiving control signal, only the third control line c is provided as the control line because there is one third control signal C in the present embodiment, the control lines corresponding to a number of the receiving control signals are provided between the control unit 133 and the high-frequency receiving section 120 when there are two or more receiving control signals.

Still further, the baseband signal (I component) output of the first mixer 123 of the IQ mixer 122 to the A/D converting unit 131 and the signal line that transmits the signal are denoted respectively as the baseband signal D and the signal line d and the baseband signal (Q component) output of the second mixer 124 to the A/D converting unit 131 and the signal line that transmits the signal are denoted respectively as the baseband signal E and the signal line e. All of the control lines a, b and c and the signal lines d and e pass through different pins of the connector 105.

When the control unit 133 outputs the control signals A and B to the first and second gate units 112 and 113 through the control lines a and b with adequate timing and their respective power sources are turned on for about one [ns], the carrier wave generated by the oscillator 111 is cut out with a pulse width of one [ns] in the pulse radar apparatus 100. Thereby, the transmission signal with one [ns] of pulse width of the carrier wave having predetermined frequency is generated and is sent to the transmitting antenna 101 to be radiated to the air as radio wave. The radiated radio wave is reflected by the object T located at position separated by a distance L and is received by the receiving antenna 102.

When the control unit 133 outputs the control signal C to the correlator 121 through the control line c with predetermined timing, the correlator 121 turns on and correlates the received signal received by the receiving antenna 102 with the transmission signal. The signal output of the correlator 121 is down-converted into the complex baseband signal by the IQ mixer 122. The respective baseband signals D and E down-converted by the first and second mixers 123 and 124 are input to the A/D converting unit 131 of the baseband section 130 through the signal lines d and e to be converted into the digital signal. The digital signal processing unit 132 implements complex signal processing on the digital signal to calculate information on position and relative speed of the object T.

The control lines a, b and c and the signal lines d and e shown in FIG. 1 are connected between the high-frequency substrate 103 and the low-frequency substrate 104 by the connector 105 as described above. Because each pin (terminal) of the connector 105 is naked, the signal flowing through each terminal leaks to another terminal and interferes the other signal even though it is a subtle level.

The control signals A, B and C flowing through the control lines a, b and c are the signals that drive ON/OFF of the RF parts (the first gate unit 112, the second gate unit 113 and the correlator 121) and have a level of about 2 to 3 [V] for example. In contrary, the baseband signals D and E flowing through the signal lines d and e are the signals produced by down-converting the low-level signal reflected from the object T and the signals whose level is very low. Due to that, as compared to the baseband signals D and E, the control signals A, B and C are relatively very high level signals and leak from the control lines a, b and c to the signal lines d and e in the connector 105.

Figure 4:
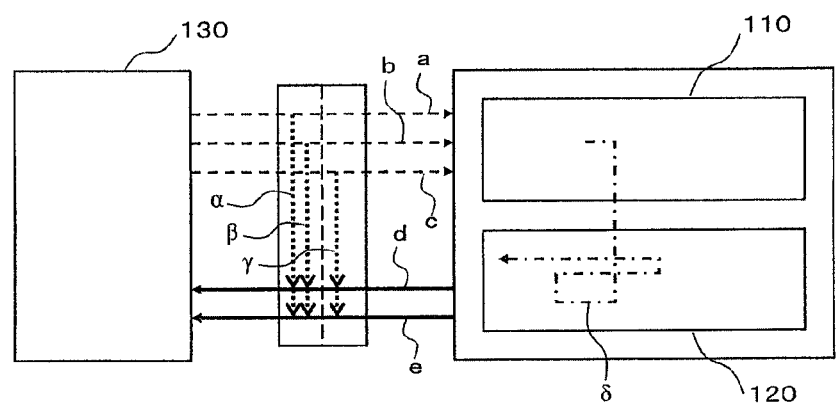
FIG. 4 is an enlarged schematic diagram of control lines and signal lines of the pulse radar apparatus of the first embodiment of the invention.

FIG. 4 is an enlarged schematic diagram of the control lines and signal lines described above in the pulse radar apparatus 100. As shown in FIG. 4, the signals leaked from the control lines a, b and c to the signal lines d and e are denoted respectively as interference noise signals $\alpha$, $\beta$ and $\gamma$. The interference noise signals $\alpha$, $\beta$ and $\gamma$ are signals almost in the same level with the baseband signals D and E passing through the signal lines d and e. FIG. 4 also shows the self-mixing noise $\delta$ that is output of the oscillator 111, passes through the IQ mixer 122, is reflected by the correlator 121 and is down-converted again by the IQ mixer 122. The self-mixing noise $\delta$ is also mixed into the baseband signals D and E.

In order to prepare the replica signal of the unwanted wave including each noise described above mixed into the baseband signals D and E, the first gate unit 112, the second gate unit 113 and the correlator 121 are operated with adequate timing via the control lines a, b and c on starting to use the pulse radar apparatus 100 of the present embodiment. Then, the replica signal of the unwanted wave obtained is stored in the storage unit 134 to remove the respective noises' by subtracting the replica signal from the baseband signals D and E down-converted from the received signal in detecting the object T.

Figure 5:
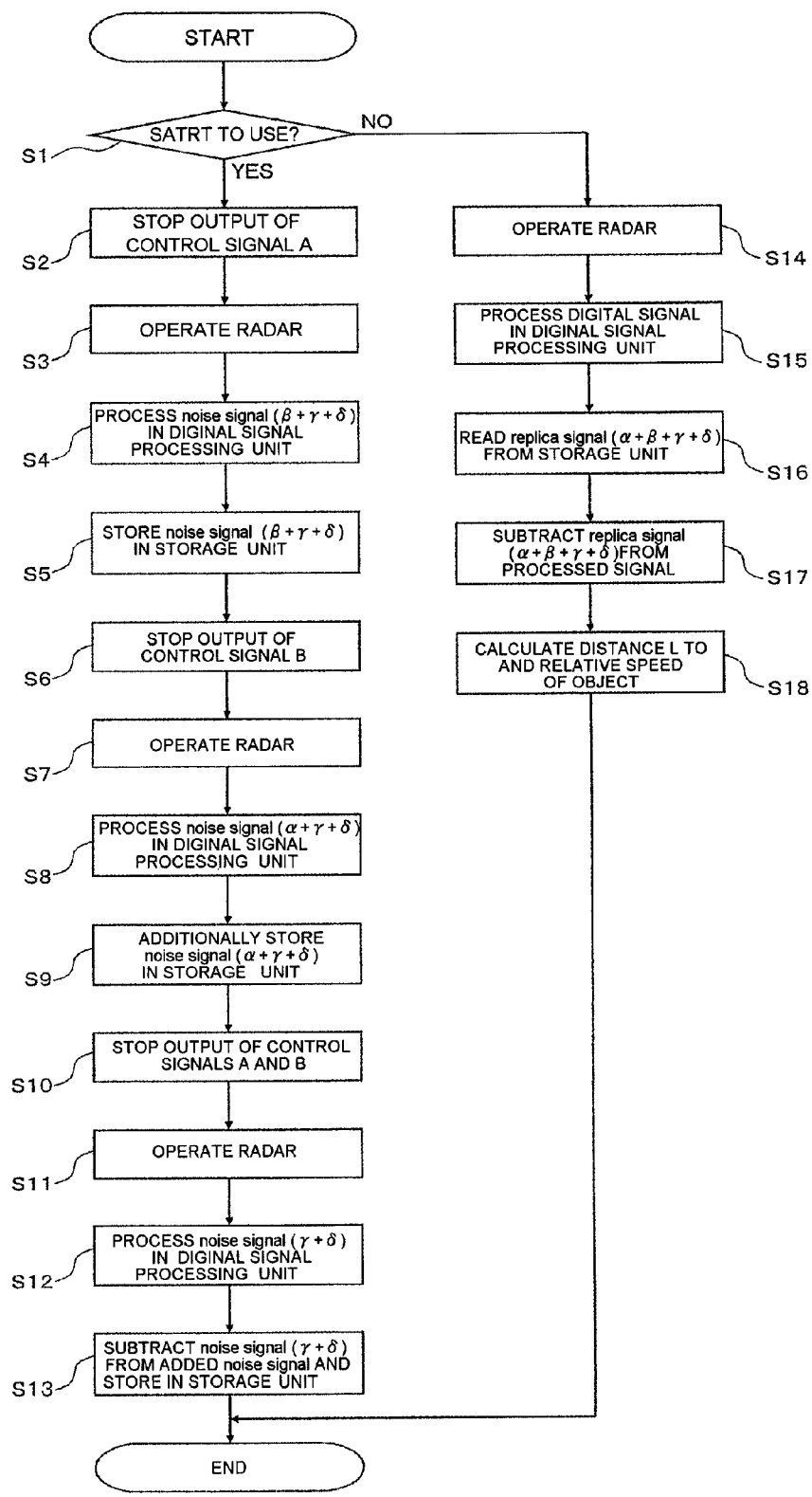
FIG. 5 is a flowchart illustrating a signal processing method implemented in the pulse radar apparatus of the first embodiment of the invention.

A method for preparing the replica signal of the unwanted wave in advance and for correcting the baseband signals by using the replica signal will be explained below with reference to FIG. 5. FIG. 5 is a flowchart illustrating the signal processing method implemented in the pulse radar apparatus 100 of the first embodiment.

When the transmitting radio wave is radiated to the air from the transmitting antenna 101 in preparing the replica signal of the unwanted wave, there is a possibility that the receiving antenna 102 receives the transmitted radio wave reflected by some other object. It becomes unable to prepare the replica signal of only the unwanted wave if the receiving antenna 102 receives such reflected wave. Then, the apparatus is arranged so that no transmitting radio wave is radiated from the transmitting antenna 101 in preparing the replica signal of the unwanted wave.

At first, it is judged whether or not the pulse radar apparatus 100 is started to be used in Step S1. When it is judged that the pulse radar apparatus 100 is started to be used in Step S1, the process advances to Step S2. When it is judged that the pulse radar apparatus 100 is already in operation, the process advances to Step S14.

In Step S2, the control unit 133 stops to output the control signal A that flows through the control line a while flowing the control signals B and C through the control lines b and c. Next, the radar is operated in Step S3. The pulse signal is output to the transmitting antenna 101 only when the power sources of the first and second gate units 112 and 113 are both turned on in the pulse radar apparatus 100. Due to that, if no control signal A is output to the first gate unit 112 when the radar is operated in Step S3, no pulse signal is output to the transmitting antenna 101. Thereby, the receiving antenna 102 also receives no reflected wave.

Figure 6:
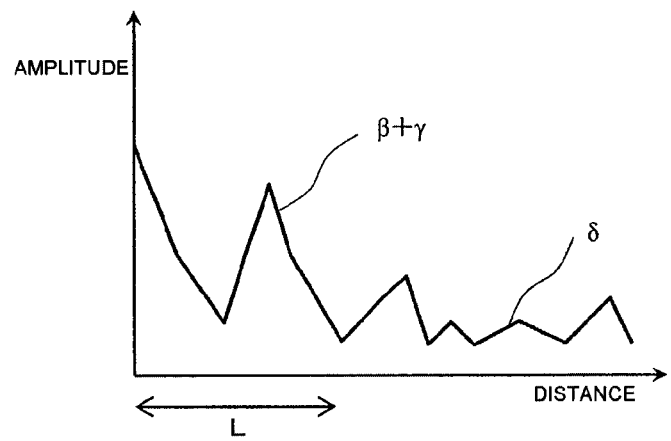
FIG. 6 is a temporal waveform chart of a noise signal when no control signal is outputted to a first gate unit of the pulse radar apparatus of the first embodiment of the invention.

As a result, a noise signal ($\beta+\gamma+\delta$) (first background signal) composed of the respective interference noise signals $\beta$ and $\gamma$ of the control signals B and C mixed into the signal lines d and e and the self-mixing noise $\delta$ is input to the digital signal processing unit 132. In Step S4, the digital signal processing unit 132 processes the noise signal ($\beta+\gamma+\delta$). Thereby, a noise signal as shown in FIG. 6 is obtained. FIG. 6 is a temporal waveform chart of the noise signal ($\beta+\gamma+\delta$). The noise signal ($\beta+\gamma+\delta$) processed in the digital signal processing unit 132 is stored in the storage unit 134 in Step S5.

In the next Step S6, the control unit 133 stops to output the control signal B flowing through the control line b while flowing the control signals A and C through the control lines a and c. Next, the radar is operated in Step S7. In this case, only the first gate unit 112 is turned on and the second gate unit 113 is not turned on, so that no pulse signal is output to the transmitting antenna 101. Thereby, the receiving antenna 102 also receives no reflected wave.

Figure 7:
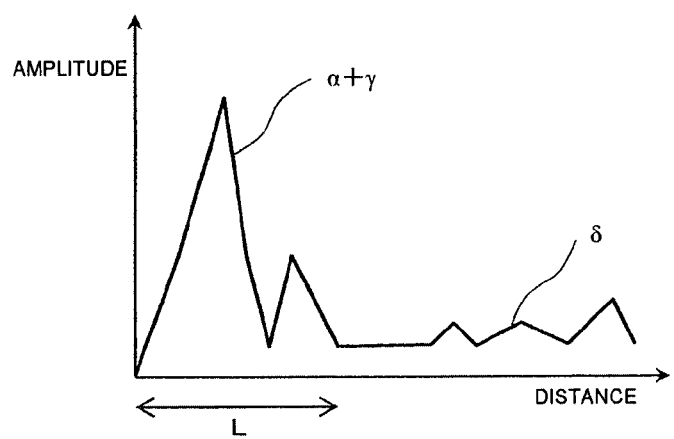
FIG. 7 is a temporal waveform chart of a noise signal when no control signal is outputted to a second gate unit of the pulse radar apparatus of the first embodiment of the invention.

As a result, a noise signal ($\alpha+\gamma\delta$) (second background signal) composed of the respective interference noise signals $\alpha$ and $\gamma$ of the control signals A and C mixed into the signal lines d and e and the self-mixing noise $\delta$ is input to the digital signal processing unit 132. In Step S8, the digital signal processing unit 132 processes the noise signal ($\alpha+\gamma+\delta$). Thereby, a noise signal as shown in FIG. 7 is obtained. FIG. 7 is a temporal waveform chart of the noise signal ($\alpha+\gamma+\delta$). The noise signal ($\alpha+\gamma+\delta$) obtained by processing in the digital signal processing unit 132 is stored in the storage unit 134 in addition to the noise signal ($\beta+\gamma+\delta$) already stored in Step S9.

In Step S10, the control unit 133 stops to output the control signals A and B flowing through the control lines a and b while flowing the control signal C through the control line c. Then, the radar is operated in Step S11. No pulse signal is output to the transmitting antenna 101 also in this case. Therefore, the receiving antenna 102 also receives no reflected wave.

Figure 8:
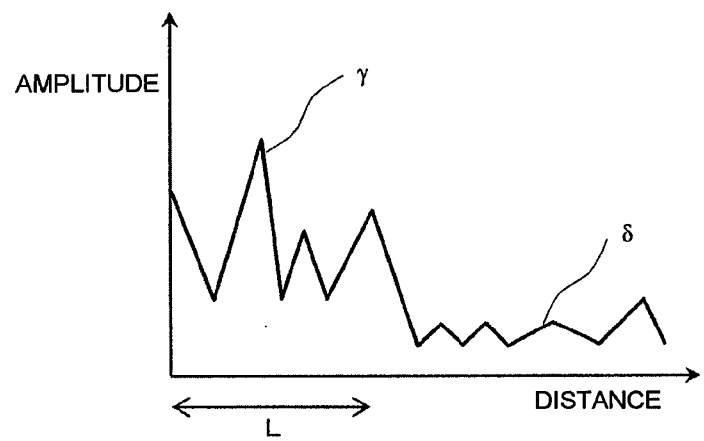
FIG. 8 is a temporal waveform chart of a noise signal when no control signal is outputted to the first and second gate units of the pulse radar apparatus of the first embodiment of the invention.

As a result, a noise signal ($\gamma+\delta$) (third background signal) composed of the interference noise signal $\gamma$ of the control signal C mixed into the signal lines d and e and the self-mixing noise $\delta$ is input to the digital signal processing unit 132. In Step S12, the digital signal processing unit 132 processes the noise signal ($\gamma+\delta$). Thereby, a noise signal as shown in FIG. 8 is obtained. FIG. 8 is a temporal waveform chart of the noise signal ($\gamma+\delta$). The noise signal ($\gamma+\delta$) obtained by processing in the digital signal processing unit 132 is stored in the storage unit 134 by subtracting from the noise signal already stored in Step S13.

A noise signal composed of all of the unwanted waves can be calculated by adding the noise signal ($\alpha+\gamma+\delta$) with the noise signal ($\beta+\gamma+\delta$) and by subtracting the noise signal ($\gamma+\delta$) from the added noise signal, as follows:

$$(\beta+\gamma+\delta)+(\alpha+\gamma+\delta)-(\gamma+\delta)=\alpha+\beta+\gamma+\delta$$

Figure 9:
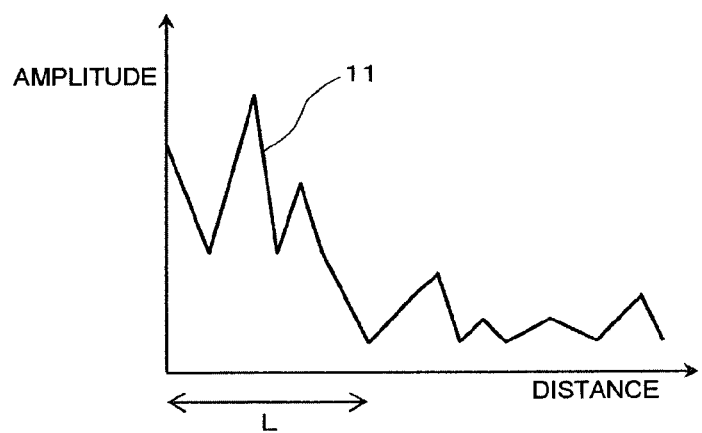
FIG. 9 is a temporal waveform chart of a replica signal created by the pulse radar apparatus of the first embodiment of the invention.

Thus, a replica signal ($\alpha+\beta+\gamma+\delta$) of the noise signal composed of the interference noise signals $\alpha$, $\beta$, $\gamma$ and the self-mixing noise $\delta$ is stored in the storage unit 134. A temporal waveform of the replica signal ($\alpha+\beta+\gamma+\delta$) can be obtained by adding the temporal waveform shown in FIG. 6 with the temporal waveform shown in FIG. 7 and by subtracting the temporal waveform shown in FIG. 8 from the added temporal waveform. FIG. 9 shows a temporal waveform of the replica signal ($\alpha+\beta+\gamma+\delta$).

When it is judged that the pulse radar apparatus 100 is already in operation in Step S1 on the other hand, the radar is operated in Step S14. Thereby, the control unit 133 outputs the control signals A, B and C to radiate the pulse signal as the radio wave from the transmitting antenna 101. Then, the receiving antenna 102 receives the reflected wave reflected by the object T.

The received signal received by the receiving antenna 102 is down-converted into the baseband signal in the high-frequency receiving section 120 and is transmitted to the A/D converting unit 131 via the connector 105. The baseband signal input to the A/D converting unit 131 is converted into the digital signal and is then transmitted to the digital signal processing unit 132.

The digital signal transmitted to the digital signal processing unit 132 includes the noise signal ($\alpha+\ominus+\gamma+\delta$) mixed in the connector 105 and others. The digital signal processing unit 132 processes the digital signal in Step S15. Thereby, the signal as shown in FIG. 3 in which the interference noise signal 11 and the self-mixing noise 12 are mixed into the signal 10 is obtained.

The replica signal ($\alpha+\beta+\gamma+\delta$) is read out of the storage unit 134 in Step S16 and the replica signal ($\alpha+\beta+\gamma+\delta$) is subtracted from the signal processed in the digital signal processing unit 132 in Step S17. Thereby, the signal 10 as shown in FIG. 2 can be obtained. The distance to and the relative speed of the object T are calculated based on this signal 10 in Step S18.

It is noted that the complex signal processing (FFT process) is implemented to the input signal in the present embodiment to calculate a Doppler component of the object to calculate the relative speed in the process of the digital signal processing unit 132. However, because the noise signals generated within the pulse radar apparatus 100 described above are all stationary noises, none of the noise signals $\alpha$, $\beta$, $\gamma$ and $\delta$ contain any Doppler component and contain only 0 [Hz] component equivalent to zero relative speed.

Thereby, the noise signal data obtained in the processes of the digital signal processing unit 132 implemented in Steps S4, S8 and S12 is only the noise signal containing the 0 [Hz] component equivalent to zero relative speed, and Fourier transform data of the replica signal ($\alpha+\beta+\gamma+\delta$) stored in the storage unit 134 in Step S13 is also the 0 [Hz] component equivalent to the zero relative speed. Accordingly, the replica signal ($\alpha+\beta+\gamma+\delta$) may be subtracted only from the 0 [Hz] component obtained by implementing the complex signal processing on the signal inputted from the A/D converting unit 131 in Step S17 described above.

When it is not necessary to measure the relative speed of the object, it is not necessary to implement the FFT processing in the digital signal processing unit 132 and it is possible to judge only whether or not the signal of the object is detected within each distance gate. It is also possible to implement the FFT processing in the digital signal processing unit 132 and to judge only whether or not the signal of the object is detected within each distance gate even when it is not necessary to measure the relative speed of the object to improve a SN ratio. Since it is possible to obtain the low-noise signal by subtracting the corresponding data of the distance gate of the replica signal ($\alpha+\beta+\gamma+\delta$) from the data of each distance gate obtained when the control unit 133 outputs the control signals A, B and C, it is possible to detect the object reliably based on the low-noise signal also in these cases.

Although the replica signal ($\alpha+\beta+\gamma+\delta$) is prepared on starting to use (in turning on) the pulse radar apparatus 100 in the flow chart shown in FIG. 5, the invention is not limited only to that and may be adapted to prepare the replica signal ($\alpha+\beta+\gamma+\delta$) periodically during the use of the pulse radar apparatus 100. That is, while there is a possibility that temperature rises within the pulse radar apparatus 100 during its use and the replica signal varies subtly for example, it is possible to improve the radar performance of the pulse radar apparatus 100 further by periodically updating the replica signal during the use of the pulse radar apparatus 100.

As described above, the pulse radar apparatus of the invention allows the information on the object to be detected in high precision by preparing the replica signal of the noise signal in advance and by removing the replica signal from the received signal. The pulse radar apparatus of the invention also enables to use the inexpensive low-frequency substrate for the baseband section whose operating frequency is low and to connect the low-frequency substrate with the high-frequency substrate by using the conventionally used general-purpose connector. Accordingly, the invention enables to provide the downsized and low-cost pulse radar apparatus.

Second Embodiment

Figure 10:
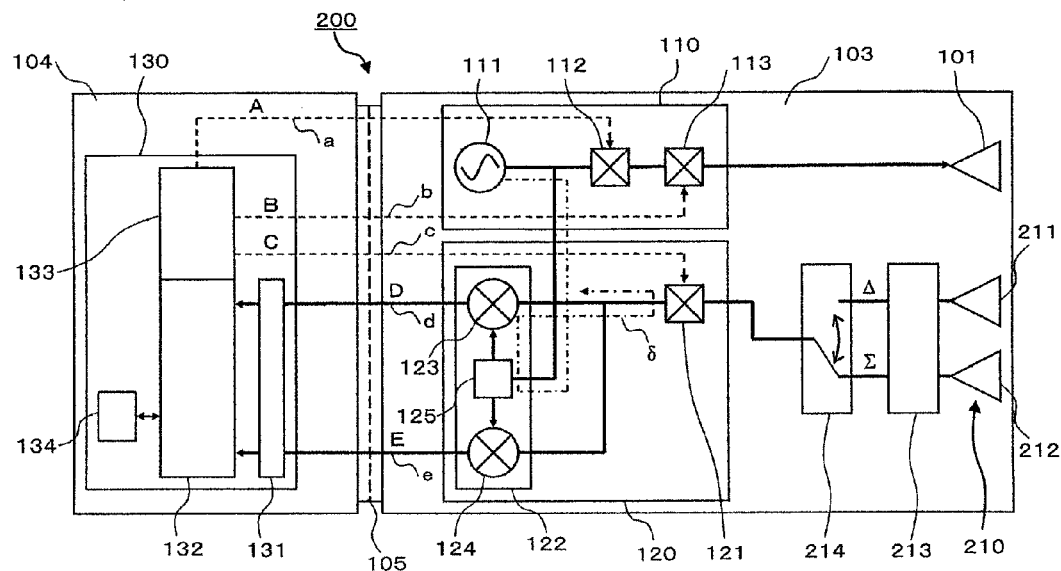
FIG. 10 is a block diagram showing a configuration of a pulse radar apparatus according to a second embodiment of the invention.

A pulse radar apparatus of a second embodiment of the invention will be explained below with reference to FIG. 10. FIG. 10 is a block diagram showing a configuration of the pulse radar apparatus 200 of the present embodiment. The pulse radar apparatus 200 of the present embodiment has two antennas of first and second antennas 211 and 212 as a receiving antenna 210 to measure an azimuth angle of the object T (angle measurement) by a phase monopulse system. Received signals of the first and second antennas 211 and 212 are input to a hybrid circuit 213, are converted into two received signals of a sum signal (denoted as $\Sigma$) and a differential signal (denoted as $\Delta$) and are output to a switcher 214.

The present embodiment is arranged so that processing of the sum and differential signals of the high-frequency receiving section 120 and the baseband section 130 is carried out by selectively switching by the switcher 214. Because the switcher 214 switches the sum signal and differential signal fully quickly as compared to relative move of the object T, it is possible to detect the azimuth angle of the object T in high precision by using the sum and differential signals detected by alternately switching them. The present embodiment allows the angle measurement to be implemented by the monopulse system without changing the configuration of the high-frequency receiving section 120 and the baseband section 130 and the downsized and low-cost pulse radar apparatus 200 to be provided.

Third Embodiment

According to a pulse radar apparatus of a third embodiment, the high-frequency receiving section outputs a complex baseband signal composed of I and Q components as the baseband signal. Then, the baseband section is provided with a complex signal amplifier configured to input the complex baseband signal from the high-frequency receiving section and to amplify the I and Q components respectively to pre-determined levels in parallel. The A/D converting unit is a complex A/D converting unit that is configured to input the I and Q components amplified by the complex signal amplifier to convert into complex digital signals in parallel. That is, the digital signal output of the complex A/D converting unit is a complex digital signal.

It is noted that when the complex baseband signal has signal strength lower than that of the m transmission control signals and the receiving control signal, it is preferable to dispose the complex signal amplifier separately from the control lines that transmit the m transmission control signals and the receiving control signal, respectively.

By configuring as described above, the first through $(m+1)^{-th}$ background signals become complex digital signals in the present embodiment. Then, the digital signal processing unit calculates I and Q components of a replica signal by mutually adding the I and Q components of the respective first through $m^{-th}$ background signals, by subtracting the I and Q components of the $(m+1)^{-th}$ background signal and by dividing the subtracted components respectively by $(m-1)$. Still more, the digital signal processing unit calculate a gain correction value by dividing either one of an integrated value in a distance gate direction of the I component of the replica signal and an integrated value in the distance gate direction of the Q component by the other.

When the digital signal processing unit calculates the replica signal and the gain correction value, the control unit outputs the m transmission control signals and the receiving control signal. The digital signal processing unit subtracts the I and Q components of the replica signal described above respectively from the I and Q components of the complex digital signal at that time and multiplies the gain correction value with the I or Q component of the complex digital signal after the subtraction to calculate a low-noise signal.

Still further, in a method for controlling the pulse radar apparatus of the third embodiment, the complex baseband signal composed of the I and Q components is output as the baseband signal in a down-converting step. Then, the method is provided additionally with a complex signal amplifying step of inputting the complex baseband signal and amplifying the I and Q components respectively to the predetermined levels in parallel. In the A/D converting step, the I and Q components amplified in the complex signal amplifying step are input to be converted into complex digital signals in parallel and to be output as the digital signals.

In the digital signal processing step, the I and Q components of the replica signal is calculated by dividing the components obtained by mutually adding the respective I and Q components of the first through $m^{th}$ background signals and by subtracting the I and Q components of the (m+1) background signal respectively by (m−1).

Still further, the gain correction value is calculated by dividing either one of the integrated value in the distance gate direction of the I component and the integrated value in the distance gate direction of the Q component of the replica signal by the other.

When the replica signal and the gain correction value are calculated, the control unit outputs the m transmission control signals and the receiving control signal. The I and Q components of the replica signal described above are subtracted respectively from the I and Q components of the complex digital signal at that time and the gain correction value is multiplied with the I or Q component of the complex digital signal after the subtraction to calculate the low-noise signal.

The following explanation will be made by exemplifying a case when the control unit outputs two transmission control signals of first and second control signals and one receiving control signal of a third control signal. It is noted that although the two transmission control signals of the first and second control signals are used and one receiving control signal of the third control signal is used below for example, the invention is not limited to this arrangement.

Figure 11:
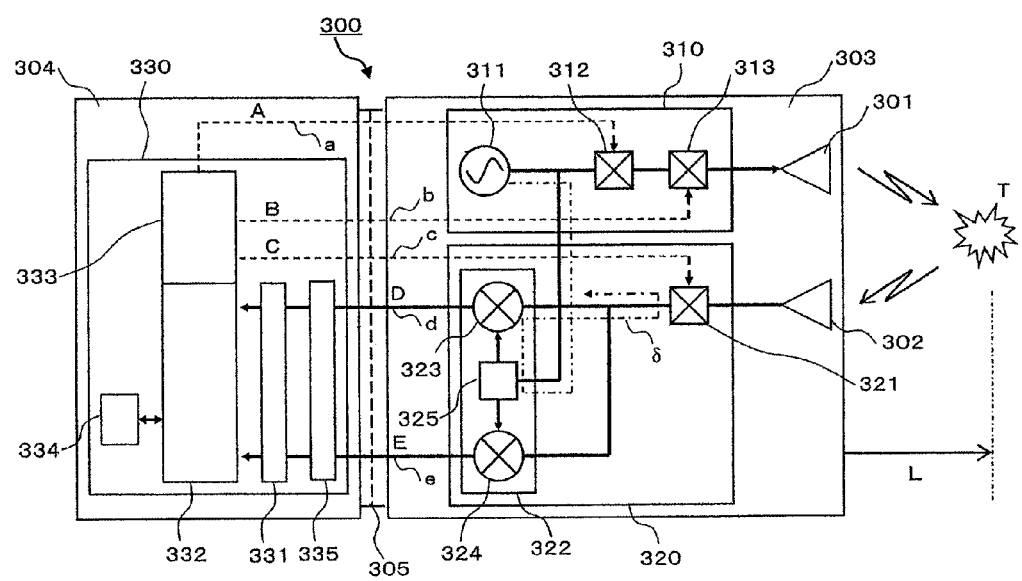
FIG. 11 is a block diagram showing a configuration of a pulse radar apparatus according to a third embodiment of the invention.

The pulse radar apparatus of the third embodiment of the invention will be explained below with reference to FIG. 11. FIG. 11 is a block diagram showing a configuration of the pulse radar apparatus 300 of the present embodiment.

As shown in FIG. 11, the pulse radar apparatus 300 comprises a high-frequency transmitting section 310 and a high-frequency receiving section 320 that process high-frequency signals, a baseband section 330 that processes low-frequency signals, a transmitting antenna 301 for radiating radio wave to the space, and a receiving antenna 302 for receiving reflected wave reflected by the object. The pulse radar apparatus 300 detects the object T in the following explanation.

The high-frequency transmitting section 310 includes an oscillator 311, i.e., a source for generating the transmission signal of electromagnetic wave, that generates the predetermined high-frequency signal (carrier wave), and first and second gate units 312 and 313 that cut out the high-frequency signal generated by the oscillator 311 as pulse signals with a predetermined time width. The first and second gate units 312 and 313 are circuits configured to cut out a pulse signal of one [ns] width for example from the high-frequency signal input from the oscillator 311 for which a multiplier or a switch may be used. The use of the two signal cutting-out circuits of the first and second gate units 312 and 313 allows the sharply formed pulse signals to be generated. The pulsed transmission signal output of the second gate unit 313 is transmitted to the transmitting antenna 301 to be radiated to the air as radio wave.

The high-frequency receiving section 320 includes a correlator 321 that inputs the received signal received via the receiving antenna 302 to correlate with the transmission signal and a quadrature down-converting unit 322 that down-converts the signal inputted from the correlator 321 by the carrier wave inputted from the oscillator 311. The quadrature down-converting unit 322 has a first mixer 323 that down-converts to a baseband signal of I phase, a second mixer 324 that down-converts to a baseband signal of Q phase, and a phase shifter 325 that outputs the carrier wave inputted from the oscillator 311 to the first and second mixers 323 and 324 by adding a phase difference of 90 degrees. The correlator 321 takes out a signal per measured distance from the received signal and outputs this signal to the first and second mixers 323 and 324.

The baseband section 330 includes a complex signal amplifier 335 that inputs the I and Q components of the baseband signal down-converted in the first and second mixers 323 and 324 to amplify to predetermined levels in parallel, a complex A/D converting unit 331 that inputs the I and Q components amplified by the complex signal amplifier 335 to convert into complex digital signal in parallel, a digital signal processing unit 332 that processes the complex digital signal from the A/D converting unit 331 by fast Fourier transform (FFT) to calculate information on the object T, a control unit 333 that controls operations of the pulse radar apparatus 300, and a storage unit 334. The control unit 333 controls ON/OFF of respective power sources of the first and second gate units 312 and 313 and the correlator 321, i.e., high-frequency parts. The control signal generated by the control unit 333 is a signal having one [ns] width.

In the pulse radar apparatus 300 of the present embodiment configured as described above, while the respective parts composing the high-frequency transmitting and receiving sections 310 and 320 operate with frequency of several tens GHz band, the respective parts composing the baseband section 330 operate with frequency of around 2 GHz at most. Since the operating frequency of the high-frequency transmitting and receiving sections 310 and 320 differs largely from the operating frequency of the baseband section 330, it is preferable to form those parts on separate substrates designed for the respective frequency bands.

Then, in the present embodiment, the high-frequency transmitting and receiving sections 310 and 320 are formed on a high-frequency substrate 303 and the baseband section 330 on a low-frequency substrate 304. The transmitting and receiving antennas 301 and 302 that transmits/receives the high-frequency signals are also disposed on the high-frequency substrate 303.

Since the substrate used for high-frequency is expensive as compared to the low-frequency substrate, only the high-frequency transmitting and receiving sections 310 and 320 and the transmitting and receiving antennas 301 and 302 are disposed on the expensive high-frequency substrate 303 and the baseband section 330 that processes the low-frequency signal is disposed on the low-frequency substrate 304 in the present embodiment. With this arrangement, the cost of the pulse radar apparatus 300 can be reduced.

When the respective parts of the pulse radar apparatus 300 are disposed separately to the high-frequency substrate 303 and the low-frequency substrate 304 as described above, it becomes necessary to provide a means for electrically connecting the parts on the high-frequency substrate 303 with the parts on the low-frequency substrate 304.

A conventionally used inexpensive multi-pin connector 305 is used in the pulse radar apparatus 300 of the present embodiment. The control signals output of the control unit 333 on the low-frequency substrate 304 are transmitted to the high-frequency transmitting and receiving sections 310 and 320 via the connector 305. The complex baseband signals output of the high-frequency receiving section 320 on the high-frequency substrate 303 are transmitted to the baseband section 330 on the low-frequency substrate 304 also via the connector 305.

In order to calculate the information on the object T by processing the complex signal in the digital signal processing unit 332 in the pulse radar apparatus 300 of the present embodiment, the complex signal amplifier 335 inputs the complex baseband signal from the high-frequency receiving section 320 and amplifies the I component (amplitude value) and the Q component (amplitude value) thereof in parallel. Then, the complex A/D converting unit 331 samples them in parallel to convert into complex digital signal to be inputted to the digital signal processing unit 332.

However, there is a problem in the process of such signal processing that the gains amplified by the complex signal amplifier 335 and the sampling values taken by the complex A/D converting unit 331 are not equal between the I and Q components. This is caused by an individual difference of an I phase side apparatus and a Q phase side apparatus. If such individual difference is generated, a considerable error is produced in the measurements of the azimuth, distance and relative speed of the object T.

Still further, interference noise signals from the control signals are mixed into the complex baseband signal having the information on the object T because the high-frequency substrate 303 is electrically connected with the low-frequency substrate 304 by using the conventional multi-pin connector 305 in the pulse radar apparatus 300 of the present embodiment. There is also a problem that a self-mixing noise that is generated when the carrier wave output of the oscillator 311 passes through the quadrature down-converting unit 322, is reflected by the correlator 321 and is down-converted again by the quadrature down-converting unit 322 also mixes into the complex baseband signal. When the object T is located at a distant place, an amplitude level of a signal reflected from the object becomes small, so that there is a possibility that the signal is hidden by the interference noise signal and the self-mixing noise.

Then, the pulse radar apparatus 300 of the present embodiment is configured so that a replica signal of unwanted wave such as the noises mixed into the complex baseband signal passing through the connector 305 is prepared respectively for the I and Q components in advance and so as to calculate a gain correction value that corrects a difference of gains between the I and Q components by using the replica signal in advance.

The gain correction value calculated here corrects the difference of gains in the complex signal amplifier 335 and a difference of sampling values in the complex A/D converting unit 331 together. Then, the replica signal of the unwanted wave is removed from the complex baseband signal and the difference of gains between the I and Q components is corrected by using the gain correction value in detecting the object T.

It is noted that the pulse radar apparatus 300 of the present embodiment is arranged so that the interference noise signal mixed into the complex baseband signal from the control signal stays in an adequate level in order to be able to adequately calculate the gain correction value from the I and Q components of the replica signal. That is, the level of the interference noise signal is adjusted by adequately selecting a pin within the connector 305 through which the complex baseband signal passes and a pin through which the control signal passes so that the output of the complex signal amplifier 335 stays in the level not exceeding an observation range of the complex A/D converting unit 331 when the replica signal is amplified by the complex signal amplifier 335 and is input to the complex A/D converting unit 331.

Figure 12:
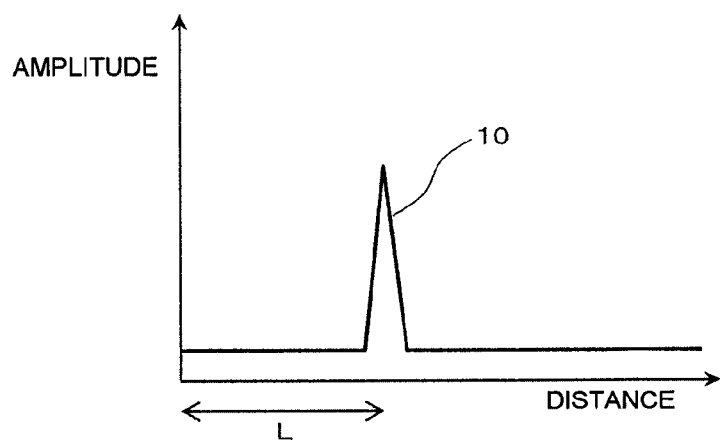
FIG. 12 is a temporal waveform chart of a signal when there is no influence of noise.
Figure 13:
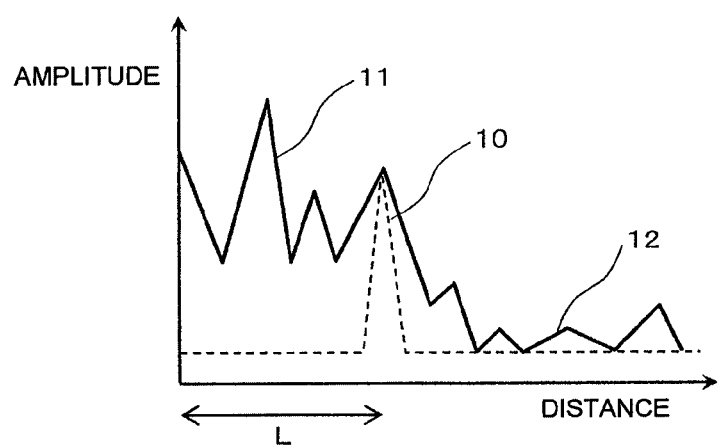
FIG. 13 is a temporal waveform chart of a signal into which an unwanted wave is mixed.

One exemplary replica signal of the unwanted wave will be explained with reference to FIGS. 12 and 13. The replica signal of the unwanted wave explained below is prepared for each of the I and Q components. FIG. 12 is a temporal waveform chart showing one exemplary signal 10 obtained by radiating the pulse signal generated in the high-frequency transmitting section 310 from the transmitting antenna 301 and by processing the digital signal of the reflected wave reflected by the object T and received by the receiving antenna 302 by the digital signal processing unit 332 (it is noted that an axis of abscissa represents distance corresponding to time. The same applied to FIGS. 13 and 16 through 19 hereinafter). A waveform of the signal 10 shown in FIG. 12 indicates that there is no influence of noise. FIG. 13 is a temporal waveform chart of the signal 10 shown in FIG. 12 into which the signals of the unwanted waves described above are mixed. The signal 11 schematically indicates the interference noise signal mixed into the complex baseband signal in the connector 305 and the signal 12 schematically indicates the self-mixing noise. The interference noise signal 11 and the self-mixing noise 12 shown in FIG. 13 are detected respectively in the I and Q components.

According to the present embodiment, the replica signal of the unwanted wave in which the interference noise signal 11 and the self-mixing signal 12 shown in FIG. 13 are combined is prepared in advance for the I and Q components and is stored in the storage unit 334. Still further, the gain correction value is calculated in advance from the prepared replica signal of the I and Q components and is stored in the storage unit 334.

Then, when the pulse radar apparatus 300 is operative to detect the object T, the replica signal is subtracted from the signal input to the baseband section 330 via the connector 305 and processed by the digital signal processing unit 332. Furthermore, the difference of gains between the I and Q components is corrected by the gain correction value. Thereby, it is possible to acquire the signal (low-noise signal) as shown in FIG. 12. A method for preparing the replica signal and the gain correction value described above in advance will be explained in detail below with reference to the drawings.

As shown in FIG. 11, the control signal (first control signal) output of the control unit 333 to the first gate unit 312 and the control line (first control line) that transmits the control signal are denoted respectively as the control signal A and the control line a, the control signal (second control signal) output of the control unit 333 to the second gate unit 313 and the control line (second control line) that transmits the control signal are denoted respectively as the control signal B and the control line b, and the control signal (third control signal) output of the control unit 333 to the correlator 321 and the control line (third control line) that transmits the control signal are denoted respectively as the control signal C and the control line c. The control signals A and B control ON/OFF of the power sources of the first and second gate units 312 and 313, respectively, and the control signal C controls ON/OFF of the power source of the correlator 321.

Still further, the baseband signal (I component) output of the first mixer 323 of the quadrature down-converting unit 322 to the complex signal amplifier 335 and the signal line that transmits the signal are denoted respectively as the baseband signal D and the signal line d and the baseband signal (Q component) output of the second mixer 324 to the complex signal amplifier 335 and the signal line that transmits the signal are denoted respectively as the baseband signal E and the signal line e. All of the control lines a, b and c and the signal lines d and e pass through different pins of the connector 305.

When the control unit 333 outputs the control signals A and B to the first and second gate units 312 and 313 through the control lines a and b with adequate timing and their respective power sources are turned on for about one [ns], the carrier wave generated by the oscillator 311 is cut out with a pulse width of one [ns] in the pulse radar apparatus 300. Thereby, the transmission signal with one [ns] of pulse width of the carrier wave having predetermined frequency is generated and is sent to the transmitting antenna 301 to be radiated to the air as radio wave. The radiated radio wave is reflected by the object T located at position separated by a distance L and is received by the receiving antenna 302.

When the control unit 333 outputs the control signal C to the correlator 321 through the control line c with predetermined timing, the correlator 321 turns on and correlates the received signal received by the receiving antenna 302 with the transmission signal. The signal output of the correlator 321 is down-converted into the complex baseband signal composed of I and Q components by the quadrature down-converting unit 322. The respective baseband signals D and E of the I and Q components down-converted by the first and second mixers 323 and 324 are input to the complex signal amplifier 335 of the baseband section 330 through the signal lines d and e to be amplified up to predetermined level in parallel. The baseband signal of the I and Q components amplified by the complex signal amplifier 335 is input to the complex A/D converting unit 331 to be converted into the complex digital signal in parallel. The digital signal processing unit 332 implements complex signal processing on the complex digital signal to calculate information on position and relative speed of the object T.

The control lines a, b and c and the signal lines d and e shown in FIG. 11 are connected between the high-frequency substrate 303 and the low-frequency substrate 304 by the connector 305. Because each pin (terminal) of the connector 305 is naked, the signal flowing through each terminal leaks to another terminal and interferes the other signal even though it is a subtle level.

The control signals A, B and C flowing through the control lines a, b and c are the signals that drive ON/OFF of the RF parts (the first gate unit 312, the second gate unit 313 and the correlator 321) and have a level of about 2 to 3 [V] for example. In contrary, the baseband signals D and E flowing through the signal lines d and e are the signals produced by down-converting the low-level signal reflected from the object T and the signals whose level is very low. Due to that, as compared to the baseband signals D and E, the control signals A, B and C are relatively very high level signals and leak from the control lines a, b and c to the signal lines d and e in the connector 305.

Figure 14:
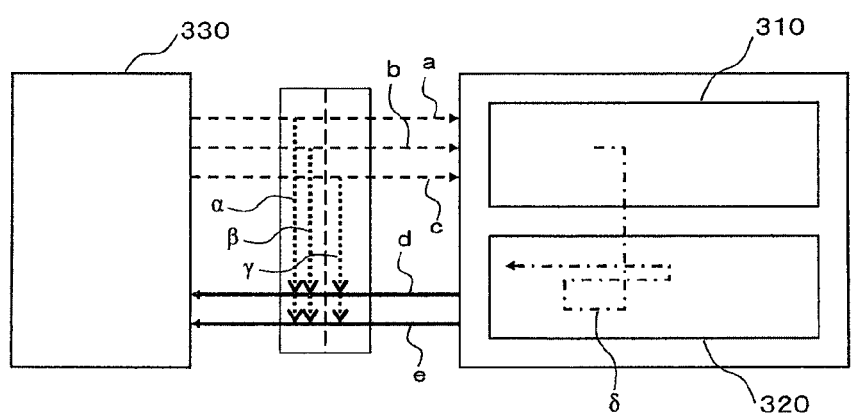
FIG. 14 is an enlarged view of control lines and signal lines of the pulse radar apparatus of the third embodiment of the invention.

FIG. 14 is an enlarged schematic diagram of the control lines and signal lines described above in the pulse radar apparatus 300. As shown in FIG. 14, the signals leaked from the control lines a, b and c to the signal lines d and e are denoted respectively as interference noise signals α, β and γ. The interference noise signals α, β and γ are signals almost in the same level with the baseband signals D and E passing through the signal lines d and e. FIG. 14 also shows the self-mixing noise δ that is output of the oscillator 311, passes through the quadrature down-converting unit 322, is reflected by the correlator 321 and is down-converted again by the quadrature down-converting unit 322. The self-mixing noise δ is also mixed into the baseband signals D and E.

In order to prepare the I and Q components of the replica signal of the unwanted wave including each noise described above mixed into the baseband signals D and E, the first gate unit 312, the second gate unit 313 and the correlator 321 are operated with adequate timing via the control lines a, b and c on starting to use the pulse radar apparatus 300 of the present embodiment. Then, the gain correction value is calculated from the integrated value in the distance gate direction of the I component (envelope level of the I component) and the integrated value in the distance gate direction of the Q component (envelope level of the Q component) from the obtained I and Q components of the replica signal. The obtained replica signal and the gain correction value are stored in the storage unit 334. In detecting the object T, the I and Q components of the replica signal are subtracted respectively from the baseband signals D and E down-converted from the received signal to remove the respective noises and the correction is made by the gain correction value.

Figure 15:
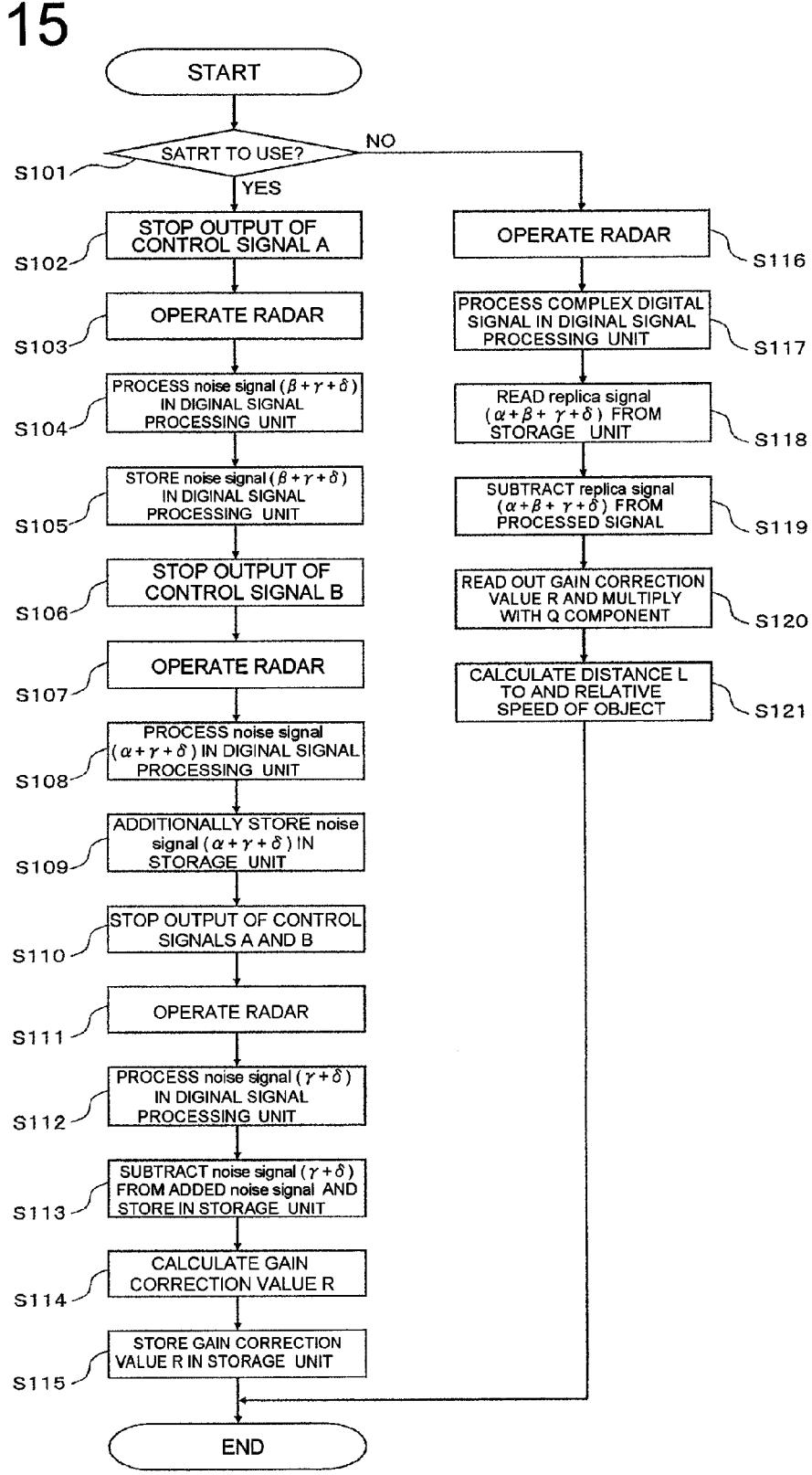
FIG. 15 is a flowchart illustrating a signal processing method implemented by the pulse radar apparatus of the third embodiment of the invention.

A method for preparing the replica signal of the unwanted wave and the gain correction value in advance and for correcting the baseband signals by using them will be explained below with reference to FIG. 15. FIG. 15 is a flowchart illustrating the signal processing method implemented in the pulse radar apparatus 300.

When the transmitting radio wave is radiated from the transmitting antenna 301 to the air in calculating the replica signal of the unwanted wave and the gain correction value, there is a possibility that the receiving antenna 302 receives the transmitted radio wave reflected by some other object. It becomes unable to prepare the replica signal of only the unwanted wave if the receiving antenna 302 receives such reflected wave. Then, the apparatus is arranged so that no transmitting radio wave is radiated from the transmitting antenna 301 in calculating the replica signal of the unwanted wave and the gain correction value.

At first, it is judged whether or not the pulse radar apparatus 300 is started to be used in Step S101. When it is judged that the pulse radar apparatus 300 is started to be used, the process advances to Step S102. When it is judged that the pulse radar apparatus 300 is already in operation, the process advances to Step S116.

In Step S102, the control unit 333 stops to output the control signal A that flows through the control line a while flowing the control signals B and C through the control lines b and c. Next, the radar is operated in Step S103. Thereby, the control signals B and C are output of the control unit 333. The pulse signal is output to the transmitting antenna 301 only when the power sources of the first and second gate units 312 and 313 are both turned on in the pulse radar apparatus 300. Due to that, if no control signal A is output to the first gate unit 312 when the radar is operated in Step S103, no pulse signal is output to the transmitting antenna 301. Thereby, the receiving antenna 302 also receives no reflected wave.

Figure 16:
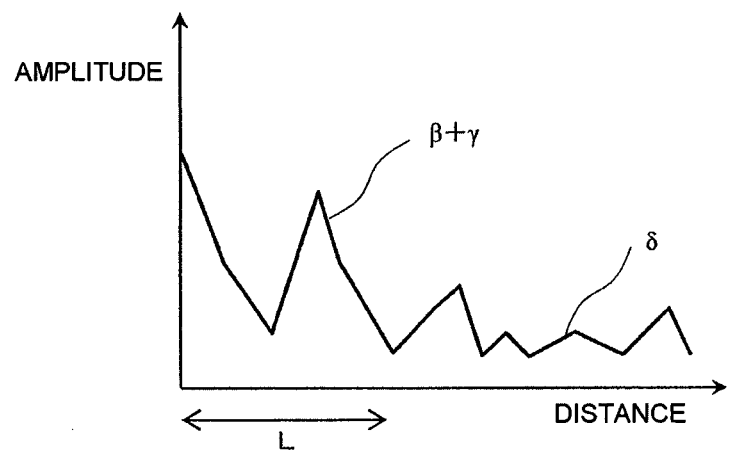
FIG. 16 is a temporal waveform chart of a noise signal when no control signal is outputted to a first gate unit of the pulse radar apparatus of the third embodiment of the invention.

As a result, I and Q components of a noise signal (β+γ+δ) (first background signal) composed of the respective interference noise signals β and γ of the control signals B and C mixed into the signal lines d and e and the self-mixing noise δ are input to the complex signal amplifier 335. The I and Q components of the noise signal (β+γ+δ) are amplified by the complex signal amplifier 335 and are then converted into a complex digital signal by the complex A/D converting unit 331 to be input to the digital signal processing unit 332. In Step S104, the digital signal processing unit 332 processes the noise signal (β+γδ). Thereby, a noise signal as shown in FIG. 16 is obtained respectively for the I and Q phases. FIG. 16 is a temporal waveform chart of the noise signal (β+γ+δ). The I and Q components of the noise signal (β+γ+δ) obtained by processing in the digital signal processing unit 332 are stored in the storage unit 334 in Step S105.

In the next Step S106, the control unit 333 stops to output the control signal B that flows through the control line b while flowing the control signals A and C through the control lines a and c. Next, when the radar is operated in Step S107, the control signals A and C are output of the control unit 333. In this case, only the first gate unit 312 is turned on and the second gate unit 313 is not turned on, so that no pulse signal is output to the transmitting antenna 301. Thereby, the receiving antenna 302 also receives no reflected wave.

Figure 17:
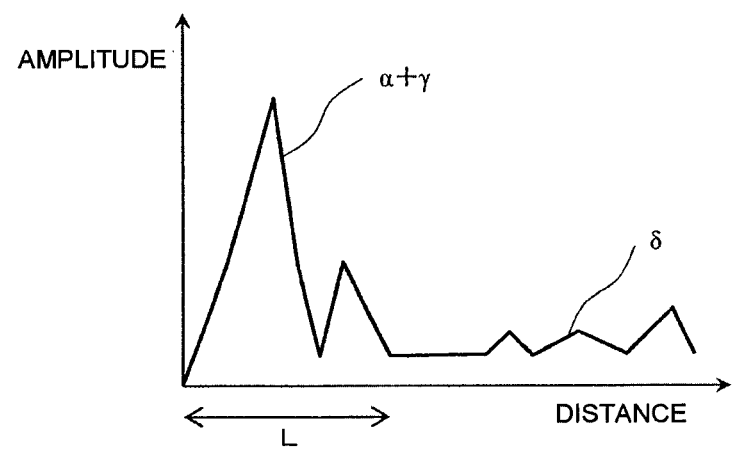
FIG. 17 is a temporal waveform chart of a noise signal when no control signal is outputted to a second gate unit of the pulse radar apparatus of the third embodiment of the invention.

As a result, I and Q components of a noise signal (α+γ+δ) (second background signal) composed of the respective interference noise signals α and γ of the control signals A and C mixed into the signal lines d and e and the self-mixing noise δ are amplified by the complex signal amplifier 335 and are then converted into a complex digital signal by the complex A/D converting unit 331 to be input to the digital signal processing unit 332. In Step S108, the digital signal processing unit 332 processes the noise signal (α+γ+δ). Thereby, a noise signal as shown in FIG. 17 is obtained respectively for the I and Q phases. FIG. 17 is a temporal waveform chart of the noise signal (α+γ+δ). The I and Q components of the noise signal (α+γ+δ) obtained by processing in the digital signal processing unit 332 are stored in the storage unit 334 in addition respectively to the I and Q components of the noise signal (β+γ+δ) in Step S109.

Further in Step S110, the control unit 333 stops to output the control signals A and B that flow through the control lines a and b while flowing the control signal C through the control line c. Then, when the radar is operated in Step S111, only the control signal C is output of the control unit 333. No pulse signal is output to the transmitting antenna 301 also in this case. Therefore, the receiving antenna 302 also receives no reflected wave.

Figure 18:
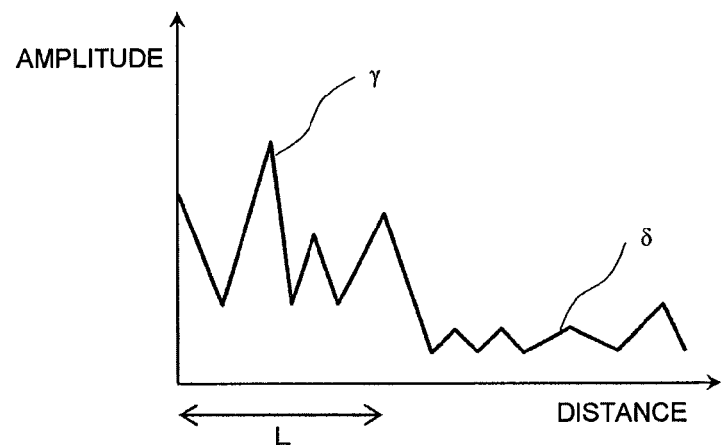
FIG. 18 is a temporal waveform chart of a noise signal when no control signal is outputted to the first and second gate units of the pulse radar apparatus of the third embodiment of the invention.

As a result, I and Q components of a noise signal (γ+δ) (third background signal) composed of the interference noise signal γ of the control signal C mixed into the signal lines d and e and the self-mixing noise δ are amplified by the complex signal amplifier 335 and are then converted into a complex digital signal by the complex A/D converting unit 331 to be input to the digital signal processing unit 332. In Step S112, the digital signal processing unit 332 processes the noise signal (γ+δ). Thereby, a noise signal as shown in FIG. 18 is obtained. FIG. 18 is a temporal waveform chart of the noise signal (γ+δ). The I and Q components of the noise signal (γ+δ) obtained by processing in the digital signal processing unit 332 are stored in the storage unit 334 by subtracting respectively from the I and Q components of the noise signal already stored in Step S113.

Figure 19:
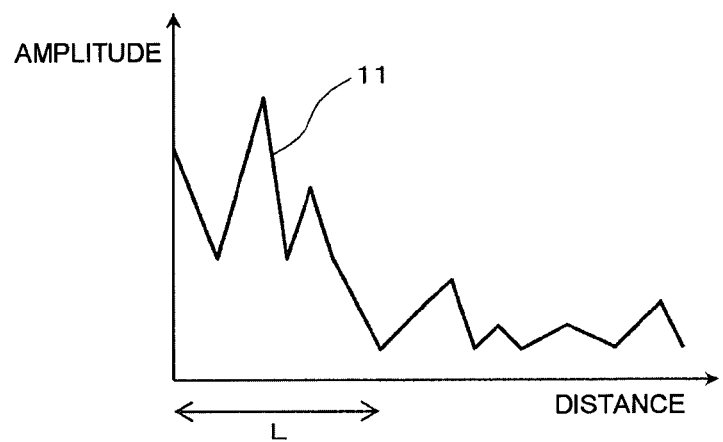
FIG. 19 is a temporal waveform chart of a replica signal created by the pulse radar apparatus of the third embodiment of the invention.

As for each of the I and Q components of the noise signal, the I and Q components of the noise signal composed of all of the unwanted waves can be calculated by adding the noise signal ($\alpha+\gamma+\delta$) with the noise signal ($\beta+\gamma+\delta$) and by subtracting the noise signal ($\gamma+\delta$) from the added noise signal, as follows:

($\beta+\gamma+\delta$)+($\alpha+\gamma+\delta$)−($\gamma+\delta$)=$\alpha+\beta+\gamma+\delta$ Thus, I and Q components of a replica signal ($\alpha+\beta+\gamma+\delta$) of the noise signal composed of the interference noise signals $\alpha$, $\beta$, $\gamma$ and the self-mixing noise $\delta$ are stored in the storage unit 334. A temporal waveform of the replica signal ($\alpha+\beta+\gamma+\delta$) can be obtained by adding the temporal waveform shown in FIG. 16 with the temporal waveform shown in FIG. 17 and by subtracting the temporal waveform shown in FIG. 18 from the added temporal waveform. FIG. 19 shows a temporal waveform of the replica signal ($\alpha+\beta+\gamma+\delta$).

The I and Q components of the replica signal ($\alpha+\beta+\gamma+\delta$) are read out of the storage unit 334 in Step S114 to calculate the gain correction value. When the I component (amplitude value of the I phase) per distance gate and the Q component (amplitude value of the Q phase) are denoted respectively as AIn and AQn (n=1 to N:N is a number of distance gates), the gain correction value R can be calculated as a ratio of the integrated value in the distance gate direction of the Q component AQn to the integrated value in the distance gate direction of the I component AIn, as follows:

$$R = \frac{\sum_{n=1}^{N} AQn}{\sum_{n=1}^{N} AIn}$$

The calculated gain correction value R is stored in the storage unit 334 in Step S115.

When it is judged that the pulse radar apparatus 300 is already in operation in Step S101 on the other hand, the radar is operated in Step S116. Thereby, the control unit 333 outputs the control signals A, B and C to radiate the pulse signal as the radio wave from the transmitting antenna 301. Then, the receiving antenna 302 receives the reflected wave reflected by the object T.

The received signal received by the receiving antenna 302 is down-converted into the complex baseband signal in the high-frequency receiving section 320 and is transmitted to the complex signal amplifier 335 via the connector 305.

The complex baseband signal transmitted to the complex signal amplifier 335 is amplified and is then converted into the complex digital signal by the complex A/D converting unit 331 to be transmitted to the digital signal processing unit 332. The digital signal transmitted to the digital signal processing unit 332 contains the noise signal ($\alpha+\beta+\gamma+\delta$) mixed in the connector 305 and others. The digital signal processing unit 332 processes the complex digital signal in Step S117. Thereby, the signal as shown in FIG. 13 in which the interference noise signal 11 and the self-mixing noise 12 are mixed into the signal 10 is obtained respectively for the I and Q phases.

The I and Q components of the replica signal ($\alpha+\beta+\gamma+\delta$) are read out of the storage unit 334 in Step S118 and the I and Q components of the replica signal ($\alpha+\beta+\gamma+\delta$) are subtracted from the I and Q components of the signal processed in the digital signal processing unit 332 in Step S119. Still further, the gain correction value R is read out of the storage unit 334 and is multiplied with the Q component after subtracting the replica signal in Step S120. Thereby, the signal 10 as shown in FIG. 12 from which the replica signal is removed and the difference of gains between the I and Q phases is corrected can be obtained. The distance L to and the relative speed of the object T are calculated based on this signal 10 in Step S121.

It is noted that the complex signal processing (FFT process) is implemented to the input signal in the present embodiment to calculate a Doppler component of the object to calculate the relative speed in the process of the digital signal processing unit 332. However, because the noise signals generated within the pulse radar apparatus 300 described above are all stationary noises, none of the noise signals $\alpha$, $\beta$, $\gamma$ and $\delta$ contain any Doppler component and contain only 0 [Hz] component equivalent to zero relative speed.

That is, the noise signal data obtained in the processes of the digital signal processing unit 332 implemented in Steps S104, S108 and S112 is only the noise signal containing the 0 [Hz] component equivalent to zero relative speed and Fourier transform data of the replica signal ($\alpha+\beta+\gamma+\delta$) stored in the storage unit 334 in Step S113 also contains the 0 [Hz] component equivalent to the zero relative speed. Accordingly, the replica signal ($\alpha+\beta+\gamma+\delta$) may be subtracted only from the data containing the 0 [Hz] component obtained by implementing the complex signal processing on the complex signal input from the complex A/D converting unit 331 in Step S119 described above.

When it is not necessary to measure the relative speed of the object, it is not necessary to implement the FFT processing in the digital signal processing unit 332 and it is possible to judge only whether or not the signal of the object is detected within each distance gate. It is also possible to implement the FFT processing within the digital signal processing unit 332 and to judge only whether or not the signal of the object is detected within each distance gate even when it is not necessary to measure the relative speed of the object to improve a SN ratio. Since it is possible to obtain the low-noise signal by subtracting the corresponding data of the distance gate of the replica signal ($\alpha+\beta+\gamma+\delta$) from the data of each distance gate obtained when the control unit 333 outputs the control signals A, B and C, it is possible to detect the object reliably based on the low-noise signal also in these cases.

Although the gain correction value R is calculated as the ratio of the integrated value in the distance gate direction of the Q component AQn to the integrated value in the distance gate direction of the I component AIn in the embodiment described above, the gain correction value R may be calculated as a ratio of the integrated value in the distance gate direction of the I component AIn to the integrated value in the distance gate direction of the Q component AQn as follows:

$$R = \frac{\sum_{n=L}^{N} AIn}{\sum_{n=L}^{N} AQn}$$

In this case, the gain correction value R is multiplied with the I component after subtracting the replica signal. Thereby, it is possible to correct the gain difference between the I phase and the Q phase.

Although the replica signal ($\alpha+\beta+\gamma+\delta$) and the gain correction value R are prepared on starting to use (in turning on) the pulse radar apparatus 300 in the flow chart shown in FIG. 15, the invention is not limited only to that and may be adapted to prepare the replica signal ($\alpha+\beta+\gamma+\delta$) and the gain correction value R periodically during the use of the pulse radar apparatus 300. That is, while there is a possibility that temperature rises within the pulse radar apparatus 300 during its use and the replica signal varies subtly for example, it is possible to improve the radar performance of the pulse radar apparatus 300 further by periodically updating the replica signal and the gain correction value during the use of the pulse radar apparatus 300.

As described above, the pulse radar apparatus of the invention allows the information on the object to be detected in high precision by preparing the replica signal of the noise signal and the gain correction value in advance and by correcting the received signal. The pulse radar apparatus of the invention also enables to use the inexpensive low-frequency substrate for the baseband section whose operating frequency is low and to connect the low-frequency substrate with the high-frequency substrate by using the conventionally used general-purpose connector. Accordingly, the invention enables to provide the downsized and low-cost pulse radar apparatus.

Fourth Embodiment

Figure 20:
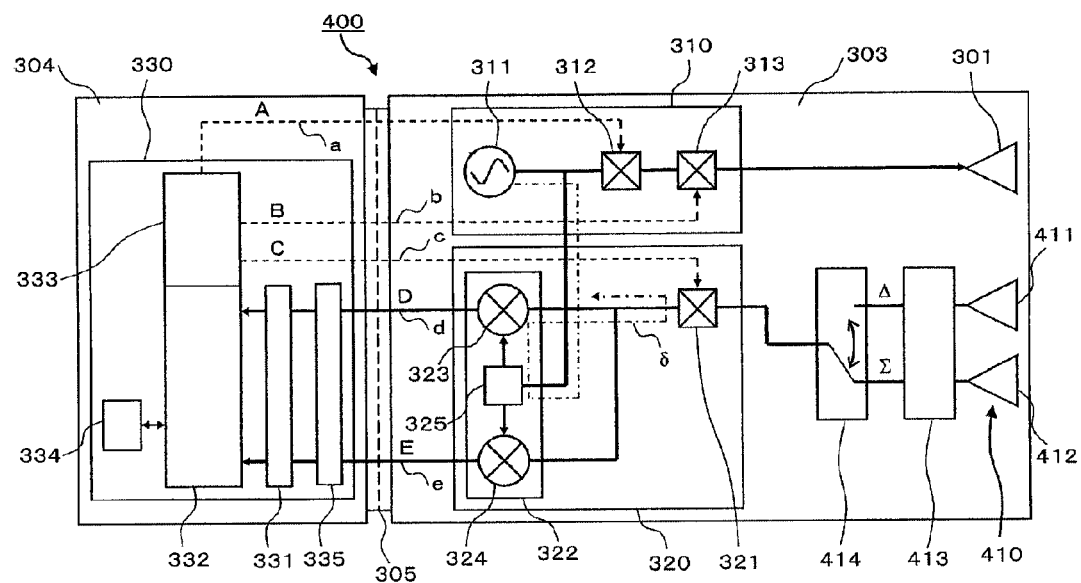
FIG. 20 is a block diagram showing a configuration of a pulse radar apparatus according to a fourth embodiment of the invention.

A pulse radar apparatus of a fourth embodiment of the invention will be explained below with reference to FIG. 20. FIG. 20 is a block diagram showing a configuration of the pulse radar apparatus 400 of the present embodiment. The pulse radar apparatus 400 of the present embodiment has two antennas of first and second antennas 411 and 412 as a receiving antenna 410 to measure an azimuth angle of the object T (angle measurement) by a phase monopulse system. Received signals of the first and second antennas 411 and 412 are input to a hybrid circuit 413, are converted into two received signals of a sum signal (denoted as $\Sigma$) and a differential signal (denoted as $\Delta$) and are output to a switcher 414.

The present embodiment is arranged so that processing of the sum and differential signals of the high-frequency receiving section 320 and the baseband section 330 is carried out by selectively switching by the switcher 414. Because the switcher 414 switches the sum signal and differential signal fully quickly as compared to relative move of the object T, it is possible to detect the azimuth angle of the object T in high precision by using the sum and differential signals detected by alternately switching them. The present embodiment allows the angle measurement to be implemented by the monopulse system without changing the configuration of the high-frequency receiving section 320 and the baseband section 330 and the downsized and low-cost pulse radar apparatus 400 to be provided.

Fifth Embodiment

According to a pulse radar apparatus of a fifth embodiment, the baseband section is provided with a variable gain amplifier that adjusts a gain in accordance to the other one of the receiving control signals, amplifies a baseband signal and outputs it to the A/D converting unit. The control unit determines the other one of the receiving control signals and outputs it to the variable gain amplifier corresponding to a detected distance in synchronism with either one of the transmission control signals.

The control unit determines the other one of the receiving control signals and outputs it to the variable gain amplifier so that the gain of the variable gain amplifier increases or turns out to be a fixed value greater than that of a short distance as the detected distance increases. Along with that, it is possible to turn off the other one of the receiving control signals during a period from when a time in which the detected distance is maximized elapses after outputting the transmission signal until when a next transmission signal is output.

When the baseband signal has signal strength lower than that of the m transmission control signals and the receiving control signal, it is preferable to dispose the variable gain amplifier separately from the respective control lines that transmit the m transmission control signals and the receiving control signal.

A method for controlling the pulse radar apparatus of the fifth embodiment additionally includes a variable gain amplifying step of determining the other one of the receiving control signals corresponding to a detected distance in synchronism with either one of the transmission control signals and of amplifying the baseband signal by adjusting the gain in accordance to the other one of the receiving control signals. In the A/D converting step, the baseband signal amplified in the variable gain amplifying step is input to convert into a digital signal to be output as the digital signal described above.

In the variable gain amplifying step, the other one of the receiving control signals described above is determined so that the gain of the variable gain amplifier increases or turns out to be the fixed value greater than that of the short distance as the detected distance increases. Along with that, it is possible to turn off the other one of the receiving control signals described above during a period from when a time in which the detected distance is maximized elapses after outputting the transmission signal until when a next transmission signal is output.

The following explanation will be made by exemplifying a case when the control unit outputs two transmission control signals of first and second control signals and two receiving control signals of a third and fourth control signals. It is noted that although the two transmission control signals of the first and second control signals are used and two receiving control signals of the third and fourth control signals are used here, the invention is not limited to this arrangement.

Figure 21:
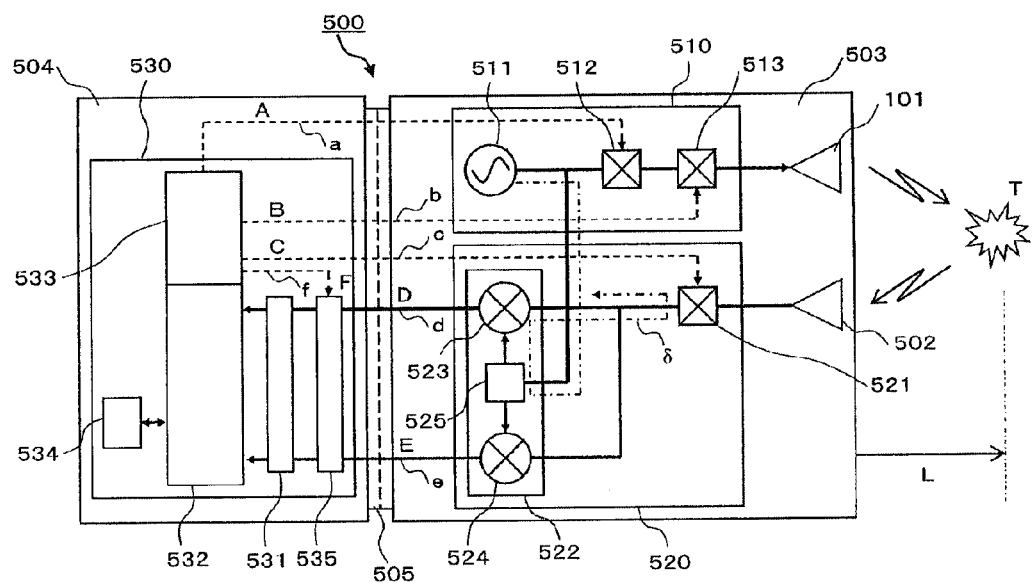
FIG. 21 is a block diagram showing a configuration of a pulse radar apparatus according to a fifth embodiment of the invention.

The pulse radar apparatus of the fifth embodiment of the invention will be explained below with reference to FIG. 21. FIG. 21 is a block diagram showing a configuration of the pulse radar apparatus 500 of the present embodiment. As shown in FIG. 21, the pulse radar apparatus 500 comprises a high-frequency transmitting sections 510 and a high-frequency receiving sections 520 that process high-frequency signals, a baseband section 530 that processes low-frequency signals, a transmitting antenna 501 for radiating radio wave to the space, and a receiving antenna 502 for receiving reflected wave reflected by the object. The pulse radar apparatus 500 detects the object T in the following explanation.

The high-frequency transmitting section 510 includes an oscillator 511, i.e., a source for generating the transmission signal of electromagnetic wave, that generates the predetermined high-frequency signal (carrier wave), and first and second gate units 512 and 513 that cut out the high-frequency signal generated by the oscillator 511 as pulse signals with a predetermined time width. The first and second gate units 512 and 513 are circuits configured to cut out a pulse signal of one [ns] width for example from the high-frequency signal input from the oscillator 511 for which a multiplier or a switch may be used. The use of the two signal cutting-out circuits of the first and second gate units 512 and 513 allows the sharply formed pulse signals to be generated. The pulsed transmission signal output of the second gate unit 513 is transmitted to the transmitting antenna 501 to be radiated to the air as radio wave.

The high-frequency receiving section 520 includes a correlator 521 that inputs the received signal received via the receiving antenna 502 to correlate with the transmission signal and an IQ mixer 522 that down-converts the signal inputted from the correlator 521 by the carrier wave inputted from the oscillator 511. The IQ mixer 522 has a first mixer 523 that down-converts to a baseband signal of I component, a second mixer 524 that down-converts to a baseband signal of Q component and a phase shifter 525 that outputs the carrier wave inputted from the oscillator 511 to the first and second mixers 523 and 524 by adding a phase difference of 90 degrees. The correlator 521 takes out a signal per measured distance from the received signal and outputs this signal to the first and second mixers 523 and 524.

The baseband section 530 includes a variable gain amplifier 535 that inputs the I and Q components of the baseband signal down-converted by the first and second mixers 523 and 524 and amplifies them to predetermined levels, an A/D converting unit 531 that inputs the I and Q components of the baseband signal amplified by the variable gain amplifier 535 to convert into digital signals, a digital signal processing unit 532 that processes the digital signal from the A/D converting unit 531 by fast Fourier transform (FFT) to calculate information on the object T, a control unit 533 that controls operations of the pulse radar apparatus 500, and a storage unit 534. The control unit 533 controls ON/OFF of respective power sources of the first and second gate units 512 and 513 and the correlator 521, i.e., high-frequency parts, and controls the gain of the variable gain amplifier 535. First through third control signals generated by the control unit 533 are signals having one [ns] width.

In the pulse radar apparatus 500 of the present embodiment constructed as described above, while the respective parts composing the high-frequency transmitting and receiving sections 510 and 520 operate with frequency of several tens GHz band, the respective parts composing the baseband section 530 operate with frequency of around 2 GHz at most. Since the operating frequency of the high-frequency transmitting and receiving sections 510 and 520 differs largely from the operating frequency of the baseband section 530, it is preferable to form those parts on separate substrates designed for the respective frequency bands.

Then, in the present embodiment, the high-frequency transmitting and receiving sections 510 and 520 are formed on a high-frequency substrate 503 and the baseband section 530 on a low-frequency substrate 504. The transmitting and receiving antennas 501 and 502 that transmits/receives the high-frequency signals are also disposed on the high-frequency substrate 503.

Since the substrate used for high-frequency is expensive as compared to the low-frequency substrate, only the high-frequency transmitting and receiving sections 510 and 520 and the transmitting and receiving antennas 501 and 502 are disposed on the expensive high-frequency substrate 503 and the baseband section 530 that processes the low-frequency signal is disposed on the low-frequency substrate 504 in the present embodiment. With this arrangement, the cost of the pulse radar apparatus 500 can be reduced.

When the respective parts of the pulse radar apparatus 500 are disposed separately to the high-frequency substrate 503 and the low-frequency substrate 504 as described above, it becomes necessary to provide a means for electrically connecting the parts on the high-frequency substrate 503 with the parts on the low-frequency substrate 504. Then, a conventionally used inexpensive multi-pin connector 505 is used in the pulse radar apparatus 500 of the present embodiment. The first through third control signals output of the control unit 533 on the low-frequency substrate 504 are transmitted to the high-frequency transmitting and receiving sections 510 and 520 on the high-frequency substrate 503 via the connector 505. The baseband signals output of the high-frequency receiving section 520 on the high-frequency substrate 503 are transmitted to the baseband section 530 on the low-frequency substrate 504 also via the connector 505.

Figure 22:
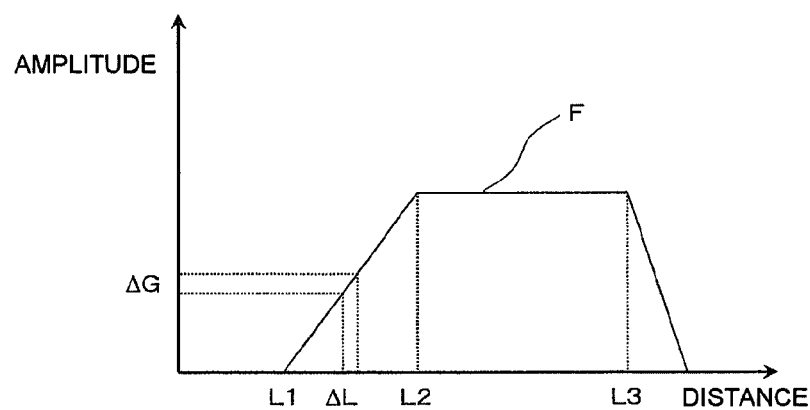
FIG. 22 is a graph showing a relationship between a gain control signal, outputted from a control unit to a variable gain amplifying unit, and a distance.

The baseband signal inputted from the high-frequency receiving section 520 is amplified by the variable gain amplifier 535 in order to be able to detect weak reflected wave from a distant object in the pulse radar apparatus 500 of the present embodiment. While the gain of the variable gain amplifier 535 is variable corresponding to detected distance (distance gate), there is a problem that if the gain is switched discontinuously, the variable gain amplifier 535 outputs a noise signal. The gain set to the variable gain amplifier 535 will be explained with reference to FIG. 22. FIG. 22 shows one example of a gain control signal (fourth control signal) output from the control unit 533 to the variable gain amplifier 535 and shows a relationship between the distance and the amplitude of the gain control signal.

In FIG. 22, the gain control signal F is set to a small value to amplify with a low gain in detecting the reflected wave from a short distance to a distance L1. Thereby, it is possible to prevent an output signal from the variable gain amplifier 535 from exceeding maximum input voltage of the A/D converting unit 531. The gain control signal F is linearly increased with respect to the distance from the distance L1 to L2 so that the gain of the variable gain amplifier 535 increases along the increase of the distance. For the long distance from the distance L2 to the L3, i.e., the maximum detection distance, the gain control signal F is made constant to amplify with the large gain, e.g., the maximum gain of the variable gain amplifier 535.

The gain control signal F controls the variable gain amplifier 535 so that the gain is changed by an amplitude variation $\Delta G$ shown in FIG. 22 every time when the distance gate is changed over in unit of the amplitude variation $\Delta G$ corresponding to a distance width of the distance gate (indicated as $\Delta L$ in FIG. 22) between the distances L1 and L2. As a result, the gain of the variable gain amplifier 535 changes discontinuously every time when the distance gate is changed over in the unit of the amplitude variation $\Delta G$. Thereby, the variable gain amplifier 535 outputs the noise signal, which is mixed into the baseband signal. This noise will be referred to as "offset noise" hereinafter.

Figure 23:
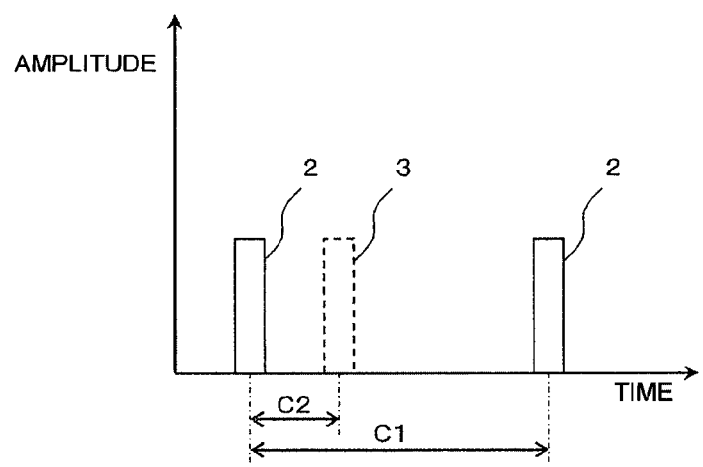
FIG. 23 is a graph illustrating one exemplary transmission signal outputted at predetermined cycle.

A relationship between a period (denoted as C1) in which the transmission signal is output of the high-frequency transmitting section 510 and the maximum detection distance L3 will be explained with reference to FIG. 23. FIG. 23 is an explanatory chart illustrating one example in which the transmission signal (denoted by the reference numeral 2) is output in the period C1. Time C2 corresponds to a time during which the radio wave reciprocates the maximum detection distance L3 based on time when the transmission signal 2 is output. A received wave 3 is what the radio wave is received after reciprocating the maximum detection distance L3. For example, the period C1 is around 1 μs and the time C2 is around 0.2 μs. The pulse radar apparatus 500 detects the object T within a range of the maximum detection distance L3 in a period from when the transmission signal 2 is output until when the time C2 elapses. Accordingly, a period until when the next transmission signal 2 is output after elapsing the time C2 turns out to be a time zone in which no detection of the object T is performed.

After reaching the maximum detection distance L3, it is necessary for the control unit 533 to turn off the gain control signal F. If the gain control signal F is kept to have the large amplitude set with respect to the maximum detection distance L3 as it is, it is necessary to suddenly reduce the value of the gain control signal F when the next transmission signal is output. Thereby, because the gain of the variable gain amplifier 535 changes abruptly, a large offset noise is generated and is mixed into the baseband signal. Therefore, the gain control signal is turned off after reaching the maximum detection distance L3 as shown in FIG. 22 in the present embodiment.

Still further, interference noise signals from the control signals are mixed into the baseband signal having the information on the object T in the connector 505 because the parts are connected electrically between the high-frequency substrate 503 and the low-frequency substrate 504 by using the conventional multi-pin connector 505 as described above. There is also a problem that a self-mixing noise that is generated when the carrier wave output of the oscillator 511 passes through the IQ mixer 522, is reflected by the correlator 521 and is down-converted again by the IQ mixer 522 also mixes into the baseband signal. When the object T is located at a distant place, an amplitude level of a signal reflected from the object becomes small, so that there is a possibility that the signal is hidden by the offset noise from the variable gain amplifier 535, the interference noise signal in the connector 505 and the self-mixing noise.

Then, the pulse radar apparatus 500 of the present embodiment is configured so that a replica signal of unwanted wave composed of the offset noise, the interference noise signal and the self-mixing noise is prepared in advance and so that the replica signal is removed from the baseband signal in detecting the object T.

Figure 24:
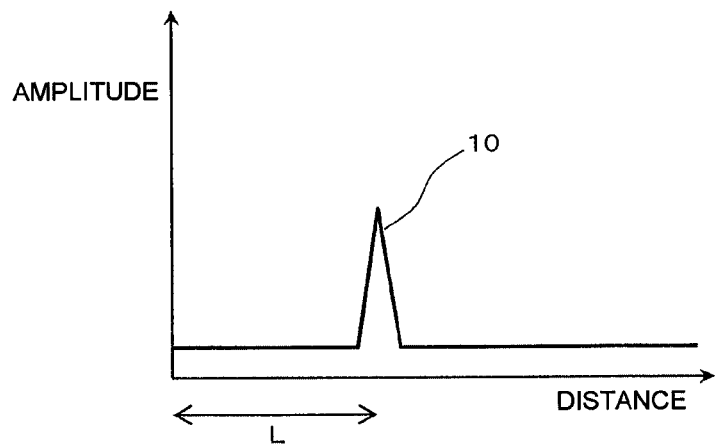
FIG. 24 is a temporal waveform chart of a signal when there is no influence of noise.
Figure 25:
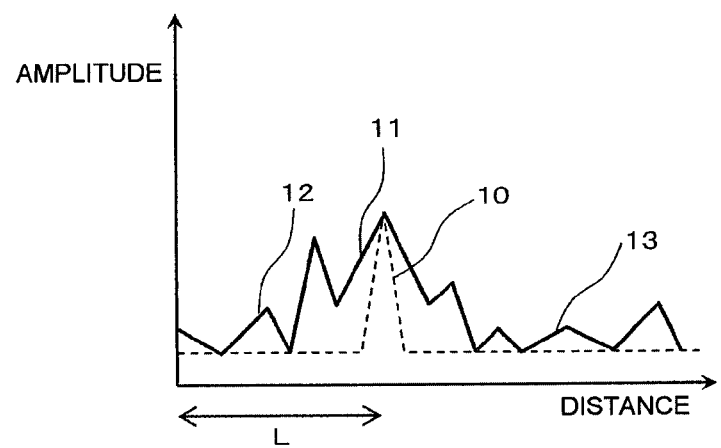
FIG. 25 is a temporal waveform chart of a signal into which an unwanted wave is mixed.

One exemplary replica signal of the unwanted wave will be explained with reference to FIGS. 24 and 25. FIG. 24 is a temporal waveform chart showing one exemplary signal 10 obtained by radiating the pulse signal generated in the high-frequency transmitting section 510 from the transmitting antenna 501 and by processing the digital signal of the reflected wave reflected by the object T and received by the receiving antenna 502 by the digital signal processing unit 532 (it is noted that an axis of abscissa indicates distance corresponding to time. The same applied to FIGS. 25 and 28 through 32 hereinafter). A waveform of the signal 10 shown in FIG. 24 indicates that there is no influence of noise. FIG. 25 is a temporal waveform chart of the signal 10 shown in FIG. 24 into which the signals of the unwanted waves described above are mixed. The signal 11 schematically indicates the offset noise from the variable gain amplifier 535, the signal 12 schematically indicates the interference noise signal mixed into the baseband signal in the connector 505 and the signal 13 schematically indicates the self-mixing noise.

According to the present embodiment, the replica signal of the unwanted wave in which the offset noise 11, the interference noise signal 12 and the self-mixing signal 13 shown in FIG. 25 are combined is prepared in advance and is stored in the storage unit 534. Then, when the pulse radar apparatus 500 is operated to detect the object T, the replica signal is subtracted from the signal input to the baseband section 530 via the connector 505 and processed by the digital signal processing unit 532 to acquire the signal (low-noise signal) as shown in FIG. 24. A method for preparing the replica signal described above in advance will be explained in detail below with reference to the drawings.

As shown in FIG. 21, the control signal (first control signal) output of the control unit 533 to the first gate unit 512 and the control line (first control line) that transmits the signal are denoted respectively as the control signal A and the control line a, the control signal (second control signal) output of the control unit 533 to the second gate unit 513 and the control line (second control line) that transmits the signal are denoted respectively as the control signal B and the control line b, the control signal (third control signal) output of the control unit 533 to the correlator 521 and the control line (third control line) that transmits the signal are denoted respectively as the control signal C and the control line c, and the gain control signal (fourth control signal) output of the control unit 533 to the variable gain amplifier 535 and the control line (fourth control line) that transmits the signal are denoted respectively as the control signal F and the control line f.

The control signals A and B control ON/OFF of the power sources of the first and second gate units 512 and 513, respectively, and the control signal C controls ON/OFF of the power source of the correlator 521. The gain control signal F of the amplitude value determined by the control unit 533 corresponding to the detected distance is output to the variable gain amplifier 535 in synchronism with the first control signal or the second control signal.

Still further, the baseband signal (I signal) output of the first mixer 523 of the IQ mixer 522 to the variable gain amplifier 535 and the signal line that transmits the signal are denoted respectively as the baseband signal D and the signal line d and the baseband signal (Q signal) output of the second mixer 524 to the variable gain amplifier 535 and the signal line that transmits the signal are denoted respectively as the baseband signal E and the signal line e. All of the control lines a, b and c and the signal lines d and e pass through different pins of the connector 505.

When the control unit 533 outputs the control signals A and B to the first and second gate units 512 and 513 through the control lines a and b with adequate timing and their respective power sources are turned on for about one [ns], the carrier wave generated by the oscillator 511 is cut out with a pulse width of one [ns] in the pulse radar apparatus 500. Thereby, the transmission signal with one [ns] of pulse width of the carrier wave having predetermined frequency is generated and is sent to the transmitting antenna 501 to be radiated to the air as radio wave. The radiated radio wave is reflected by the object T located at position separated by a distance L and is received by the receiving antenna 502.

When the control unit 533 outputs the control signal C to the correlator 521 through the control line c with predetermined timing, the correlator 521 turns on and correlates the received signal received by the receiving antenna 502 with the transmission signal. The signal output of the correlator 521 is down-converted into the complex baseband signal by the IQ mixer 522. The respective baseband signals D and E down-converted by the first and second mixers 523 and 524 are input to the variable gain amplifier 535 of the baseband section 530 through the signal lines d and e to be amplified to the predetermined level. The signals amplified by the variable gain amplifier 535 are then input to the A/D converting unit 531 to be converted into the digital signals. The digital signal processing unit 532 implements complex signal processing on the digital signal to calculate information on position and relative speed of the object T.

The control lines a, b and c and the signal lines d and e shown in FIG. 21 are connected between the high-frequency substrate 503 and the low-frequency substrate 504 by the connector 505 as described above. Because each pin (terminal) of the connector 505 is naked, the signal flowing through each terminal leaks to another terminal and interferes the other signal even though it is a subtle level.

The control signals A, B and C flowing through the control lines a, b and c are the signals that drive ON/OFF of the RF parts (the first gate unit 512, the second gate unit 513 and the correlator 521) and have a level of about 2 to 3 [V] for example. In contrary, the baseband signals D and E flowing through the signal lines d and e are the signals produced by down-converting the low-level signal reflected from the object T and the signals whose level is very low. Due to that, as compared to the baseband signals D and E, the control signals A, B and C are relatively very high level signals and leak from the control lines a, b and c to the signal lines d and e in the connector 505.

Figure 26:
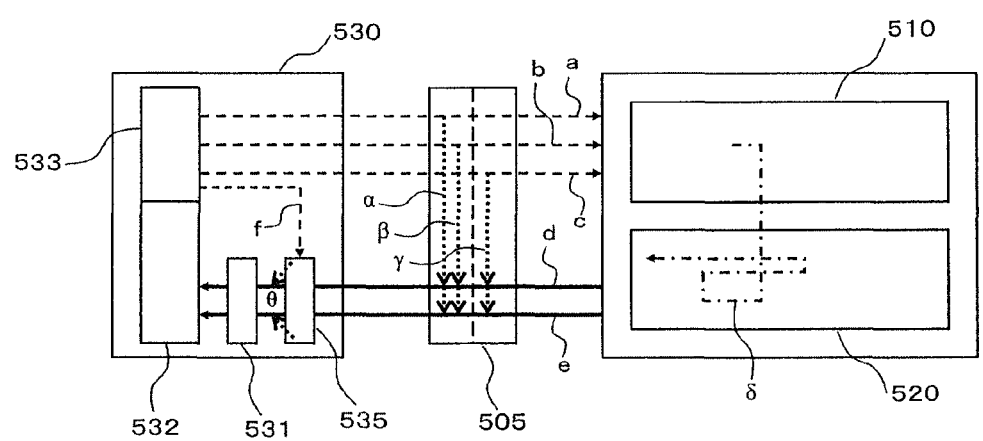
FIG. 26 is an enlarged view of control lines and signal lines of the pulse radar apparatus of the fifth embodiment of the invention.

FIG. 26 is an enlarged schematic diagram of the control lines and signal lines described above in the pulse radar apparatus 500. As shown in FIG. 26, the signals leaked from the control lines a, b and c to the signal lines d and e are denoted respectively as interference noise signals $\alpha$, $\beta$ and $\gamma$. The interference noise signals $\alpha$, $\beta$ and $\gamma$ are signals almost in the same level with the baseband signals D and E passing through the signal lines d and e. FIG. 26 also shows the self-mixing noise $\delta$ that is output of the oscillator 511, passes through the IQ mixer 522, is reflected by the correlator 521 and is down-converted again by the IQ mixer 522. The self-mixing noise $\delta$ is also mixed into the baseband signals D and E. Still further, the offset noise $\theta$ is mixed into output signals of the variable gain amplifier 535 in the variable gain amplifier 535.

In order to prepare the replica signal of the unwanted wave containing the noises $\alpha$, $\beta$, $\gamma$ and $\delta$ mixed into the baseband signals D and E and the noise $\theta$ mixed in the variable gain amplifier 535 in advance, the first gate unit 512, the second gate unit 513, the correlator 521 and the variable gain amplifier 535 are operated with adequate timing via the control lines a, b and c on starting to use the pulse radar apparatus 500 of the present embodiment. Then, the replica signal of the unwanted wave obtained is stored in the storage unit 534 to remove the respective noises by subtracting the replica signal from the signal input from the A/D converting unit 531 by the digital signal processing unit 532 in detecting the object T.

Figure 27:
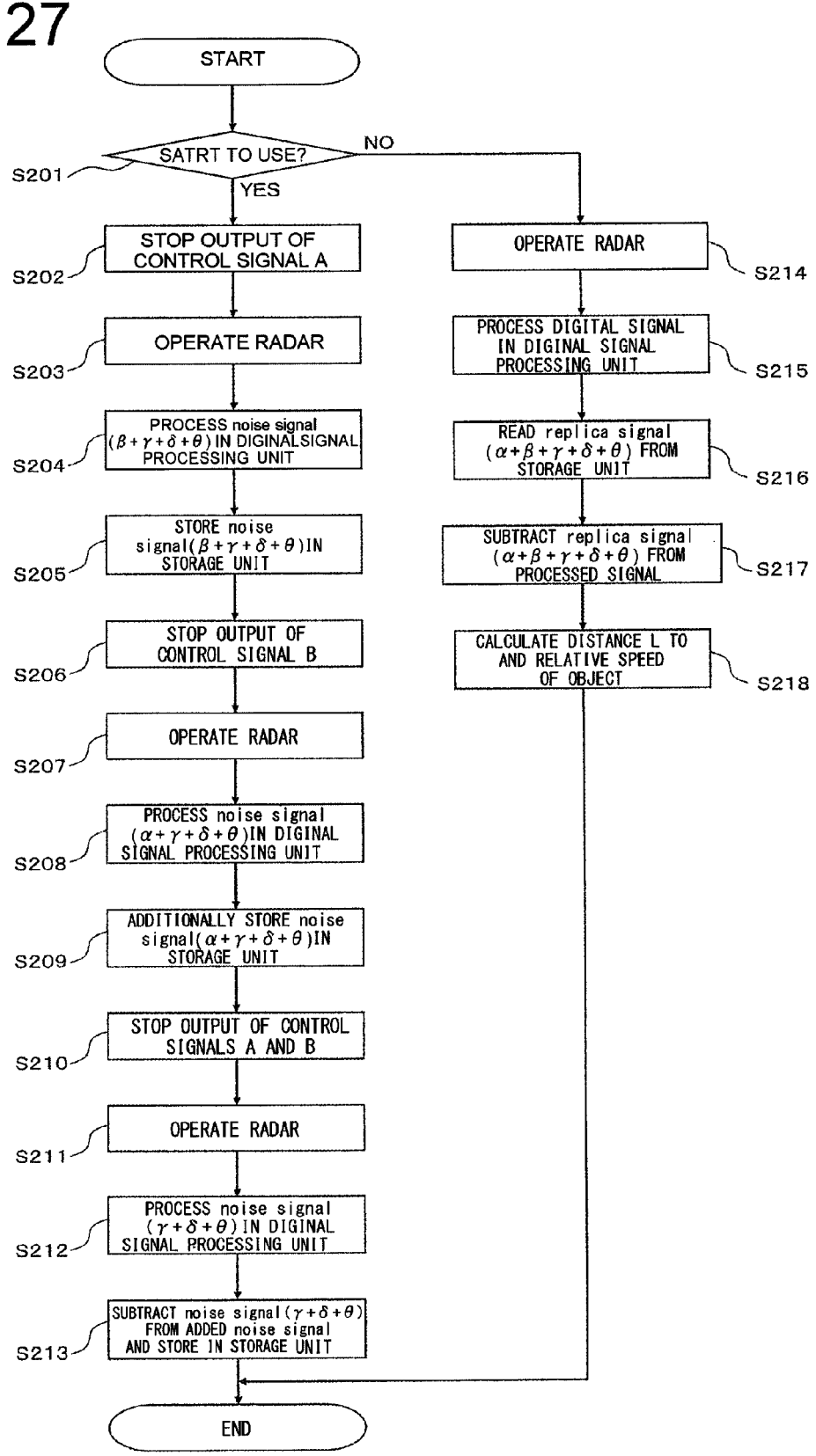
FIG. 27 is a flowchart illustrating a signal processing method implemented by the received signal of the fifth embodiment of the invention.

A method for preparing the replica signal of the unwanted wave in advance and for correcting the baseband signals by using the replica signal will be explained below with reference to FIG. 27. FIG. 27 is a flowchart illustrating the signal processing method implemented in the pulse radar apparatus 500.

When the transmitting radio wave is radiated to the air from the transmitting antenna 501 in preparing the replica signal of the unwanted wave, there is a possibility that the receiving antenna 502 receives the transmitted radio wave reflected by some other object. It becomes unable to prepare the replica signal of only the unwanted wave if the receiving antenna 502 receives such reflected wave. Then, the apparatus is arranged so that no transmitting radio wave is radiated from the transmitting antenna 501 in preparing the replica signal of the unwanted wave.

At first, it is judged whether or not the pulse radar apparatus 500 is started to be used in Step S201. When it is judged that the pulse radar apparatus 500 is started to be used in Step S201, the process advances to Step S202. When it is judged that the pulse radar apparatus 500 is already in operation, the process advances to Step S214.

In Step S202, the control unit 533 stops to output the control signal A that flows through the control line a while flowing the control signals B, C and F through the control lines b, c and f. Next, the radar is operated in Step S203. The pulse signal is output to the transmitting antenna 501 only when the power sources of the first and second gate units 512 and 513 are both turned on in the pulse radar apparatus 500. Due to that, if no control signal A is output to the first gate unit 512 when the radar is operated in Step S203, no pulse signal is output to the transmitting antenna 501. Thereby, the receiving antenna 502 also receives no reflected wave.

Figure 28:
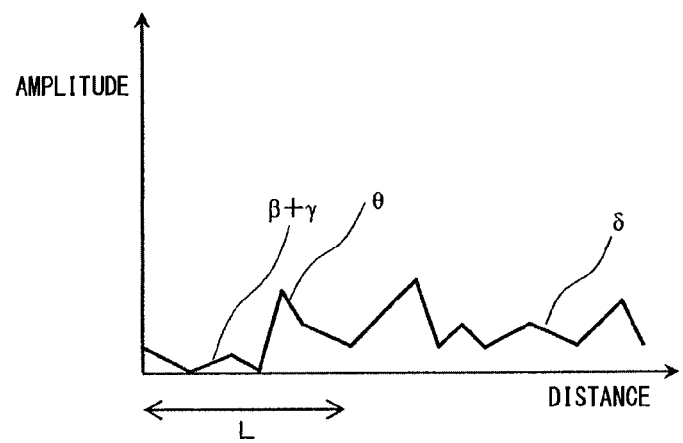
FIG. 28 is a temporal waveform chart of a noise signal when no control signal is outputted to a first gate unit of the pulse radar apparatus of the fifth embodiment of the invention.

As a result, a noise signal ($\beta+\gamma+\delta+\theta$) (first background signal) composed of the respective interference noise signals $\beta$ and $\gamma$ of the control signals B and C mixed into the signal lines d and e, the self-mixing noise $\delta$ and the offset noise $\theta$ is input to the digital signal processing unit 532. In Step S204, the digital signal processing unit 532 processes the noise signal ($\beta+\gamma+\delta+\theta$). Thereby, a noise signal as shown in FIG. 28 is obtained. FIG. 28 is a temporal waveform chart of the noise signal ($\beta+\gamma+\delta+\theta$). The noise signal ($\beta+\gamma+\delta+\theta$) processed in the digital signal processing unit 532 is stored in the storage unit 534 in Step S205.

In the next Step S206, the control unit 533 stops to output the control signal B that flows through the control line b while flowing the control signals A, C and F through the control lines a, c and f. Next, the radar is operated in Step S207. In this case, only the first gate unit 512 is turned on and the second gate unit 513 is not turned on, so that no pulse signal is output to the transmitting antenna 501. Thereby, the receiving antenna 502 also receives no reflected wave.

Figure 29:
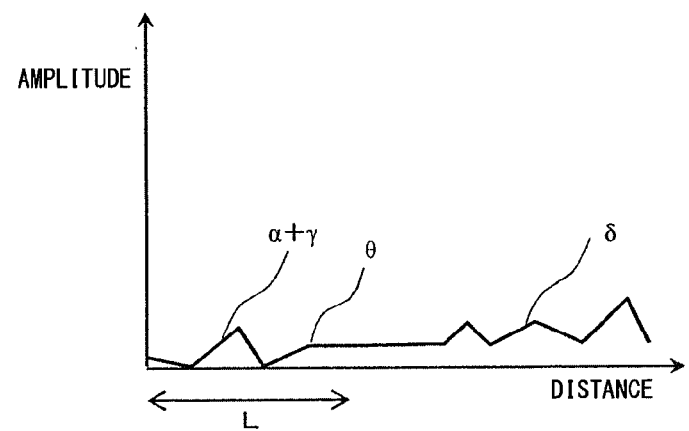
FIG. 29 is a temporal waveform chart of a noise signal when no control signal is outputted to a second gate unit of the pulse radar apparatus of the fifth embodiment of the invention.
Figure 30:
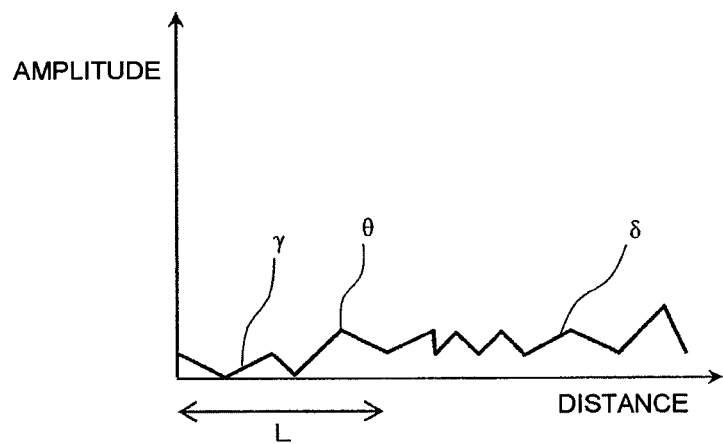
FIG. 30 is a temporal waveform chart of a noise signal when no control signal is outputted to the first and second gate units of the pulse radar apparatus of the fifth embodiment of the invention.

As a result, a noise signal ($\alpha+\gamma+\delta+\theta$) (second background signal) composed of the respective interference noise signals $\alpha$ and $\gamma$ of the control signals A and C mixed into the signal lines d and e, the self-mixing noise $\delta$ and the offset noise $\theta$ is input to the digital signal processing unit 532. In Step S208, the digital signal processing unit 532 processes the noise signal ($\alpha+\gamma+\delta+\theta$). Thereby, a noise signal as shown in FIG. 29 is obtained. FIG. 29 is a temporal waveform chart of the noise signal ($\alpha+\gamma+\delta+\theta$). The noise signal ($\alpha+\gamma+\delta+\theta$) obtained by processing in the digital signal processing unit 532 is stored in the storage unit 534 in addition to the noise signal ($\beta+\gamma+\delta+\theta$) already stored in Step S209.

In Step S210, the control unit 533 stops to output the both control signals A and B flowing through the control lines a and b while flowing the control signals C and F through the control lines c and f. Then, the radar is operated in Step S211. No pulse signal is output to the transmitting antenna 501 also in this case. Therefore, the receiving antenna 502 also receives no reflected wave.

As a result, a noise signal ($\gamma+\delta+\theta$) (third background signal) composed of the interference noise signal $\gamma$ of the control signal C mixed into the signal lines d and e, the self-mixing noise $\delta$ and the offset noise $\theta$ is input to the digital signal processing unit 532. In Step S212, the digital signal processing unit 532 processes the noise signal ($\gamma+\delta+\theta$). Thereby, a noise signal as shown in FIG. 300 is obtained. FIG. 8 is a temporal waveform chart of the noise signal ($\gamma+\delta+\theta$). The noise signal ($\gamma+\delta+\theta$) obtained by processing in the digital signal processing unit 532 is stored in the storage unit 534 by subtracting from the noise signal already stored in Step S213.

A noise signal composed of all of the unwanted waves can be calculated by adding the noise signal ($\alpha+\gamma+\delta+\theta$) with the noise signal ($\beta+\gamma+\delta+\theta$) and by subtracting the noise signal ($\gamma+\delta+\theta$) from the added noise signal, as follows:

$$(\beta+\gamma+\delta+\theta)+(\alpha+\gamma+\delta+\theta)-(\gamma+\delta+\theta)=\alpha+\beta+\gamma+\delta+\theta$$

Figure 31:
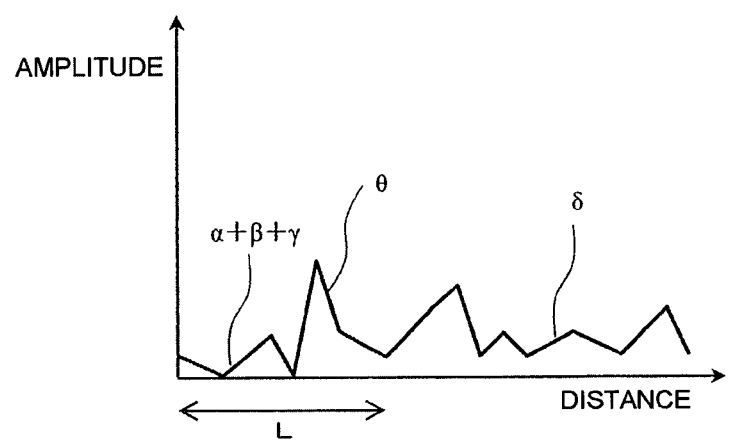
FIG. 31 is a temporal waveform chart of a replica signal created by the pulse radar apparatus of the fifth embodiment of the invention.

Thus, a replica signal ($\alpha+\beta+\gamma+\delta+\theta$) of the noise signal composed of the interference noise signals $\alpha$, $\beta$, $\gamma$, the self-mixing noise $\delta$ and the offset noise $\theta$ is stored in the storage unit 534. A temporal waveform of the replica signal ($\alpha+\beta+\gamma+\delta+\theta$) can be obtained by adding the temporal waveform shown in FIG. 28 with the temporal waveform shown in FIG. 29 and by subtracting the temporal waveform shown in FIG. 30 from the added temporal waveform. FIG. 31 shows a temporal waveform of the replica signal ($\alpha+\beta+\gamma+\delta+\theta$).

Figure 32:
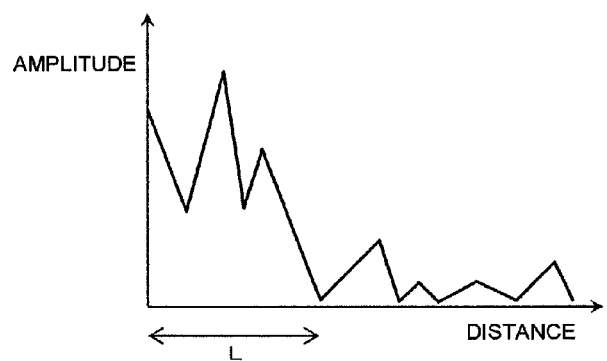
FIG. 32 is a temporal waveform chart of the unwanted wave when a gain fixed amplifier whose gain is fixed to a maximum value is used.

While FIG. 31 shows the temporal waveform of the replica signal of the unwanted wave detected by the pulse radar apparatus 500 of the present embodiment using the variable gain amplifier 535, FIG. 32 shows a temporal waveform of the unwanted wave when a fixed gain amplifier that fixes a gain to a maximum value is used instead of the variable gain amplifier 535. It can be seen that while the noise level is high in the short distance in the apparatus in FIG. 32, the noise level is suppressed low in the short distance in the apparatus in FIG. 31.

When it is judged that the pulse radar apparatus 500 is already in operation in Step S201 on the other hand, the radar is operated in Step S214. Thereby, the control unit 533 outputs the control signals A, B, C and F to radiate the pulse signal as the radio wave from the transmitting antenna 501. Then, the receiving antenna 502 receives the reflected wave reflected by the object T.

The received signal received by the receiving antenna 502 is down-converted into the baseband signal in the high-frequency receiving section 520 and is transmitted to the variable gain amplifier 535 via the connector 505. The baseband signal input to the variable gain amplifier 535 is amplified to the predetermined level and is then input to the A/D converting unit 531. The baseband signal input to the A/D converting unit 531 is converted into the digital signal and is then transmitted to the digital signal processing unit 532.

The digital signal transmitted to the digital signal processing unit 532 contains the noise signal ($\alpha+\beta+\gamma+\delta+\theta$) mixed in the connector 505, the variable gain amplifier 535 and others. The digital signal processing unit 532 processes the digital signal in Step S215. Thereby, the signal as shown in FIG. 25 in which the offset noise 11, the interference noise signal 12 and the self-mixing noise 13 are mixed into the signal 10 is obtained.

The replica signal ($\alpha+\beta+\gamma+\delta+\theta$) is read out of the storage unit 534 in Step S216 and the replica signal ($\alpha+\beta+\gamma+\delta+\theta$) is subtracted from the signal processed in the digital signal processing unit 532 in Step S217. Thereby, the signal 10 as shown in FIG. 24 can be obtained. The distance L to and the relative speed of the object T are calculated based on this signal 10 in Step S218.

It is noted that the complex signal processing (FFT process) is implemented to the input signal in the present embodiment to calculate a Doppler component of the object to calculate the relative speed in the process of the digital signal processing unit 532. However, because the noise signals generated within the pulse radar apparatus 500 described above are all stationary noises, none of the noise signals $\alpha$, $\beta$, $\gamma$, $\delta$ and $\theta$ contain any Doppler component and contain only 0 [Hz] component equivalent to zero relative speed.

Thereby, the noise signal data obtained in the processes of the digital signal processing unit 532 implemented in Steps S204, S208 and S212 is only the noise signal containing the 0 [Hz] component equivalent to zero relative speed and Fourier transform data of the replica signal ($\alpha+\beta+\gamma+\delta+\theta$) stored in the storage unit 534 in Step S213 also contains only the 0 [Hz] component equivalent to the zero relative speed. Accordingly, the replica signal ($\alpha+\beta+\gamma+\delta+\theta$) may be subtracted only from the data containing the 0 [Hz] component obtained by implementing the complex signal processing on the signal inputted from the A/D converting unit 531 in Step S217 described above.

When it is not necessary to measure the relative speed of the object, it is not necessary to implement the FFT processing in the digital signal processing unit 532 and it is possible to judge only whether or not the signal of the object is detected within each distance gate. It is also possible to implement the FFT processing within the digital signal processing unit 532 and to judge only whether or not the signal of the object is detected within each distance gate even when it is not necessary to measure the relative speed of the object to improve a self-mixing noise ratio. Since it is possible to obtain the low-noise signal by subtracting the corresponding data of the distance gate of the replica signal ($\alpha+\beta+\gamma+\delta+\theta$) from the data of each distance gate obtained when the control unit 533 outputs the control signals A, B and C, it is possible to detect the object reliably based on the low-noise signal.

Although the replica signal ($\alpha+\beta+\gamma+\delta+\theta$) is prepared on starting to use (in turning on) the pulse radar apparatus 500 in the flow chart shown in FIG. 27, the invention is not limited only to that and may be adapted to prepare the replica signal ($\alpha+\beta+\gamma+\delta+\theta$) periodically during the use of the pulse radar apparatus 500. That is, while there is a possibility that temperature rises within the pulse radar apparatus 500 during its use and the replica signal varies subtly for example, it is possible to improve the radar performance of the pulse radar apparatus 500 further by periodically updating the replica signal during the use of the pulse radar apparatus 500.

As described above, the pulse radar apparatus of the invention and its control method allow the influences of the noise when the gain of the variable gain amplifier is changed discontinuously corresponding to the detected distance, the noise caused by the interference applied from the control lines to the signal lines, and the self-mixing noise to be removed with the simple configuration and the information on the object to be detected in high precision by preparing the replica signal of the noise signal in advance and by removing the replica signal from the received signal. The pulse radar apparatus of the invention also enables to use the inexpensive low-frequency substrate for the baseband section whose operating frequency is low and to connect the low-frequency substrate with the high-frequency substrate by using the conventionally used general-purpose connector. Accordingly, the invention enables to provide the downsized and low-cost pulse radar apparatus.

Sixth Embodiment

Figure 33:
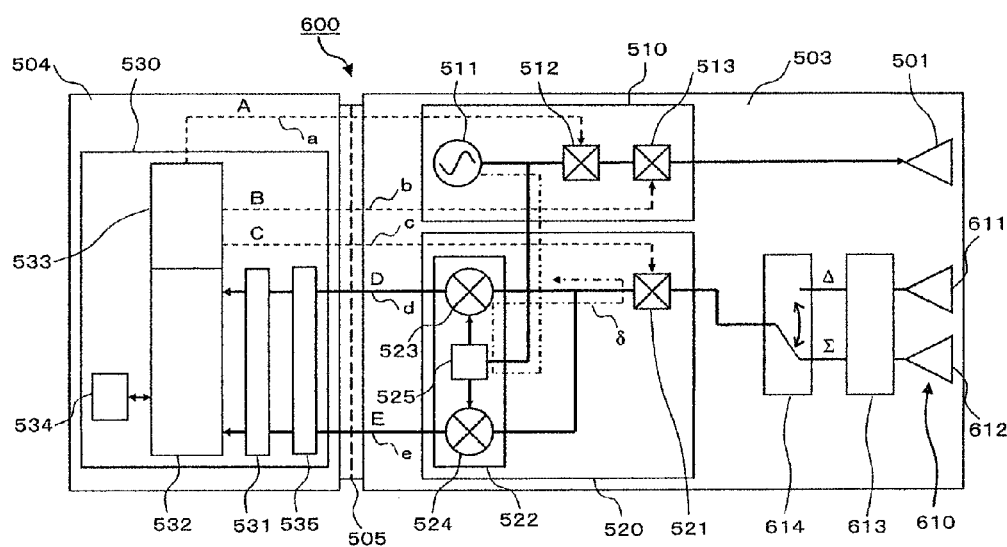
FIG. 33 is a block diagram showing a configuration of a pulse radar apparatus according to a sixth embodiment of the invention.

A pulse radar apparatus of a sixth embodiment of the invention will be explained below with reference to FIG. 33. FIG. 33 is a block diagram showing a configuration of the pulse radar apparatus 600 of the present embodiment. The pulse radar apparatus 200 of the present embodiment has two antennas of first and second antennas 611 and 612 as a receiving antenna 610 to measure an azimuth angle of the object T (angle measurement) by a phase monopulse system. Received signals of the first and second antennas 611 and 612 are input to a hybrid circuit 613, are converted into two received signals of a sum signal (denoted as $\Sigma$) and a differential signal (denoted as $\Delta$) and are output to a switcher 614.

The present embodiment is arranged so that processing of the sum and differential signals of the high-frequency receiving section 520 and the baseband section 530 is carried out by selectively switching by the switcher 214. Because the switcher 214 switches the sum signal and differential signal fully quickly as compared to relative move of the object, it is possible to detect the azimuth angle of the object T in high precision by using the sum and differential signals detected by alternately switching them. The present embodiment allows the angle measurement to be implemented by the monopulse system without changing the configuration of the high-frequency receiving section 520 and the baseband section 530 and the downsized and low-cost pulse radar apparatus 200 to be provided.

The high-frequency transmitting and receiving sections that operate in high-frequency are disposed on the high-frequency substrate and the baseband section that operates in low-frequency is disposed on the low-frequency substrate in the respective embodiments described above. It is then considered below about which substrate is preferable to dispose the amplifier that amplifies the baseband signal when the pulse radar apparatus is configured by dividing into the two substrates of the high-frequency and low-frequency substrate as described above. The amplifier is disposed on the low-frequency substrate in the third through fourth embodiments described above.

The preferable disposed position of the amplifier will be considered below by exemplifying the pulse radar apparatus 500 of the fifth embodiment. Similarly to the other embodiments, the high-frequency substrate 503 is connected with the low-frequency substrate 504 by the connector 505 and the control lines a, b and c and the signal line d for transmitting the respective control signals and the baseband signal between them are connected by the pins within the connector 505 in the fifth embodiment. It is supposed here that an inexpensive connector whose intervals among the pins are not so large and whose isolation is not so high is used as the connector 505.

Because the signal strength of the baseband signal obtained by down-converting the received signal is low, it is amplified by the amplifier before A/D conversion. The signal strength of the baseband signal is very low as compared to the control signals transmitting through the control lines a, b and c. For instance, as compared to the strength of the control signal of 1000 mV, there is a case when the strength of the baseband signal is around 1 mV. Because the strength of the baseband signal is very low, the strength of the baseband signal is amplified to around 1000 mV for example by using the variable gain amplifier 535 in the pulse radar apparatus 500.

Figure 34A:
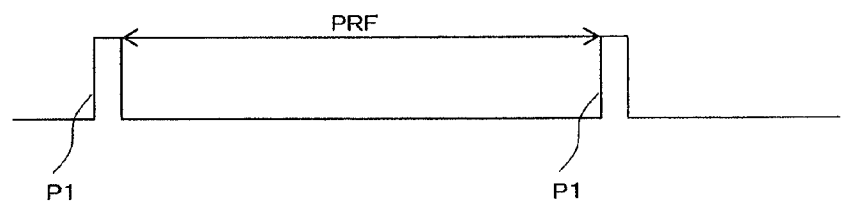
FIG. 34A and FIG. 34B are charts showing repeating cycles of the transmission signal output of the high-frequency transmitting section in accordance of the control signal.

While the influence of the interference noise signals that leak from the control signal whose signal strength is high to the baseband signal within the connector poses the problem when the baseband signal passes through the connector 505 before the amplification, the influence of the interference noise signal can be considerably reduced by the pulse radar apparatus of the invention, and its control method, as described in the first through sixth embodiments. Meanwhile, an interference noise signal leaking from the baseband signal to the control signal hardly affects the operation of the pulse radar apparatus by the control signal because the strength of the baseband signal is very low as compared to that of the control signal. As a result, a transmission signal output in accordance to the control signal is generated as predetermined pulse recurrence period (PRF) as the transmission signal P1 shown in FIG. 34A.

Figure 34B:
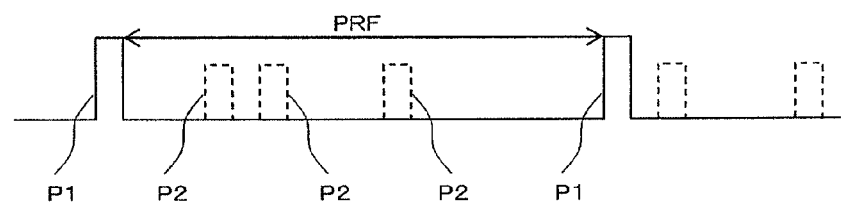

When the variable gain amplifier 535 is disposed on the high-frequency substrate 503 and the baseband signal is arranged to pass through the connector 505 after its amplification, strength of an interference noise signal leaking from the amplified baseband signal to the control signal becomes high and the control signal is mixed with the relative high noise signal. As a result, there is a possibility that the first and second gate units 512 and 513 become operative and a transmission signal P2 is output, beside the predetermined pulse recurrence period (PRF), as shown in FIG. 34B. If the transmission signal is output besides the predetermined pulse recurrence period, the pulse radar apparatus 500 is unable to perform the normal radar operation.

Then, the amplifier is disposed on the low-frequency substrate in any of the third through sixth embodiments having the amplifier and the baseband signal whose strength is low before the amplification is arranged to pass through the connector. This arrangement fully lowers the strength of the interference noise signal leaking from the baseband signal to the control signal to the level that hardly affects the control signal and requires no complicated configuration or control for reducing the influence on the control signal. Still further, the interference noise signal leaking from the control signal to the baseband signal within the connector is considerably reduced by the pulse radar apparatus of the invention and its control method.

It is noted that the descriptions of the embodiments indicate examples of the pulse radar apparatus of the invention and the control method thereof and do not limit the invention by any means. The detailed configuration, operation and other of the pulse radar apparatus and the control method thereof of the embodiments can be appropriately modified within the scope not departing from the gist of the invention.

| [Description of Reference Numerals] | |
|---|---|
| 100, 200, 300, 400, 500, 600 | Pulse radar apparatus |
| 101, 301, 501 | Transmitting antenna |
| 102, 210, 302, 410, 502, 610 | Receiving antenna |
| 103, 303, 503 | High-frequency substrate |
| 104, 304, 504 | Low-frequency substrate |
| 105, 305, 505 | Connector |
| 110, 310, 510 | High-frequency transmitting section |
| 111, 311, 511 | Oscillator |
| 112, 312, 512 | First gate unit |
| 113, 313, 513 | Second gate unit |
| 120, 320, 520 | High-frequency receiving section |
| 121, 312, 521 | Correlator |
| 122, 322, 522 | IQ mixer (quadrature down-converting unit) |
| 123, 323, 523 | First mixer |
| 124, 324, 524 | Second mixer |
| 125, 325, 525 | Phase shifter |
| 130, 330, 520 | Baseband section |
| 131, 521 | A/D converting unit |
| 331 | Complex A/D converting unit |
| 132, 332, 532 | Digital signal processing unit |
| 133, 333, 533 | Control unit |
| 134, 334, 534 | Storage unit |
| 211, 411, 611 | First antenna |
| 212, 412, 612 | Second antenna |
| 213, 413, 613 | Hybrid circuit |
| 214, 414, 614 | Switcher |
| 335 | Complex signal amplifier |
| 525 | Variable gain amplifier |

The invention claimed is:

1. A pulse radar apparatus, comprising:
a high-frequency transmitting section having an oscillator that generates a carrier wave of a predetermined frequency and configured to generate a pulsed transmission signal by cutting out the carrier wave generated by the oscillator in accordance to two or more transmission control signals;
a transmitting antenna configured to input the transmission signal from the high-frequency transmitting section to radiate to the air as radio wave;
a receiving antenna configured to receive reflected wave of the radio wave reflected by an object;
a high-frequency receiving section configured to input a received signal from the receiving antenna to down-convert to a baseband signal by correlating with the transmission signal in accordance to at least one receiving control signal; and
a baseband section including:
an A/D converting unit configured to input the baseband signal to convert into a digital signal,
a digital signal processing unit configured to input the digital signal from the A/D converting unit to calculate a distance to the object and/or relative speed of the object and/or an azimuth angle of the object, and a control unit configured to output the transmission control signals to the high-frequency transmitting section and to output at least one receiving control signal to the high-frequency receiving section;

wherein when the transmission control signals are denoted as X1 through Xm (m≥2) and when the digital signal output of the A/D converting unit is denoted as an $i^{-th}$ background signal when the control unit outputs no $i^{-th}$ transmission control signal Xi among the transmission control signals while outputting the transmitting and receiving control signals except of the $i^{-th}$ signal, the digital signal processing unit is configured to select sequentially the transmission control signals X1 to Xm as the $i^{-th}$ transmission control signal Xi to acquire the digital signals output of the A/D converting unit respectively as the first through the $m^{-th}$ background signals when the control unit outputs the transmitting and receiving control signals except of the transmission control signal Xi, to acquire the digital signal output of the A/D converting unit as a $(m+1)^{-th}$ background signal when the control unit outputs the receiving control signal without outputting any of the m transmission control signals, and to calculate a replica signal by adding the first through the $m^{-th}$ background signals, by subtracting the $(m+1)^{-th}$ background signal, and by dividing by $(m-1)$;

to calculate a low-noise signal by subtracting the replica signal from the digital signal output of the A/D converting unit when the control unit outputs the m transmission control signals and the receiving control signal; and to calculate a distance to the object and/or a relative speed of the object and/or an azimuth angle of the object based on the low-noise signal.

2. The pulse radar apparatus according to claim 1, wherein the digital signal processing unit is configured to process the digital signal inputted from the A/D converting unit by Fourier transform; and to calculate the low-noise signal by subtracting a Fourier component equivalent to 0 Hz of the replica signal from a Fourier component equivalent to 0 Hz of the digital signal output of the A/D converting unit when the control unit outputs the m transmission control signals and the receiving control signal.

3. The pulse radar apparatus according to claim 1, wherein at least the baseband section is formed on a first substrate and the high-frequency transmitting and receiving sections are formed on a substrate different from the first substrate;

a connecting section of a multi-pin connector that connects signal lines for transmitting the baseband signals and control lines for transmitting the m transmission control signals and the receiving control signal collectively in an energized condition is provided between the first substrate and the other substrate; and connections of the control lines and connections of the signal lines within the connecting section are isolated so that a level of leak signals from the control lines to the signal lines falls within a dynamic range of the A/D converting unit.

4. The pulse radar apparatus according to claim 1, wherein the high-frequency transmitting section further includes a first gate unit configured to cut out the carrier wave in pulses in accordance to a first control signal and a second gate unit configured to cut out the signal cut out by the first gate unit in accordance to a second control signal to generate the transmission signal;

the high-frequency receiving section includes a correlator configured to input the received signal from the receiving antenna to correlate with the transmission signal in accordance to a third control signal, and a down-converting unit configured to down-convert the output signal from the correlator into baseband to output the baseband signal;

the control unit outputs the first, second and third control signals respectively to the first and second gate units and the correlator to turn on/off their power sources; and the digital signal processing unit calculates the replica signal by setting the first and second control signals as the m transmission control signals (m=2) and the third control signal at least as the receiving control signal.

5. The pulse radar apparatus according to claim 4, wherein the digital signal processing unit is configured to calculate the low-noise signal by subtracting a Fourier component equivalent to 0 Hz of the replica signal from a Fourier component equivalent to 0 Hz of the digital signal output of the A/D converting unit when the control unit outputs the first, second and third control signals.

6. The pulse radar apparatus according to claim 4, wherein the baseband section is formed on a low-frequency substrate accommodating to an operating frequency band of the baseband section;

the high-frequency transmitting and receiving sections are formed on a high-frequency substrate accommodating to an operating frequency band of the high-frequency transmitting and receiving sections;

a connecting section of a multi-pin connector that connects signal lines for transmitting the baseband signals and the first, second and third control lines for transmitting the first, second and third control signals collectively in an energized condition is provided between the low-frequency substrate and the high-frequency substrate; and connections of the control lines and connections of the signal lines within the connecting section are isolated so that a level of leak signals from the control lines to the signal lines falls within a dynamic range of the A/D converting unit.

7. The pulse radar apparatus according to claim 1, wherein the high-frequency receiving section is configured to output a complex baseband signal composed of I and Q components as the baseband signal;

the baseband section includes at least a complex signal amplifier that inputs the complex baseband signal from the high-frequency receiving section to amplify the I and Q components respectively to predetermined levels and to output to the A/D converting unit;

the A/D converting unit is a complex A/D converting unit configured to input the amplified I and Q components from the complex signal amplifier, to convert into complex digital signal in parallel and to output as the digital signal;

the digital signal processing unit calculates I and Q components of the replica signal by mutually and respectively adding I components and Q components of the first through $m^{-th}$ background signals, by subtracting I and Q components of a $(m+1)^{-th}$ background signal from the added components and by dividing the subtracted components respectively by $(m-1)$, where the complex digital signal output of the complex A/D converting unit is defined as the $i^{-th}$ background signal when the control unit outputs no $i^{-th}$ transmission control signal Xi among the transmission control signals and outputs the transmitting and receiving control signals except of the $1^{-th}$ signal, and the complex digital signal output of the complex A/D converting unit is defined as the $(m+i)^{-th}$ background signal when the control unit outputs the receiving control signal without outputting any of the m transmission control signals;

calculates a gain correction value by dividing either one of an integrated value in a distance gate direction of I component of the replica signal and an integrated value in the distance gate direction of Q component of the replica signal by the other;

subtracts the I and Q components of the replica signal from the I and Q components of the complex digital signal output of the complex A/D converting unit when the control unit outputs the m transmission control signal and the receiving control signal; and calculates the low-noise signal by multiplying the gain correction value with I or Q component of the complex digital signal after subtracting the replica signal.

8. The pulse radar apparatus according to claim 7, wherein the complex baseband signal has signal strength lower than that of the m transmission control signals and the receiving control signal; and the complex signal amplifier that inputs and amplifies the complex baseband signal is disposed separately from the respective control lines that transmit the m transmission control signals and the receiving control signal.

9. The pulse radar apparatus according to claim 7, wherein the high-frequency transmitting section further includes a first gate unit configured to cut out the carrier wave in pulse in accordance to a first control signal and a second gate unit configured to cut out the signal cut out by the first gate unit in accordance to a second control signal to generate the transmission signal;

the high-frequency receiving section includes a correlator configured to input the received signal from the receiving antenna to correlate with the transmission signal in accordance to a third control signal and a quadrature down-converting unit configured to down-convert the output signal from the correlator into baseband to output as the complex baseband signal;

the control unit outputs the first, second and third control signals respectively to the first and second gate units and the correlator to turn on/off their power sources; and the digital signal processing unit calculates the I and Q components of the replica signal by setting the first and second control signals as the m transmission control signals (m=2) and the third control signal at least as the receiving control signal.

10. The pulse radar apparatus according to claim 9, wherein the digital signal processing unit is configured to process the complex digital signal inputted from the complex A/D converting unit by Fourier transform, to subtract a Fourier component equivalent to 0 Hz of the I and Q components of the replica signal from a Fourier component equivalent to 0 Hz of the I and Q components of the complex digital signal output of the complex A/D converting unit when the control unit outputs the first, second and third control signals, and to calculate the low-noise signal by multiplying the gain correction value with the I or Q component of the complex digital signal after subtracting the replica signal.

11. The pulse radar apparatus according to claim 9, wherein the baseband section is formed on a low-frequency substrate accommodating to an operating frequency band of the baseband section;

the high-frequency transmitting and receiving sections are formed on a high-frequency substrate accommodating to an operating frequency band of the high-frequency transmitting and receiving sections;

a connecting section of a multi-pin connector that connects signal lines for transmitting the complex baseband signals and the first, second and third control lines for transmitting the first, second and third control signals collectively in an energized condition is provided between the low-frequency substrate and the high-frequency substrate; and connections of the control lines and connections of the signal lines within the connecting section are isolated so that a level of leak signals from the control lines to the signal lines falls within a dynamic range of the A/D converting unit.

12. The pulse radar apparatus according to claim 1, wherein the baseband section has at least a variable gain amplifier that adjusts a gain in accordance to another one of the receiving control signals, amplifies the baseband signal and output the baseband signal to the A/D converting unit; and the control unit determines the other one of the receiving control signals corresponding to a detected distance in synchronism with either one of the transmission control signals to output to the variable gain amplifier.

13. The pulse radar apparatus according to claim 12, wherein the control unit determines the other one of the receiving control signals and outputs it to the variable gain amplifier so that the gain of the variable gain amplifier increases or turns out to be a fixed value greater than that of a short distance as the detected distance increases; and turns off the other one of the receiving control signals during a period from when a time in which the detected distance is maximized elapses after outputting the transmission signal until when a next transmission signal is output.

14. The pulse radar apparatus according to claim 12, wherein the baseband signal has signal strength lower than that of the m transmission control signals and the receiving control signal; and the variable gain amplifier that inputs and amplifies the baseband signal is disposed separately from the respective control lines that transmit the m transmission control signals and the receiving control signal.

15. The pulse radar apparatus according to claim 12, wherein the high-frequency transmitting section further includes a first gate unit configured to cut out the carrier wave in pulses in accordance to a first control signal and a second gate unit configured to cut out the signal cut out by the first gate unit in accordance to a second control signal to generate the transmission signal;

the high-frequency receiving section includes a correlator configured to input the received signal from the receiving antenna to correlate with the transmission signal in accordance to a third control signal and a down-converting unit configured to down-convert the output signal of the correlator into baseband to output the baseband signal;

the variable gain amplifier amplifies the baseband signal by adjusting a gain in accordance to a fourth control signal;

the control unit outputs the first, second and third control signals respectively to the first and second gate units and the correlator to turn on/off their power sources and determines the fourth control signal corresponding to a detected distance in synchronism with the first or second control signal to output to the variable gain amplifier; and the digital signal processing unit calculates the replica signal by setting the first and second control signals as the m transmission control signals (m=2) and the third and fourth control signals as the receiving control signals.

16. The pulse radar apparatus according to claim 15, wherein the control unit determines the fourth control signal and outputs it to the variable gain amplifier so that the gain of the variable gain amplifier increases or turns out to be a fixed value greater than that of a short distance as the detected distance increases; and
turns off the fourth control signal during a period from when a time in which the detected distance is maximized elapses after outputting the transmission signal until when a next transmission signal is output.

17. The pulse radar apparatus according to claim 15, wherein the digital signal processing unit calculates the low-noise signal by subtracting a Fourier component equivalent to 0 Hz of the replica signal from a Fourier component equivalent to 0 Hz of the digital signal output of the A/D converting unit when the control unit outputs the first, second, third and fourth control signals.

18. The pulse radar apparatus according to claim 15, wherein the baseband section is formed on a low-frequency substrate accommodating to an operating frequency band of the baseband section;
the high-frequency transmitting and receiving sections are formed on a high-frequency substrate accommodating to an operating frequency band of the high-frequency transmitting and receiving sections;
a connecting section of a multi-pin connector that connects signal lines for transmitting the baseband signals and the first, second and third control lines for transmitting the first, second and third control signals collectively in an energized condition is provided between the low-frequency substrate and the high-frequency substrate; and
connections of the control lines and connections of the signal lines within the connecting section are isolated so that a level of leak signals from the control lines to the signal lines falls within a dynamic range of the A/D converting unit.

19. A method for controlling a pulse radar apparatus, comprising:
generating a carrier wave of predetermined frequency;
cutting out the carrier wave in pulses in accordance to two or more transmission control signals to generate a transmission signal;
radiating the transmission signal to the air as radio wave;
receiving reflected wave of the radio wave reflected by an object; correlating the received signal received in the receiving step with the transmission signal in accordance to at least one receiving control signal;
down-converting an output signal of the correlating step to baseband to output as a baseband signal;
A/D converting at least the inputted baseband signal into a digital signal; and
digital signal processing, using a digital signal processor, the inputted digital signal to calculate a distance to the object and/or relative speed of the object and/or an azimuth angle of the object;
wherein when the transmission control signals are denoted as X1 through Xm (m≥2), and the digital signal outputted of the A/D converting unit is denoted as an $i^{-th}$ background signal when the $i^{-th}$ transmission control signal Xi among the transmission control signals is not output while outputting the transmission and receiving control signals, except of the $i^{-th}$ transmission control signal, in the signal cutting-out step, the digital signal processing includes:
selecting sequentially the transmission control signals X1 to Xm as the $i^{-th}$ transmission control signal Xi;
acquiring the digital signals acquired in the A/D converting step as first through $m^{-th}$ background signals when the transmission control signals, except of the transmission control signal Xi, and the receiving control signals are outputted in the signal cutting-out step;
acquiring the digital signal acquired in the A/D converting step as a $(m+1)^{-th}$ background signal when the receiving control signals are output without outputting any of the m transmission control signals in the signal cutting-out step;
calculating a replica signal by adding the background signals from the first through the $M^{-th}$ background signals, by subtracting the $(m+1)^{-th}$ background signal, and by dividing the background signals obtained by the subtraction by $(m^{-1})$;
calculating a low-noise signal by subtracting the replica signal from the digital signal when the m transmission control signals and the receiving control signal are output in the signal cutting-out step; and
calculating a distance to the object and/or a relative speed of the object and/or an azimuth angle of the object based on the low-noise signal.

20. The method for controlling the pulse radar apparatus according to claim 19, wherein the digital signal converted in the A/D converting step is processed by Fourier transform in the digital signal processing step; and
the low-noise signal is calculated by subtracting a Fourier component equivalent to 0 Hz of the replica signal from a Fourier component equivalent to 0 Hz of the digital signal obtained in the A/D converting step when the m transmission control signals are output in the signal cutting out step and at least one of the receiving control signals is output in the correlating step.

21. The method for controlling the pulse radar apparatus according to claim 19, wherein the signal cutting-out step further includes a first cutout step of cutting out the carrier wave in pulses in accordance to a first control signal and a second cutout step of still cutting out the signal cut out in the first cutout step in accordance to a second control signal to generate the transmission signal;
the received signal is correlated with the transmission signal in accordance to a third control signal in the correlating step; and
the replica signal is calculated by setting the first and second control signals as the m transmission control signals (m=2) and the third control signal at least as the receiving control signal in the digital signal processing step.

22. The method for controlling the pulse radar apparatus according to claim 21, wherein the low-noise signal is calculated by subtracting a Fourier component equivalent to 0 Hz of the replica signal from a Fourier component equivalent to 0 Hz of the digital signal when the first and second cut-out steps and the correlating step are executed.

23. The method for controlling the pulse radar apparatus according to claim 19, wherein a complex baseband signal composed of I and Q components is output as the baseband signal in the down-converting step;
the method further includes a complex signal amplifying step of at least inputting the complex baseband signal to amplify the I and Q components respectively to predetermined levels in parallel;

signals obtained by inputting the amplified I and Q components and by converting into complex digital signals in parallel are output as the digital signals in the A/D converting step;

the digital signal processing step further includes steps of:
calculating I and Q components of the replica signal by mutually and respectively adding I components and Q components of the first through $M^{-th}$ background signals, by subtracting I and Q components of a $(m+1)^{-th}$ component, and by dividing the subtracted components respectively by $(m^{-1})$;

where the complex digital signal obtained in the complex A/D converting step is defined as the $1^{-th}$ background signal when no $i^{-th}$ transmission control signal Xi among the transmission control signals is output and the transmitting and receiving control signals, except of the $i^{-th}$ signal, are output in the signal cutting-out step, and a complex digital signal obtained in the complex A/D converting step is defined as the $(m+i)^{-th}$ background signal when the receiving control signal is output without outputting any of the m transmission control signals;

calculating a gain correction value by dividing either one of an integrated value in a distance gate direction of the I component of the replica signal and an integrated value in the distance gate direction of the Q component of the replica signal by the other;

subtracting the I and Q components of the replica signal respectively from the I and Q components of the complex digital signal obtained in the complex A/D converting step when the m transmission control signals and the receiving control signal are output in the signal cutting-out step; and calculating the low-noise signal by multiplying the gain correction value with the I or Q component of the complex digital signal after subtracting the replica signal.

24. The method for controlling the pulse radar apparatus according to claim 23, wherein the signal cutting-out step further includes a first cutout step of cutting out the carrier wave in pulses in accordance to a first control signal and a second cutout step of still cutting out the signal cut out in the first cutout step in accordance to a second control signal to generate the transmission signal;

the received signal is correlated with the transmission signal in accordance to a third control signal in the correlating step; and the replica signal is calculated by setting the first and second control signals as the m transmission control signals (m=2) and the third control signal at least as the receiving control signal in the digital signal processing step.

25. The method for controlling the pulse radar apparatus according to claim 24, wherein the complex digital signal converted in the complex A/D converting step is processed by the Fourier transform in the digital signal processing step;

a Fourier component equivalent to 0 Hz of the I and Q components of the replica signal are subtracted from a Fourier component equivalent to 0 Hz of the I and Q components of the complex digital signal output when the first and second cutout steps and the correlating steps are executed; and the low-noise signal is calculated by multiplying the gain correction value with the I or Q component of the complex digital signal from which the replica signal has been subtracted.

26. The method for controlling the pulse radar apparatus according to claim 19, further comprising:

a variable gain amplifying step of:
determining the other one of the receiving control signals corresponding to the detected distance in synchronism at least with either one of the transmission control signals; and adjusting the gain in accordance to the other one of the receiving control signals to amplify the baseband signal generated in the down-converting step; and the amplified baseband signal input and converted is output as the digital signal in the A/D converting step.

27. The method for controlling the pulse radar apparatus according to claim 26, wherein in the variable gain amplifying step, the other one of the receiving control signals is determined so that the gain used in the variable gain amplifying step increases or turns out to be a fixed value greater than that of a short distance as the detected distance increases; and the other one of the receiving control signals is turned off during a period from when a time in which the detected distance is maximized elapses after outputting the transmission signal until when a next transmission signal is output.

28. The method for controlling the pulse radar apparatus according to claim 26, wherein the signal cutting-out step further includes a first cutout step of cutting out the carrier wave in pulses in accordance to a first control signal and a second cutout step of still cutting out the signal cut out in the first cutout step in accordance to a second control signal to generate the transmission signal;

the received signal is correlated with the transmission signal in accordance to a third control signal in the correlating step;

a gain is adjusted in accordance to a fourth control signal determined corresponding to detected distance in synchronism with the first or second control signal to amplify the baseband signal in the variable gain amplifying step; and the replica signal is calculated by setting the first and second control signals as the m transmission control signals (m=2) and the third and fourth control signals as the receiving control signals in the digital signal processing step.

29. The method for controlling the pulse radar apparatus according to claim 28, wherein the fourth control signal is determined so that the gain used in the variable gain amplifying step increases or turns out to be a fixed value greater than that of a short distance as the detected distance increases; and the fourth control signal is turned off during a period from when a time in which the detected distance is maximized elapses after outputting the transmission signal until when a next transmission signal is output in the variable gain amplifying step.

30. The method for controlling the pulse radar apparatus according to claim 28, wherein the low-noise signal is calculated by subtracting a Fourier component equivalent to 0 Hz of the replica signal from a Fourier component equivalent to 0 Hz of the digital signal output when the first and second cutout steps, the correlating step and the variable gain amplifying step are executed in the digital signal processing step.

31. The pulse radar apparatus according to claim 2, wherein at least the baseband section is formed on a first substrate and the high-frequency transmitting and receiving sections are formed on a substrate different from the first substrate;

a connecting section of a multi-pin connector that connects signal lines for transmitting the baseband signals and control lines for transmitting the m transmission control signals and the receiving control signal collectively in an energized condition is provided between the first substrate and the other substrate; and connections of the control lines and connections of the signal lines within the connecting section are isolated so that a level of leak signals from the control lines to the signal lines falls within a dynamic range of the A/D converting unit.

32. The pulse radar apparatus according to claim 5, wherein the baseband section is formed on a low-frequency substrate accommodating to an operating frequency band of the baseband section;

the high-frequency transmitting and receiving sections are formed on a high-frequency substrate accommodating to an operating frequency band of the high-frequency transmitting and receiving sections;

a connecting section of a multi-pin connector that connects signal lines for transmitting the baseband signals and the first, second and third control lines for transmitting the first, second and third control signals collectively in an energized condition is provided between the low-frequency substrate and the high-frequency substrate; and connections of the control lines and connections of the signal lines within the connecting section are isolated so that a level of leak signals from the control lines to the signal lines falls within a dynamic range of the A/D converting unit.

33. The pulse radar apparatus according to claim 8, wherein the high-frequency transmitting section further includes a first gate unit configured to cut out the carrier wave in pulse in accordance to a first control signal and a second gate unit configured to cut out the signal cut out by the first gate unit in accordance to a second control signal to generate the transmission signal;

the high-frequency receiving section includes a correlator configured to input the received signal from the receiving antenna to correlate with the transmission signal in accordance to a third control signal and a quadrature down-converting unit configured to down-convert the output signal from the correlator into baseband to output as the complex baseband signal;

the control unit outputs the first, second and third control signals respectively to the first and second gate units and the correlator to turn on/off their power sources; and the digital signal processing unit calculates the I and Q components of the replica signal by setting the first and second control signals as the m transmission control signals (m=2) and the third control signal at least as the receiving control signal.

34. The pulse radar apparatus according to claim 33, wherein the digital signal processing unit is configured to process the complex digital signal inputted from the complex A/D converting unit by Fourier transform, to subtract a Fourier component equivalent to 0 Hz of the I and Q components of the replica signal from a Fourier component equivalent to 0 Hz of the I and Q components of the complex digital signal output of the complex A/D converting unit when the control unit outputs the first, second and third control signals, and to calculate the low-noise signal by multiplying the gain correction value with the I or Q component of the complex digital signal after subtracting the replica signal.

35. The pulse radar apparatus according to claim 10, wherein the baseband section is formed on a low-frequency substrate accommodating to an operating frequency band of the baseband section;

the high-frequency transmitting and receiving sections are formed on a high-frequency substrate accommodating to an operating frequency band of the high-frequency transmitting and receiving sections;

a connecting section of a multi-pin connector that connects signal lines for transmitting the complex baseband signals and the first, second and third control lines for transmitting the first, second and third control signals collectively in an energized condition is provided between the low-frequency substrate and the high-frequency substrate; and connections of the control lines and connections of the signal lines within the connecting section are isolated so that a level of leak signals from the control lines to the signal lines falls within a dynamic range of the A/D converting unit.

36. The pulse radar apparatus according to claim 33, wherein the baseband section is formed on a low-frequency substrate accommodating to an operating frequency band of the baseband section;

the high-frequency transmitting and receiving sections are formed on a high-frequency substrate accommodating to an operating frequency band of the high-frequency transmitting and receiving sections;

a connecting section of a multi-pin connector that connects signal lines for transmitting the complex baseband signals and the first, second and third control lines for transmitting the first, second and third control signals collectively in an energized condition is provided between the low-frequency substrate and the high-frequency substrate; and connections of the control lines and connections of the signal lines within the connecting section are isolated so that a level of leak signals from the control lines to the signal lines falls within a dynamic range of the A/D converting unit.

37. The pulse radar apparatus according to claim 34, wherein the baseband section is formed on a low-frequency substrate accommodating to an operating frequency band of the baseband section;

the high-frequency transmitting and receiving sections are formed on a high-frequency substrate accommodating to an operating frequency band of the high-frequency transmitting and receiving sections;

a connecting section of a multi-pin connector that connects signal lines for transmitting the complex baseband signals and the first, second and third control lines for transmitting the first, second and third control signals collectively in an energized condition is provided between the low-frequency substrate and the high-frequency substrate; and connections of the control lines and connections of the signal lines within the connecting section are isolated so that a level of leak signals from the control lines to the signal lines falls within a dynamic range of the A/D converting unit.

38. The pulse radar apparatus according to claim 2, wherein the baseband section has at least a variable gain amplifier that adjusts a gain in accordance to another one of the receiving control signals, amplifies the baseband signal and output the baseband signal to the A/D converting unit; and the control unit determines the other one of the receiving control signals corresponding to a detected distance in synchronism with either one of the transmission control signals to output to the variable gain amplifier.

39. The pulse radar apparatus according to claim 3, wherein the baseband section has at least a variable gain amplifier that adjusts a gain in accordance to another one of the receiving control signals, amplifies the baseband signal and output the baseband signal to the A/D converting unit; and the control unit determines the other one of the receiving control signals corresponding to a detected distance in synchronism with either one of the transmission control signals to output to the variable gain amplifier.

40. The pulse radar apparatus according to claim 31, wherein the baseband section has at least a variable gain amplifier that adjusts a gain in accordance to another one of the receiving control signals, amplifies the baseband signal and output the baseband signal to the A/D converting unit; and the control unit determines the other one of the receiving control signals corresponding to a detected distance in synchronism with either one of the transmission control signals to output to the variable gain amplifier.

41. The pulse radar apparatus according to claim 38, wherein the control unit determines the other one of the receiving control signals and outputs it to the variable gain amplifier so that the gain of the variable gain amplifier increases or turns out to be a fixed value greater than that of a short distance as the detected distance increases; and turns off the other one of the receiving control signals during a period from when a time in which the detected distance is maximized elapses after outputting the transmission signal until when a next transmission signal is output.

42. The pulse radar apparatus according to claim 39, wherein the control unit determines the other one of the receiving control signals and outputs it to the variable gain amplifier so that the gain of the variable gain amplifier increases or turns out to be a fixed value greater than that of a short distance as the detected distance increases; and turns off the other one of the receiving control signals during a period from when a time in which the detected distance is maximized elapses after outputting the transmission signal until when a next transmission signal is output.

43. The pulse radar apparatus according to claim 40, wherein the control unit determines the other one of the receiving control signals and outputs it to the variable gain amplifier so that the gain of the variable gain amplifier increases or turns out to be a fixed value greater than that of a short distance as the detected distance increases; and turns off the other one of the receiving control signals during a period from when a time in which the detected distance is maximized elapses after outputting the transmission signal until when a next transmission signal is output.

44. The pulse radar apparatus according to claim 38, wherein the baseband signal has signal strength lower than that of the m transmission control signals and the receiving control signal; and the variable gain amplifier that inputs and amplifies the baseband signal is disposed separately from the respective control lines that transmit the m transmission control signals and the receiving control signal.

45. The pulse radar apparatus according to claim 39, wherein the baseband signal has signal strength lower than that of the m transmission control signals and the receiving control signal; and the variable gain amplifier that inputs and amplifies the baseband signal is disposed separately from the respective control lines that transmit the m transmission control signals and the receiving control signal.

46. The pulse radar apparatus according to claim 40, wherein the baseband signal has signal strength lower than that of the m transmission control signals and the receiving control signal; and the variable gain amplifier that inputs and amplifies the baseband signal is disposed separately from the respective control lines that transmit the m transmission control signals and the receiving control signal.

47. The pulse radar apparatus according to claim 13, wherein the baseband signal has signal strength lower than that of the m transmission control signals and the receiving control signal; and the variable gain amplifier that inputs and amplifies the baseband signal is disposed separately from the respective control lines that transmit the m transmission control signals and the receiving control signal.

48. The pulse radar apparatus according to claim 41, wherein the baseband signal has signal strength lower than that of the m transmission control signals and the receiving control signal; and the variable gain amplifier that inputs and amplifies the baseband signal is disposed separately from the respective control lines that transmit the m transmission control signals and the receiving control signal.

49. The pulse radar apparatus according to claim 42, wherein the baseband signal has signal strength lower than that of the m transmission control signals and the receiving control signal; and the variable gain amplifier that inputs and amplifies the baseband signal is disposed separately from the respective control lines that transmit the m transmission control signals and the receiving control signal.

50. The pulse radar apparatus according to claim 43, wherein the baseband signal has signal strength lower than that of the m transmission control signals and the receiving control signal; and the variable gain amplifier that inputs and amplifies the baseband signal is disposed separately from the respective control lines that transmit the m transmission control signals and the receiving control signal.

51. The pulse radar apparatus according to claim 16, wherein the digital signal processing unit calculates the low-noise signal by subtracting a Fourier component equivalent to 0 Hz of the replica signal from a Fourier component equivalent to 0 Hz of the digital signal output of the A/D converting unit when the control unit outputs the first, second, third and fourth control signals.

52. The pulse radar apparatus according to claim 16, wherein the baseband section is formed on a low-frequency substrate accommodating to an operating frequency band of the baseband section;

the high-frequency transmitting and receiving sections are formed on a high-frequency substrate accommodating to an operating frequency band of the high-frequency transmitting and receiving sections;

a connecting section of a multi-pin connector that connects signal lines for transmitting the baseband signals and the first, second and third control lines for transmitting the first, second and third control signals collectively in an energized condition is provided between the low-frequency substrate and the high-frequency substrate; and connections of the control lines and connections of the signal lines within the connecting section are isolated so that a level of leak signals from the control lines to the signal lines falls within a dynamic range of the A/D converting unit.

53. The pulse radar apparatus according to claim 17, wherein the baseband section is formed on a low-frequency substrate accommodating to an operating frequency band of the baseband section;

the high-frequency transmitting and receiving sections are formed on a high-frequency substrate accommodating to an operating frequency band of the high-frequency transmitting and receiving sections;

a connecting section of a multi-pin connector that connects signal lines for transmitting the baseband signals and the first, second and third control lines for transmitting the first, second and third control signals collectively in an energized condition is provided between the low-frequency substrate and the high-frequency substrate; and connections of the control lines and connections of the signal lines within the connecting section are isolated so that a level of leak signals from the control lines to the signal lines falls within a dynamic range of the A/D converting unit.

54. The pulse radar apparatus according to claim 51, wherein the baseband section is formed on a low-frequency substrate accommodating to an operating frequency band of the baseband section;

the high-frequency transmitting and receiving sections are formed on a high-frequency substrate accommodating to an operating frequency band of the high-frequency transmitting and receiving sections;

a connecting section of a multi-pin connector that connects signal lines for transmitting the baseband signals and the first, second and third control lines for transmitting the first, second and third control signals collectively in an energized condition is provided between the low-frequency substrate and the high-frequency substrate; and connections of the control lines and connections of the signal lines within the connecting section are isolated so that a level of leak signals from the control lines to the signal lines falls within a dynamic range of the A/D converting unit.

55. The method for controlling the pulse radar apparatus according to claim 27, wherein the signal cutting-out step further includes a first cutout step of cutting out the carrier wave in pulses in accordance to a first control signal and a second cutout step of still cutting out the signal cut out in the first cutout step in accordance to a second control signal to generate the transmission signal;

the received signal is correlated with the transmission signal in accordance to a third control signal in the correlating step;

a gain is adjusted in accordance to a fourth control signal determined corresponding to detected distance in synchronism with the first or second control signal to amplify the baseband signal in the variable gain amplifying step; and the replica signal is calculated by setting the first and second control signals as the m transmission control signals (m=2) and the third and fourth control signals as the receiving control signals in the digital signal processing step.

56. The method for controlling the pulse radar apparatus according to claim 55, wherein the fourth control signal is determined so that the gain used in the variable gain amplifying step increases or turns out to be a fixed value greater than that of a short distance as the detected distance increases; and the fourth control signal is turned off during a period from when a time in which the detected distance is maximized elapses after outputting the transmission signal until when a next transmission signal is output in the variable gain amplifying step.

57. The method for controlling the pulse radar apparatus according to claim 29, wherein the low-noise signal is calculated by subtracting a Fourier component equivalent to 0 Hz of the replica signal from a Fourier component equivalent to 0 Hz of the digital signal output when the first and second cutout steps, the correlating step and the variable gain amplifying step are executed in the digital signal processing step.

58. The method for controlling the pulse radar apparatus according to claim 55, wherein the low-noise signal is calculated by subtracting a Fourier component equivalent to 0 Hz of the replica signal from a Fourier component equivalent to 0 Hz of the digital signal output when the first and second cutout steps, the correlating step and the variable gain amplifying step are executed in the digital signal processing step.

59. The method for controlling the pulse radar apparatus according to claim 56, wherein the low-noise signal is calculated by subtracting a Fourier component equivalent to 0 Hz of the replica signal from a Fourier component equivalent to 0 Hz of the digital signal output when the first and second cutout steps, the correlating step and the variable gain amplifying step are executed in the digital signal processing step.

* * * * *